(12) United States Patent
Takada

(10) Patent No.: US 7,609,322 B2
(45) Date of Patent: Oct. 27, 2009

(54) IMAGING APPARATUS

(75) Inventor: Hideki Takada, Tokyo (JP)

(73) Assignee: Kyocera Corporation, Fushimi-ku, Kyoto-shi, Kyoto (JP)

( * ) Notice: Subject to any disclaimer, the term of this patent is extended or adjusted under 35 U.S.C. 154(b) by 803 days.

(21) Appl. No.: 10/797,531

(22) Filed: Mar. 10, 2004

(65) Prior Publication Data

US 2004/0223074 A1    Nov. 11, 2004

(30) Foreign Application Priority Data

| Mar. 10, 2003 | (JP) | ............................. 2003-063995 |
| Mar. 11, 2003 | (JP) | ............................. 2003-065819 |
| Apr. 22, 2003 | (JP) | ............................. 2003-117665 |
| Jun. 27, 2003 | (JP) | ............................. 2003-185883 |
| Jun. 27, 2003 | (JP) | ............................. 2003-185884 |
| Jun. 27, 2003 | (JP) | ............................. 2003-185885 |
| Jun. 27, 2003 | (JP) | ............................. 2003-185886 |
| Jun. 27, 2003 | (JP) | ............................. 2003-185887 |

(51) Int. Cl.
*H04N 5/225* (2006.01)
*G03B 17/08* (2006.01)

(52) U.S. Cl. .......................... 348/374; 348/360; 396/25

(58) Field of Classification Search ................ 348/360, 348/374; 396/25, 448
See application file for complete search history.

(56) References Cited

U.S. PATENT DOCUMENTS 5,550,612 A * 8/1996 Arai .............................. 396/89

5,689,375 A * 11/1997 Satoh et al. .................. 359/699
5,798,876 A *  8/1998 Nagano ........................ 359/819
6,507,700 B1 *  1/2003 Takekuma et al. ............ 396/25
6,704,151 B2 *  3/2004 Nishimura et al. .......... 359/819

FOREIGN PATENT DOCUMENTS

| JP | 49-11740 | 1/1974 |
| JP | 59-028108 | 2/1984 |
| JP | 61-002112 | 1/1986 |
| JP | 62-011813 | 1/1987 |
| JP | 62-170917 | 10/1987 |
| JP | 63-141011 | 6/1988 |
| JP | 06-206714 | 8/1988 |
| JP | 02-080107 | 3/1990 |
| JP | 2-64927 | 5/1990 |
| JP | 02-198403 | 8/1990 |

(Continued)

OTHER PUBLICATIONS

Kougyou <vol. 50, No. 7> (Imaging Technology Information Magazine that creates photographs).
Kougyou <vol. 50, No. 7> (Imaging Technology Information Magazine that creates photographs) Jul. 1992.

*Primary Examiner*—David L Ometz
*Assistant Examiner*—Luong T Nguyen
(74) *Attorney, Agent, or Firm*—Schulte Roth & Zabel; John C. Garces

(57) ABSTRACT

An imaging apparatus having an opening of a front casing caulked with a pressure member. An O-ring is used for caulking the front casing and is designed to have an inner diameter larger than the outer diameter of the first lens, and an outer diameter smaller than the inner diameter of the pressure member. When the pressure member is screw fitted, the O-ring is compressed. Thus, a clearance formed by the edge portion of the first lens and the inner wall surface of the pressure member is caulked by the deformation of the O-ring occurring when the O-ring is pressed.

3 Claims, 35 Drawing Sheets

FOREIGN PATENT DOCUMENTS

| | | |
|---|---|---|
| JP | 11-313235 | 11/1990 |
| JP | 3-5120 | 1/1991 |
| JP | 3-6370 | 1/1991 |
| JP | 3-20575 | 2/1991 |
| JP | 03-072789 | 3/1991 |
| JP | 3-65110 | 6/1991 |
| JP | 04-051105 | 2/1992 |
| JP | 4-101511 | 9/1992 |
| JP | 05-077272 | 3/1993 |
| JP | 05-127058 | 5/1993 |
| JP | 05-241227 | 9/1993 |
| JP | 05-075937 | 10/1993 |
| JP | 6-55871 | 8/1994 |
| JP | 6-64244 | 9/1994 |
| JP | 08-029851 | 2/1996 |
| JP | 09-265035 | 10/1997 |
| JP | 10-133263 | 5/1998 |
| JP | 10-325465 | 12/1998 |
| JP | 11-072689 | 3/1999 |
| JP | 11-202177 | 7/1999 |
| JP | 2000-175091 | 6/2000 |
| JP | 2000-284422 | 10/2000 |
| JP | 2001-206885 | 7/2001 |
| JP | 3084259 | 3/2002 |
| JP | 2002-098874 | 4/2002 |
| JP | 2002-098878 | 4/2002 |
| JP | 2002-134725 | 5/2002 |
| JP | 2002-139662 | 5/2002 |
| JP | 2002-221750 | 8/2002 |
| JP | 2002-338945 | 11/2002 |

* cited by examiner

IMAGING APPARATUS

CROSS-REFERENCE TO RELATED APPLICATIONS

This application claims all rights of priority to Japanese Patent Application Nos. 2003-063995 filed on Mar. 10, 2003, 2003-065819 filed on Mar. 11, 2003, 2003-117665 filed on Apr. 22, 2003, 2003-185883 filed on Jun. 27, 2003, 2003-185884 filed on Jun. 27, 2003, 2003-185885 filed on Jun. 27, 2003, 2003-185886 filed on Jun. 27, 2003, and 2003-185887 filed on Jun. 27, 2003 (all pending).

BACKGROUND OF THE INVENTION

The present invention relates to an imaging apparatus, and particularly relates to the imaging apparatus with improved environmental resistance performance.

In recent years, as the performance such as miniaturization of imaging devices including CCD (Charge-Coupled Device) or CMOS (Complementary Metal-Oxide Semiconductor) improves, an imaging apparatus for various applications, for example, outdoor applications, have been put into practical use. Further, techniques as described below have been proposed.

JP-A-2-198403, JP-A-11-313235, JP-A-4-101511 (Utility Model) and JP-B-2679784 disclose a technique in which projections formed in the circumferential edge of a lens-barrel formed out of a resin material for receiving and retaining lenses are caulked by heat deposition so as to cover the front-side circumferential edge portion of a first lens.

JP-A-6-55871 (Utility Model), JP-A-2-80107, JP-A-5-77272 and JP-A-2-64927 (Utility Model) disclose a technique in which the convex surface of a first convex lens is made to project from a casing so as to secure a wide field of view for a lens system.

JP-A-2-64927 (Utility Model), JP-A-9-265035 and "Shashinkougyo" (Vol. 50, 1992, No.7, p.11-12) disclose a technique used for an underwater camera or the like in which direct sealing is achieved by a first wide-angle lens without using protective glass.

JP-A-2002-90603, JP-A-5-241227 and JP-A-8-29851 disclose a technique for sealing the opening of a casing with a lens-barrel.

BRIEF SUMMARY

However, since the above conventional techniques may not be always enough for the environmental resistance performance such as waterproof performance, further technical improvements have been desired. An object of the present invention is to provide an imaging apparatus in which the environmental resistance performance and the like are improved.

The imaging apparatus according to the invention includes a camera casing having an opening, a lens set housed in a lens-barrel, and a pressure member having an opening and pressing a first lens of the lens set in an optical axis direction, wherein the opening of the camera casing is caulked with the pressure member, while the opening of the pressure member is caulked with the first lens. With this configuration, waterproofing is attained easily.

The pressure member may be a screw fitted member. The pressure member may be fitted to the outer circumference of the lens-barrel so as to press the first lens in the optical axis direction. The first lens may abut against a predetermined object-side surface of a second lens of the lens group so as to be positioned in the optical axis direction.

The first lens and the second lens may abut against the lens-barrel so as to be positioned in the optical axis direction, while the second lens is pressed in the optical axis direction by an elastic member disposed between the first lens and the second lens. In addition, coating to be performed on the object-side surface of the first lens may be abolished.

Further, the imaging apparatus according to the invention includes a lens-barrel for receiving a lens set, an annular sealing material inserted into a step formed in a side surface of a first lens of the lens set exposed partially from the lens-barrel, and a screwed fitted pressure member fitted to the outer circumference of the lens-barrel to thereby fix the first lens. There is a dimensional relationship in which a clearance between the pressure member and the first lens is larger than the width of the sealing material when the pressure member has not been screwed down yet, while the sealing material is pressed and deformed to occurs blockage in the clearance when the pressure member has been screwed down. The "step" may be formed on the outer circumferential surface of the first lens, or may be formed by the outer circumferential surface of the first lens and the object-side surface of the lens-barrel. The step may have a substantially L-shape by way of example. Another sealing material may be disposed between the first lens and the second lens.

This imaging apparatus may be designed so that the inner surface of the first lens is concave, and the thickness of the first lens exists continuously on a line where a force occurs in a radial direction of the first lens due to the sealing material. This configuration is advantageous in strength, so that the influence of the pressing force of the sealing material on the dimensions of the curved surface of the lens can be relieved. As a result, a material low in rigidity but high in refractive index can be selected. Thus, the degree of freedom in selecting materials is increased.

DETAILED DESCRIPTION

Figure 1:
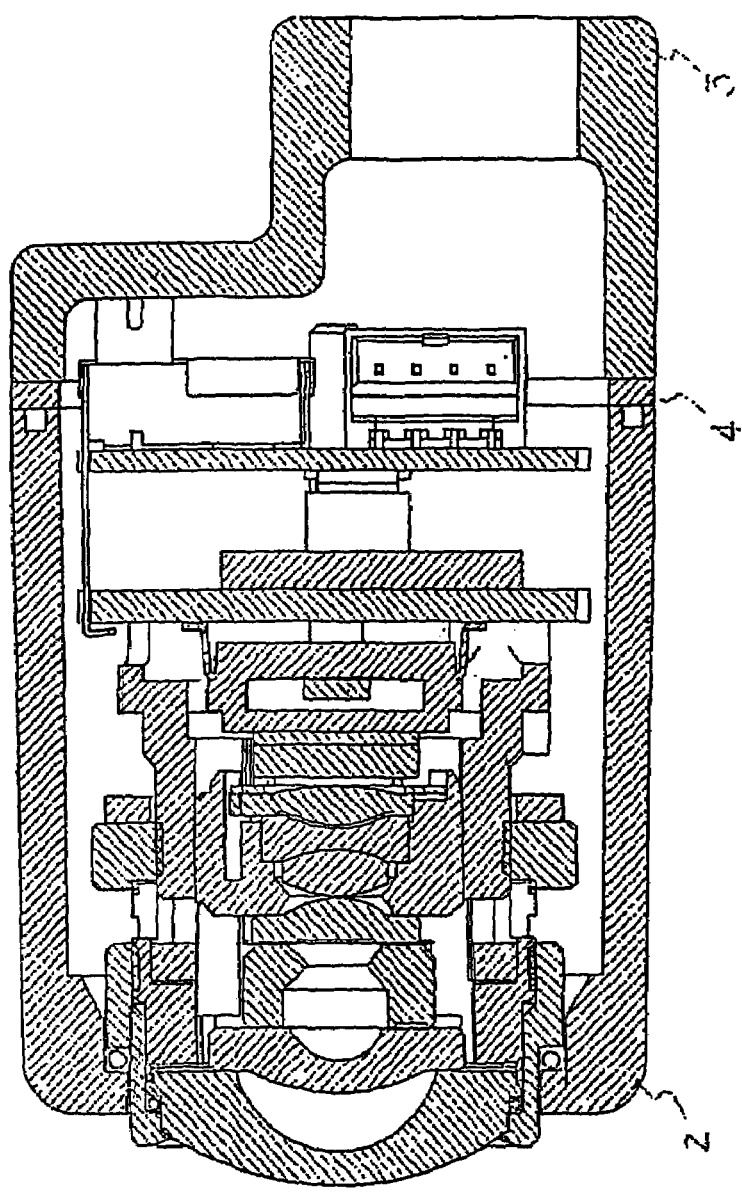
FIG. 1 is a sectional view of imaging apparatus according to a first embodiment.
Figure 2:
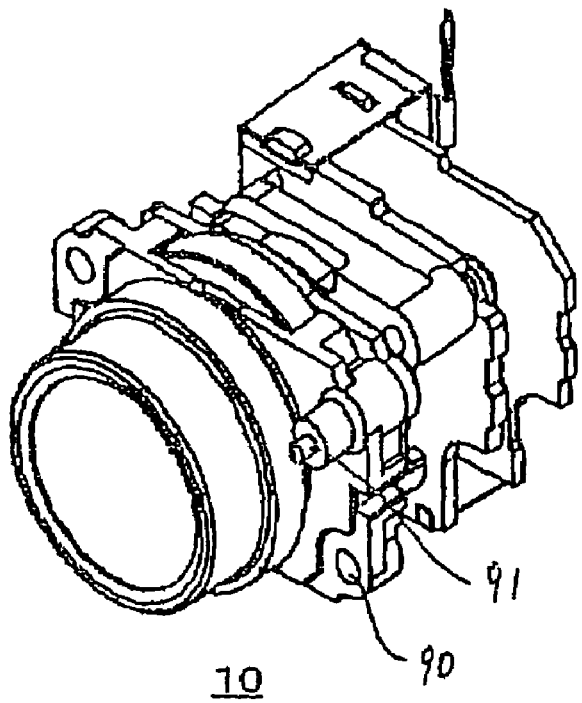
FIG. 2 is a perspective view of an imaging unit according to the first embodiment.
Figure 3:
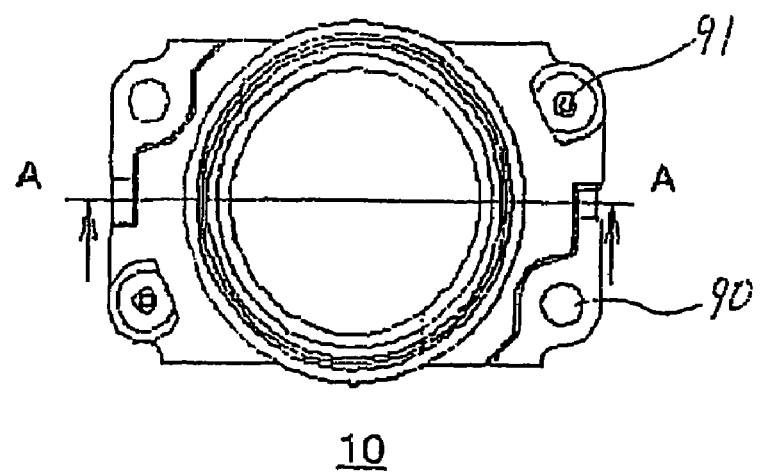
FIG. 3 is a front view of the imaging unit according to the first embodiment.
Figure 4:
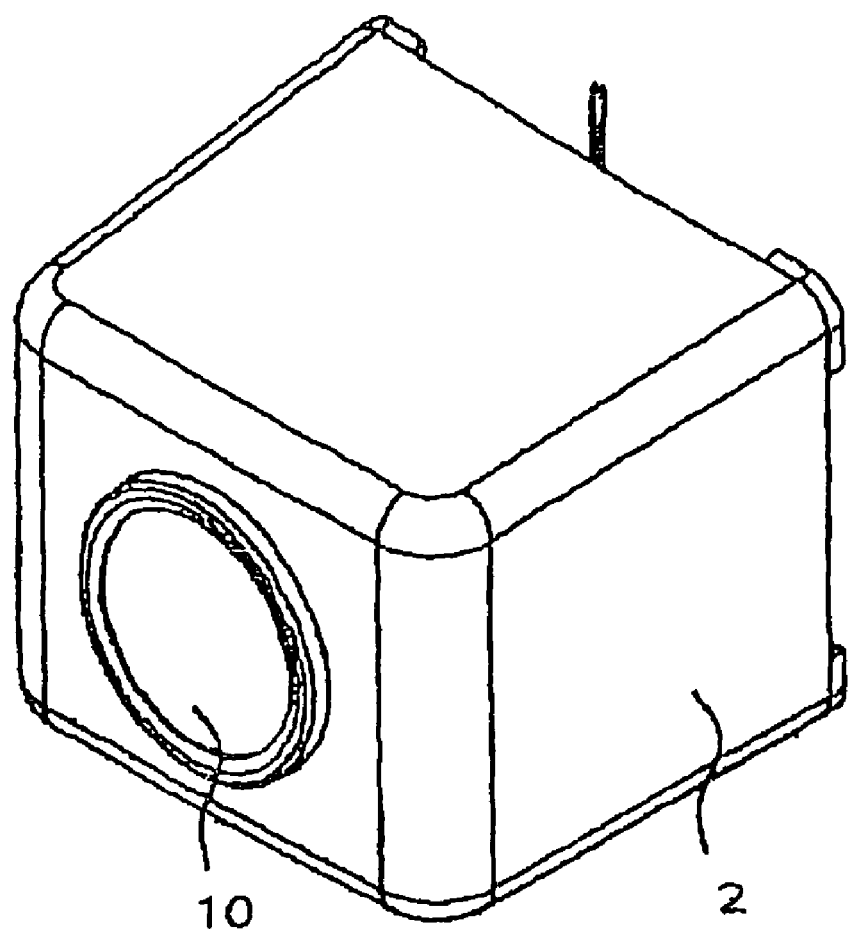
FIG. 4 is a perspective view of the imaging unit incorporated in a front casing according to the first embodiment.

FIG. 1 is a sectional view of imaging apparatus according to a first embodiment. FIG. 2 is a perspective view of an imaging unit. FIG. 3 is a front view of the imaging unit. FIG. 4 is a perspective view showing that the imaging unit is incorporated in a front casing.

As shown in FIG. 1, an imaging apparatus 1 according to the first embodiment has a front casing 2 and a rear casing 3, and a packing 4 is inserted between the front casing 2 and the rear casing 3 so as to seal off the casings. As shown in FIG. 2, an imaging unit 10 is incorporated in the casings. The front casing 2 and the rear casing 3 are fixed to each other with screws. The screws are inserted from the back surface of the rear casing 3 into holes (not shown) of the rear casing 3, and screwed down to bosses (not shown) of the front casing 2.

Figure 5:
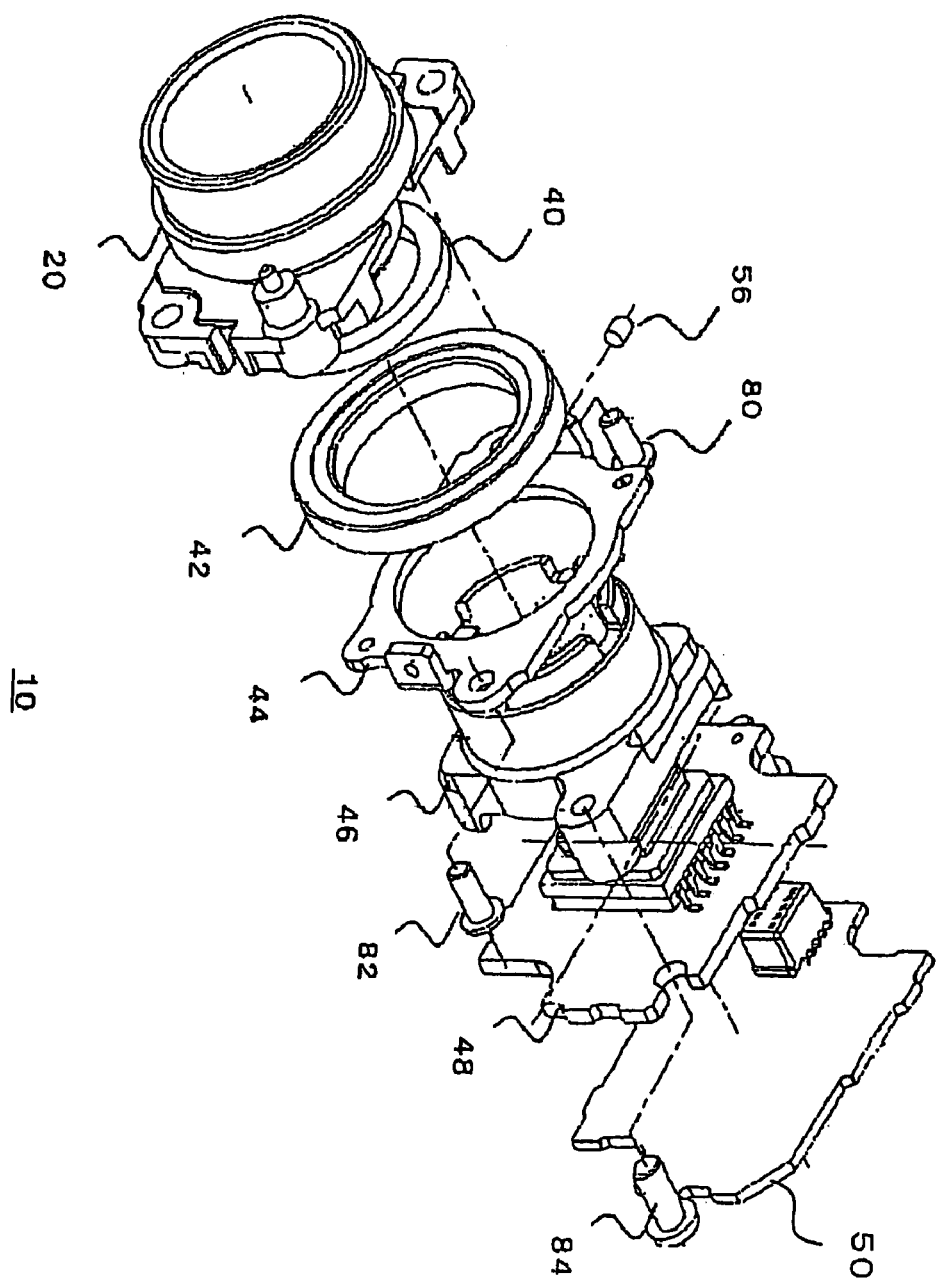
FIG. 5 is an exploded perspective view of the imaging unit according to the first embodiment.
Figure 6:
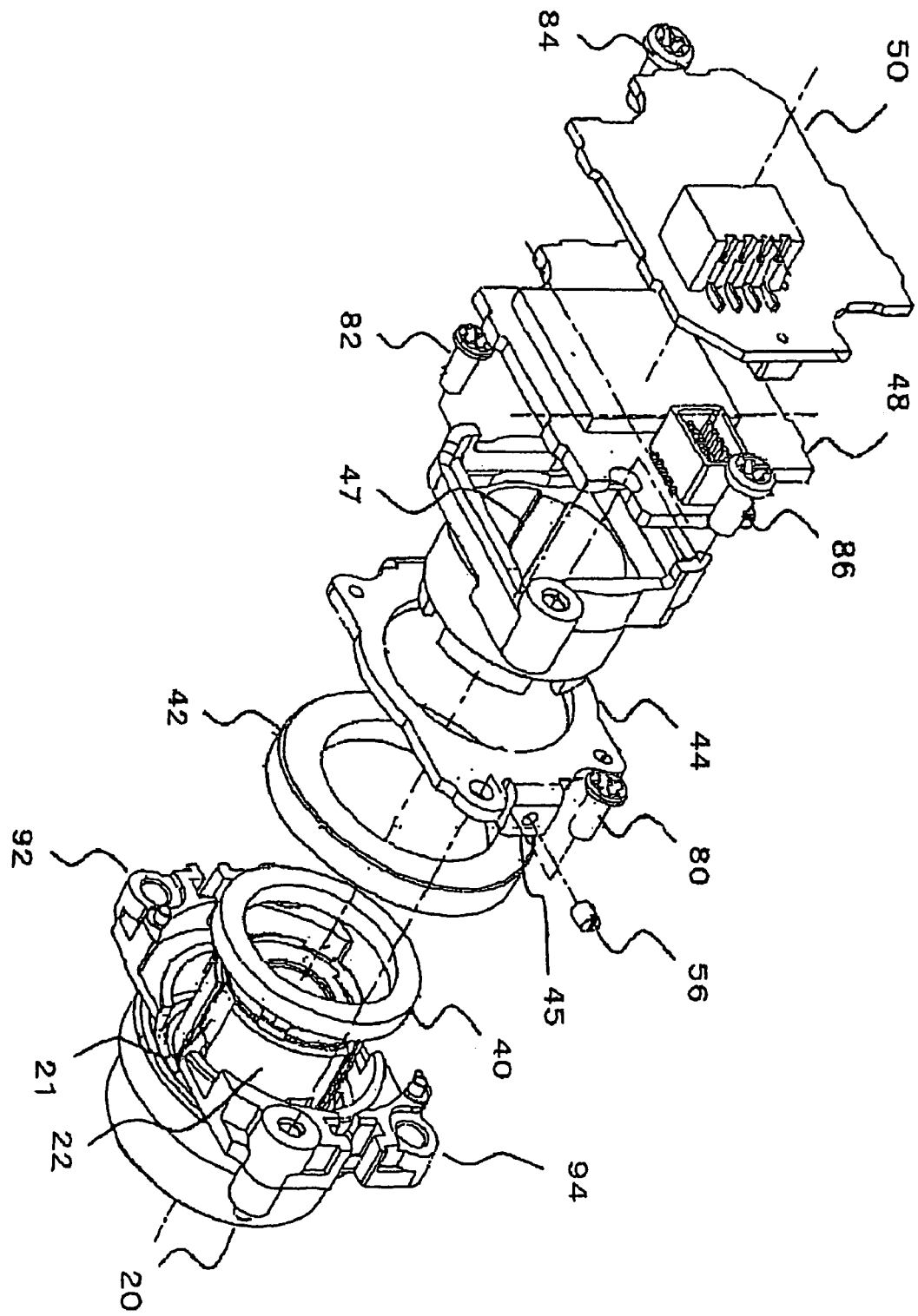
FIG. 6 is another exploded perspective view of the imaging unit according to the first embodiment.
Figure 7:
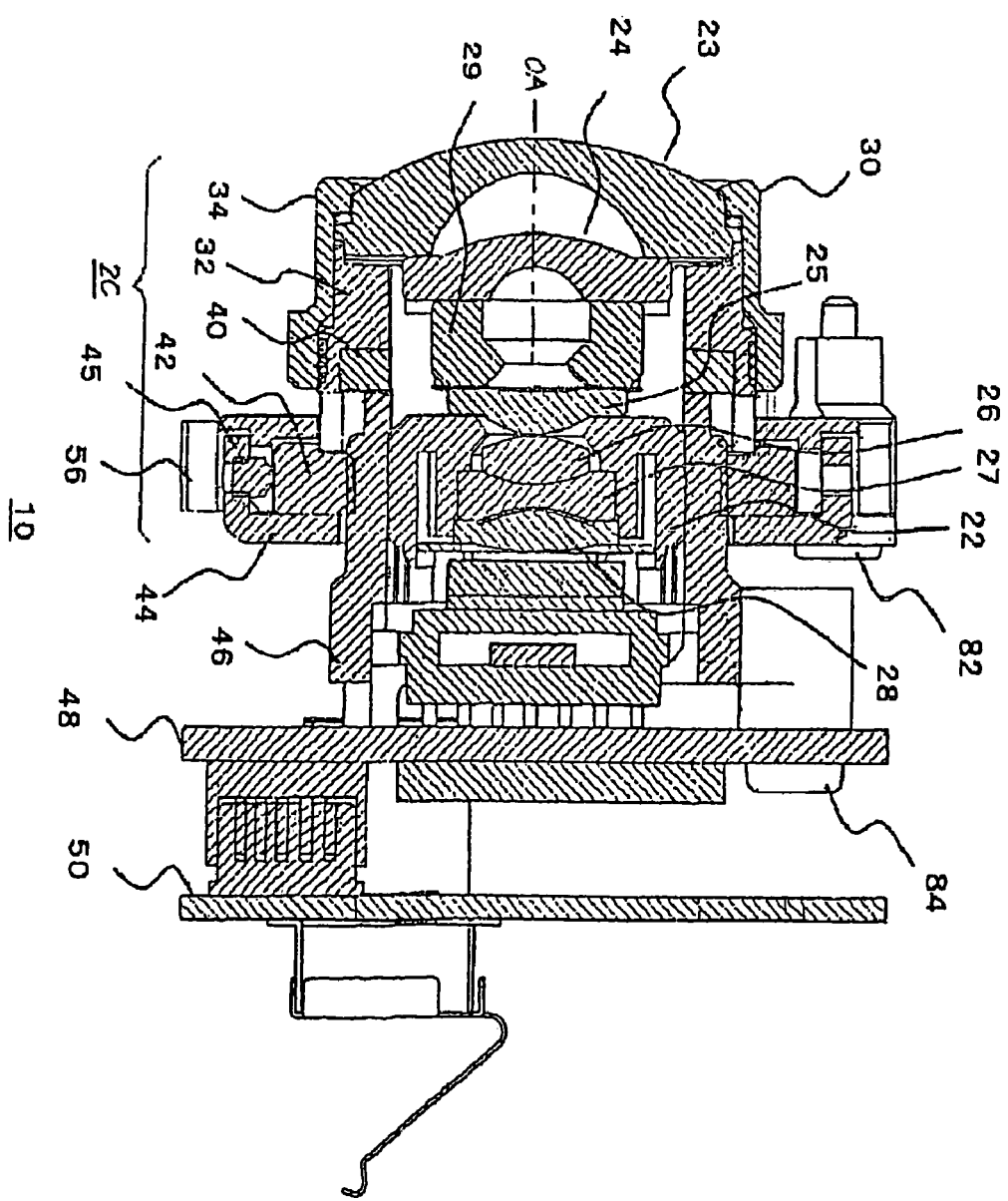
FIG. 7 is a sectional view of the imaging unit according to the first embodiment, taken on line A-A.

FIGS. 5 and 6 are exploded perspective views of the imaging unit 10. FIG. 7 is a sectional view taken across line A-A in the front view of the imaging unit 10 shown in FIG. 3. The imaging unit 10 has a lens assembly 20, a foam ring 40, an adjustment ring 42, a ring fixing plate 44, a lens holder 46, a CCD board 48 and a power supply board 50 in order of increasing distance from the object side.

The lens assembly 20 has a first lens 23, a second lens 24, a diaphragm 29, a third lens 25, a fourth lens 26, a fifth lens 27 and a sixth lens 28 as a wide-angle lens set in order of increasing distance from the object side. In the embodiment, a mask is provided between the diaphragm 29 and the third lens 25 so as to block rays of incident light from the effective light rays of the lens. The mask may be increased/decreased or moved in accordance with the actual performance of the lenses.

The first lens 23 has an outer circumferential portion of a step-cut structure, where an O-ring 34 is disposed. The first lens 23 is pressed substantially in the direction of an optical axis OA by a screwed type pressure member 30 fitted to the outer circumferential portion of a lens-barrel 32. In this case, the O-ring 34 is pressed by the pressure member 30 and the step-cut portion of the first lens 23. Thus, sealing is secured between the inner wall of the pressure member 30 and the step-cut portion of the first lens 23 so that waterproof performance can be obtained.

In a lens retention member 22 for retaining the fourth lens 26, the fifth lens 27, and the sixth lens 28, three key grooves 21 are provided linearly and in the positional relationship where the key grooves 21 divide the outer circumference of the lens retention member 22 equally into three. In FIG. 6, one key groove 21 is shown representatively. Since the number of key grooves 21 is not limited to three, a desired number of key grooves 21 can be provided.

The foam ring 40 is made from rubber foam, having an annular shape. The foam ring 40 is inserted into the lens assembly 20. The inside of the adjustment ring 42 is threaded. The adjustment ring 42 is fitted rotatably to the lens assembly 20.

The ring fixing plate 44 is fixed to the lens assembly 20 by first and second tap-tight screws 80 and 82 so as to put the adjustment ring 42 between the ring fixing plate 44 and the lens assembly 20. It is designed to prevent the adjustment ring 42 from falling away, while keeping the degree of freedom with which the adjustment ring 42 can rotate.

Three keys 47 to be key-fitted to the three key grooves 21 provided in the lens retention member 22 are provided linearly in the inside of the lens holder 46. In FIG. 6, one key 47 is shown representatively. Since the number of keys 47 is not limited to three, a desired number of keys 47 can be provided.

The outer circumference of the lens holder 46 is externally threaded in a predetermined length. The lens holder 46 can be screwed down to the threads provided in the inside of the adjustment ring 42. Thus, when the adjustment ring 42 rotates, the key-fitting serves as a guide to move the lens holder 46 forward/backward in the optical axis direction without rotating the lens holder 46.

When the lens holder 46 reaches a predetermined position just before the lens holder 46 is fitted to the lens assembly 20 and located in a design focus position, the object-side end portion of the lens holder 46 abuts against the foam ring 40. Due to pretension generated when the foam ring 40 is pressed and compressed by the lens holder 46, the threaded portions of the adjustment ring 42 and the lens holder 46 where they are fitted to each other, and the structure portion of the adjustment ring 42 are gathered in one direction as a whole. Therefore, an influence of the dimensional variation of a portion housing the adjustment ring 42 caused by the backlash between the threaded portions or the dimensional variations of constituent parts is avoided.

In the ring fixing plate 44, an internally threaded portion 45 is formed to be parallel with the outer circumference of the adjustment ring 42. A ring fixing screw 56 having a truncated cone point is incorporated into the internally threaded portion 45 so as to integrate the adjustment ring 42 with the ring fixing plate 44. Thus, the focus is fixed. In addition, since the lens-barrel 32 is not directly fixed when the focus is fixed, no load is applied to the lenses. Thus, since no deformation occurs in the lenses, the quality of imaging can be prevented from lowering.

The CCD board 48 on which a CCD as an imaging device is mounted is fixed to the lens holder 46 by third and fourth tap-tight screws 84 and 86. The lens holder 46 is key-fitted to the lens assembly 20 as described above, and the position thereof is adjusted by the adjustment ring 42. When the accuracy of each part is managed properly, positioning such as so-called "vertical adjustment" or "tilt and shift adjustment" becomes dispensable. When the CCD board 48 is attached to be perpendicular to the lens holder 46, the imaging surface becomes perpendicular to the optical axis direction. Accordingly, when the optical axis direction is the Z-axis direction, the imaging surface may be adjusted only in the X-axis and Y-axis directions and in the rotation direction (θ). The tap-tight screws may be replaced by tapping screws or normal screws if occasion demands.

The power supply board 50 having a function of supplying electric power to the CCD board 48 and a function of outputting a signal supplied from the CCD board 48 to the outside of the imaging unit 10 is attached to the CCD board 48. The imaging unit 10 is screwed down to the front casing 2 through first and second casing set screw holes 92 and 94 provided in the lens assembly 20.

According to the configuration described above, since the focus can be adjusted without adjusting the lenses themselves, the efficiency of adjustment work is improved. In addition, since the adjustment ring 42 is used, focus adjustment can be performed independently of so-called "optical axis adjustment" for aligning the lens optical axis with a predetermined pixel of an imaging device. Further, since the focus can be fixed by fixing the adjustment ring 42, no load is applied directly to the lenses. It is therefore possible to prevent deformation from occurring in the lenses.

Figure 8:
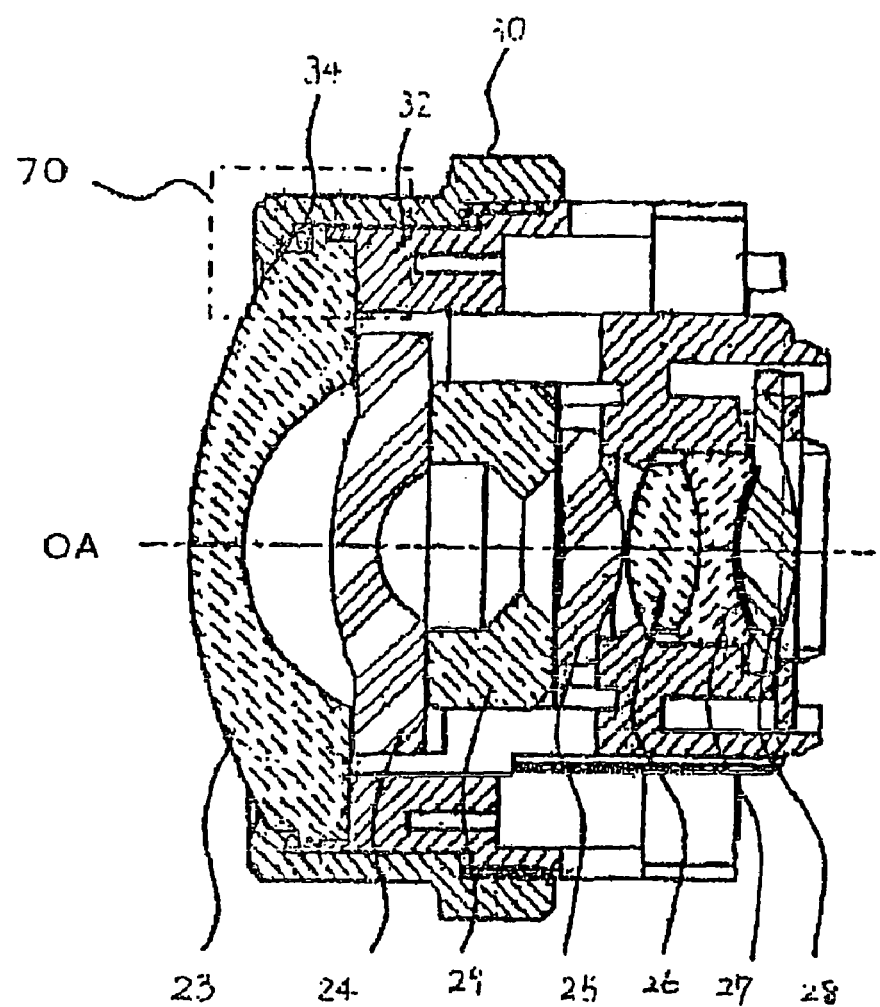
FIG. 8 is a sectional view of a lens assembly according to the first embodiment.
Figure 9:
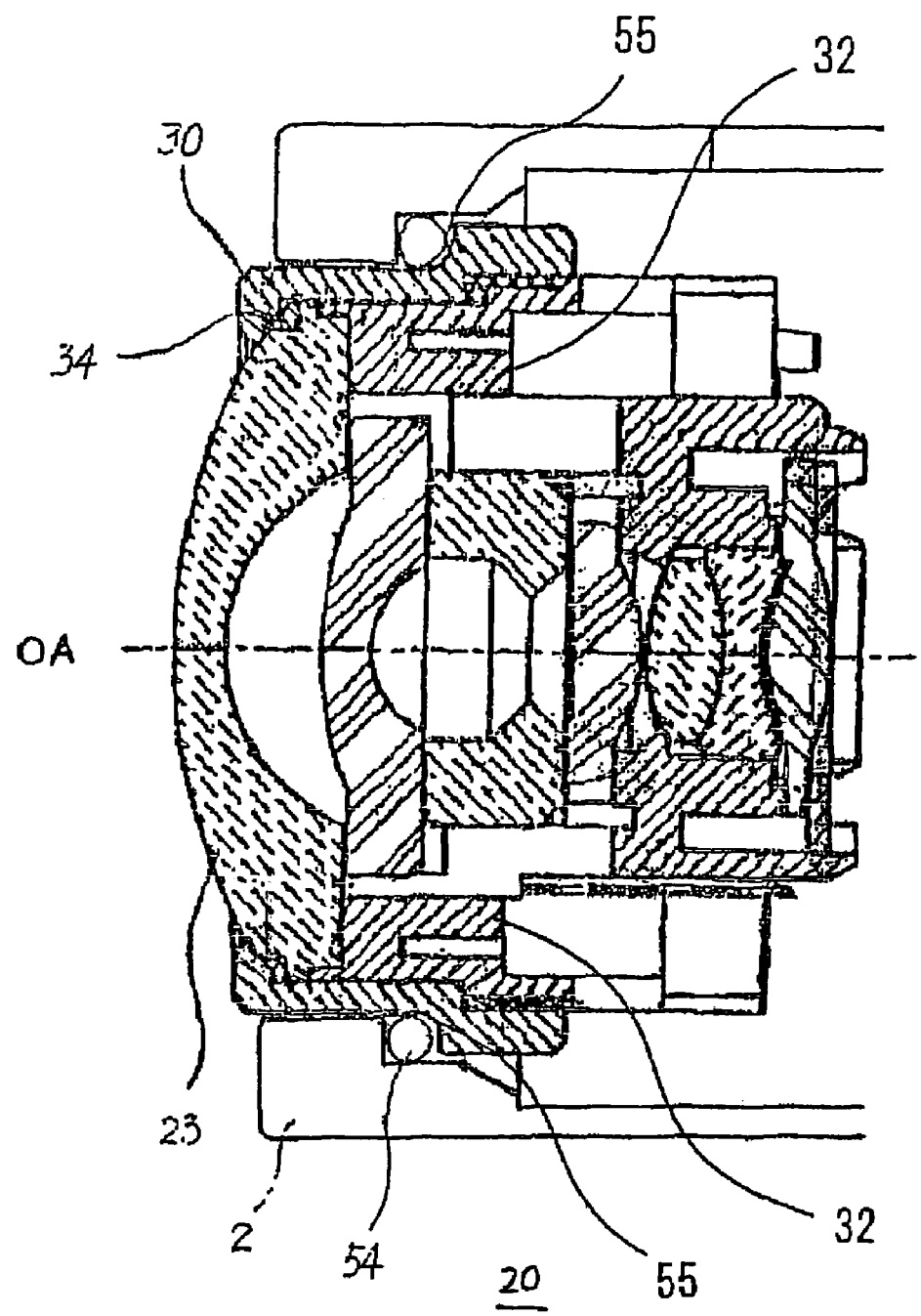
FIG. 9 is a sectional view showing the state where the opening of the front casing according the first embodiment is caulked with a pressure member while the opening of the pressure member is caulked with a first lens.

The lens assembly 20 will be described in detail. FIG. 8 is a sectional view of the lens assembly 20. FIG. 9 is a sectional view in which the opening of the front casing 2 is caulked with the pressure member 30 and the first lens 23. The lens-barrel 32 is disposed on the object side of the lens assembly 20. The first lens 23 is disposed on the object side of the lens-barrel 32. The O-ring 34 as a sealing material is disposed in the step-cut structure of the outer circumferential portion of the first lens 23. The first lens 23 is pressed through the O-ring 34 substantially in the direction of the optical axis OA by the pressure member 30. In the embodiment, the O-ring 34 is made out of HNBR (Hydrogenated Nitrile-Butadiene Rubber). Generally, NBR (Nitrile-Butadiene Rubber) is used for sealing material in a waterproof camera or the like because it has oil resistance or weather resistance. Further, HNBR which is improved in ozone resistance, heat resistance or weather resistance of NBR to have a longer life against degradation is more preferable as the sealing material. A predetermined surface on the image-surface side of the first lens 23 abuts against a predetermined surface on the object side of the second lens 24, so that the first lens 23 is positioned in the direction of the optical axis OA.

As shown in FIG. 9, a step 55 is formed in the circumferential edge portion of the pressure member 30. An O-ring 54 which is different from the aforementioned one is disposed on the step 55. When the pressure member 30 is inserted into the opening of the front casing 2, protrusions 91 provided in the lens assembly 20 (shown in FIG. 2) are positioned in not-shown recess portions provided in the back surface of the front casing 2. Then, screws are inserted into holes 90 provided in the lens assembly 20 and screwed down to not-shown bosses provided in the back surface of the front casing 2. Thus, the opening of the front casing 2 is caulked off with the pressure member 30.

Figure 10:
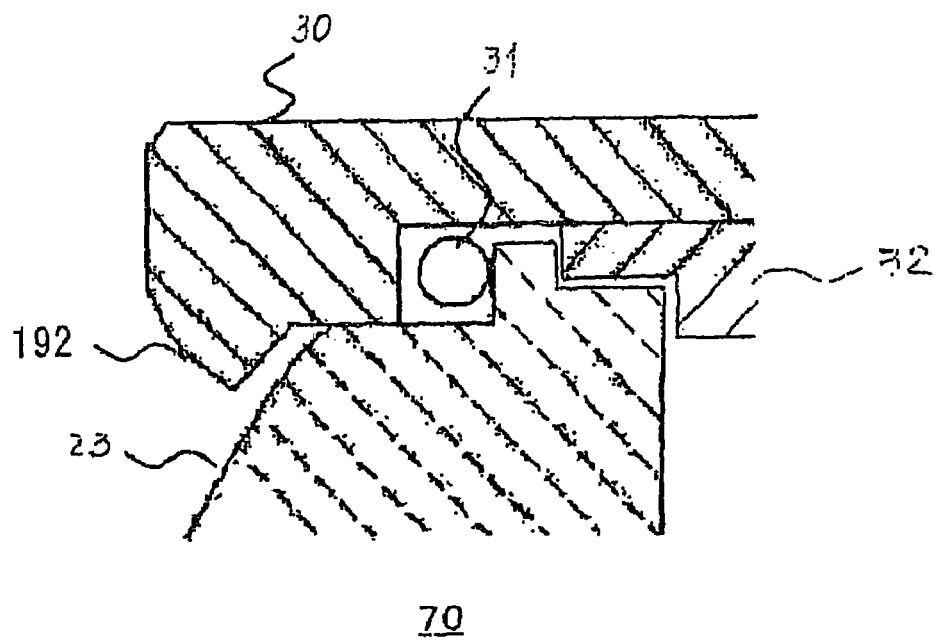
FIG. 10 is a sectional view showing the state where the opening of the lens assembly is caulked with the first lens, which has not yet been pressed by the pressure member.
Figure 11:
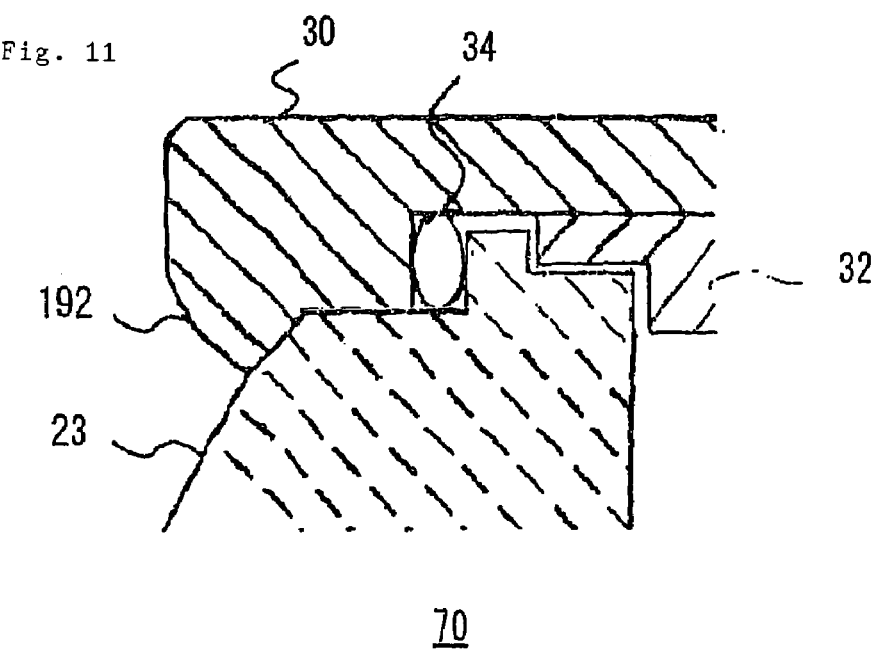
FIG. 11 is a sectional view showing the state where the opening of the lens assembly is caulked with the first lens, which has been pressed by the pressure member.

FIGS. 10 and 11 are enlarged views of a region 70 shown in the sectional view of the lens assembly 20 in FIG. 8. The structure for caulked the opening of the lens assembly 20 with the first lens 23 will be described with reference to FIGS. 10 and 11.

The first lens 23 is retained and housed on the object side of the lens-barrel 32. A small claw-like and annular protrusion 192 (pressing portion) curved inward is provided in an end portion of the pressure member 30. The pressure member 30 is screwed onto the lens-barrel 32 so that the O-ring 34 disposed between the first lens 23 and the pressure member 30 is pressed and deformed. Thus, the opening of the pressure member 30 is sealed off with the first lens 23. In this case, the following consideration in design is given.

The O-ring 34 is designed to have an inner diameter larger than the outer diameter of the first lens 23 and an outer diameter smaller than the inner diameter of the pressure member 30. In such a manner, as shown in FIG. 10, the O-ring 34 is disposed without being pressed or deformed before the pressure member 30 is screwed onto the lens-barrel 32. As shown in FIG. 11, even after the pressure member 30 is screwed onto the lens-barrel 32, the O-ring 34 can avoid being influenced by any large frictional force which is caused by contact with the inner wall surface of the pressure member 30 or the edge portion of the first lens 23. As a result, there occurs no unnecessary force of friction or no unnecessary force of torsion in the rotating direction in the O-ring 34. Thus, the O-ring 34 hardly suffers damage.

Further, in optical design, it is taken for granted that an object-side of the first lens is coated for antireflection in order to prevent a ghost image, a flare or the like caused by diffused reflection or backlight inside the lenses. However, an outdoor imaging apparatus may work in a harsh environment where the surface of a first lens is exposed so that dust or the like may hit the lens surface due to wind or the like. In such a case, it is likely that the coating on the surface of the first lens peels off partially, so that deterioration of quality of an image to be picked up may occur. A crack or the like in the coating caused by thermal expansion brings about a similar problem. In this embodiment, therefore, in the case that the imaging apparatus works in a harsh environment, a way of thinking adverse to the common sense in design in the background art is adopted. That is, the exterior of the first lens is not coated, and a lens is configured to be difficult to produce a ghost image, a flare or the like in spite of the absence of the coating.

Not to say, in the case that the imaging apparatus is not used in a harsh environment, the coating may be performed just as in the conventional art. On the other hand, even for indoor use, when there is a fear that some object may hit the first lens, or when the first lens is apt to be affected by a change in environmental temperature, the first lens may not be coated.

The imaging apparatus according to the embodiment adopting the structure in which the opening of the front casing 2 is caulked with the pressure member 30 has the following difference in operation and effect from an imaging apparatus adopting the structure in which the opening of a front casing is caulked with a lens-barrel, for example, as disclosed in FIG. 11 of JP-A-2002-90603.

(1) Temperature Characteristic

Since an outdoor camera is directly exposed to the outside air or receiving direct sunlight, the outdoor camera suffers a large temperature change. In a structure where a lens-barrel is exposed to the outside of a casing, strain, torsion or deformation occurs in the lens-barrel due to a temperature change. Therefore, the accuracy of the positions where lenses are attached goes down. The lens-barrel is fine itself so that its optical performance is affected by only a misalignment of $1/100$ mm or less.

On the other hand, in the structure where the lens-barrel is not exposed from the casing as in the embodiment, there is no influence on the accuracy of the positions where the lenses are attached, even when the pressure member 30 is deformed to some extent. The accuracy of the positions-where the lenses are attached is compensated by the lens-barrel. When the pressure member 30 is made of a metal material such as an anodized aluminum material or a stainless steel material, thermal deformation can be further prevented.

(2) Strength

In an outdoor camera, particularly an on-vehicle camera, a force may be applied to a camera portion at the time of car wash or maintenance. When a lens-barrel is exposed to the outside, the force is directly applied to the lens-barrel so as to deform the lens-barrel. Thus, the deformation may affect the accuracy of the positions where lenses are attached. On the other hand, the force is applied to the pressure member 30 in the configuration where the lens-barrel is not exposed from the casing as in the embodiment. Thus, the force applied to the lens-barrel is suppressed so that the deformation of the lens-barrel can be suppressed. Accordingly, it is hardly an influence on the accuracy of the positions where the lenses are attached. When the pressure member 30 is made of the aforementioned metal material, the deformation caused by external impact can be further prevented.

(3) Chemical Resistance

An outdoor camera, particularly an on-vehicle camera or the like, is apt to be exposed to fats and oils such as wax, and can be corroded by corrosive chemicals such as polymers. In the configuration where a lens-barrel is exposed, there is a fear that the accuracy of the positions where lenses are attached is lowered due to corrosion of the lens-barrel. In the embodiment, however, the lens-barrel is not exposed from the casing. Thus, the corrosion of the lens-barrel is prevented so that the accuracy of the positions where the lenses are attached can be secured. When the pressure member 30 is made of the aforementioned metal material, the corrosion can be further prevented.

(4) Tamper Resistance

It is necessary to assume that an outdoor camera, particularly an on-vehicle camera or the like, may be ill-used from outside. In the configuration where a lens-barrel is exposed, a force is directly applied to the lens-barrel so that there occurs a misalignment among lenses. In addition, there is a fear that a heat-sealed portion is cut or peeled off with a cutter or the like so that the first lens 23 is detached. On the other hand, in the embodiment, the lens-barrel 32 is not exposed from the casing. The first lens 23 is not detached unless the casing is opened. Thus, the imaging apparatus is more durable. When the pressure member 30 is made of the aforementioned metal material, the tamper resistance is further enhanced.

(5) Properties with Age

Each member of the imaging apparatus deteriorates over time. Particularly, a member exposed to the outside deteriorates faster than any internal member. In the configuration where the lens-barrel 32 is exposed and the lenses are retained in the lens-barrel 32 by heat deposition, there is a fear that the lenses are detached due to creep rupture in the portions retaining the lenses. On the other hand, in the embodiment, the lens-barrel 32 is not exposed from the casing. Thus, the first lens 23 is hardly detached so that the imaging apparatus can withstand variation with time. When the pressure member 30 is made of the aforementioned metal material, the imaging apparatus can further withstand variation with time.

(6) Maintainability

In the configuration where lenses are caulked with a lens-barrel by heat deposition, the lenses and the lens-barrel 32 have to be exchanged together at the time of maintenance. This results in increase in the cost. In the embodiment, however, the first lens 23 is not integrally fixed with the lens-barrel. Thus, each lens, the lens-barrel 32 and the pressure member 30 can be exchanged individually. Thus, the embodiment is advantageous in view of cost.

(7) Easiness to Manufacture

In the configuration where the lenses are retained in the lens-barrel 32 by heat deposition, dimensional variations of all the parts fixed by the heat deposition are piled up so that there appears a variation in height among the lenses to be caulked. Thus, it is difficult to keep the caulking strength uniform. With the configuration according to the embodiment, however, the lenses are fixed to the lens-barrel 32 without using heat. Accordingly, the positions where the lenses are attached do not depend on the dimensional variations of parts. The embodiment is advantageous in view of production control or yield. When the pressure member 30 is made of the aforementioned metal material, the accuracy of the positions where the lenses are attached is further improved.

(8) Waterproof Performance

When sealing with an O-ring is performed, the compressibility of the O-ring pressed and deformed is generally aimed at a lower limit of 8% and an upper limit of 40%. It is, however, preferable that the controlled value of the compressibility is changed in accordance with the wire diameter of the O-ring to be used. That is, when the wire diameter is small, a large compressibility is secured to increase the tight contact area. On the contrary, when the wire diameter is large, the compressibility may be made small because it is not necessary to secure a tight contact area larger than necessary. The compressibility is generally set in consideration of tolerance or deterioration with time.

On the other hand, according to general documents published by makers and the like, the compressibility of an O-ring for attaining waterproofing is preferably 15-40% when the wire diameter of the O-ring is not larger than 2 mm, 10-30% when the wire diameter is larger than 2 mm and smaller than 4 mm, and 8-20% when the wire diameter is not smaller than 4 mm. In the embodiment, the controlled value of the compressibility is set to be 15-35% with a margin of 5% on the higher compression side in consideration of compression set.

In such a manner, the compressibility has to be severely controlled when the sealing is performed with an O-ring. However, in the configuration where lenses are retained in the lens-barrel 32 by heat deposition, the height of the caulking portion has a variation due to the dimensional variations of the lens constituent parts as described above. Thus, it is difficult to secure a predetermined caulking width by use of a heat deposition jig. As a result, there occurs a variation in compressibility of the O-ring. It is therefore difficult to achieve desired waterproof performance. On the other hand, with the configuration according to the embodiment, the screwing quantity or force of the pressure member is controlled so that the compressibility of the O-ring can be controlled with extreme ease. Thus, the imaging apparatus can be provided with desired waterproof performance at a high yield ratio.

When the pressure member 30 is made of the aforementioned metal material, the compressibility of the O-ring can be controlled more severely. Further, since the dimensional accuracy is also improved in comparison with that in a general resin molding, the compressibility can be also controlled more easily.

(9) Miniaturization

In the configuration where lenses are retained in the lens-barrel by heat deposition, it is difficult to control the compressibility of the O-ring as described above. For this reason, O-rings with diameters smaller than a predetermined value cannot be adopted. It is therefore difficult to miniaturize the imaging apparatus. On the other hand, with the configuration according to the embodiment, an O-ring with an extremely small diameter can be adopted. Thus, the imaging apparatus can be designed to be smaller in size. Also in this case, when the pressure member 30 is made of the aforementioned metal material, the compressibility of the O-ring can be controlled more severely. Thus, the imaging apparatus can be further miniaturized.

(10) Vibration-Proof Performance

In the configuration where lenses are retained in a lens-barrel by heat deposition, particularly in the case of an on-vehicle camera or the like, there is a fear that the retention is removed due to vibration of the vehicle or the like. On the other hand, such a problem does not occur in the configuration according to the embodiment.

(11) Others

In addition to the above description, the configuration according to the embodiment can support casings having different opening dimensions by changing the pressure member only. Therefore, the flexibility in design is high. In addition, when the pressure member exposed to the outside is made of the aforementioned metal material or the like, an engraved silk screen printing or the like can be performed on the pressure member. Further, when a decorating treatment or the like is performed, the beauty can be improved easily.

The imaging apparatus according to the embodiment further has the following difference in operation and effect compared with an imaging apparatus having a structure where the opening of the front casing is caulked with the first lens, for example, as disclosed in JP-A-2002-90603 or JP-A-6-55871 (Utility Model) described previously.

According to the conventional techniques, the accuracy of the position where the first lens is attached is secured by the front casing generally molded out of resin. On the other hand, the second and following lenses are indeed retained and housed in the lens-barrel typically molded out of resin likewise. However, due to the structure where the lens-barrel itself is attached to the front casing, the accuracy of the positions where the second and following lenses are attached is lowered by the accuracy of the position where the lens-barrel is attached to the front casing, in addition to the accuracy of the lens-barrel itself. Accordingly, the accuracy between the first lens and the second lens is degraded so that the performance of the optical system is susceptible to improvement. On the other hand, according to the embodiment, the accuracy between the first lens and the second lens can be determined by the surface accuracies of the respective lenses. Thus, the imaging apparatus whose optical system has very high accuracy can be obtained.

The embodiment described above is an exemplification. It will be understood by those skilled in the art that various modifications can be made as to constituent components thereof and combinations thereof, and such modifications are also included in the scope of the invention. The modifications will be described below.

(First Modification)

Figure 12:
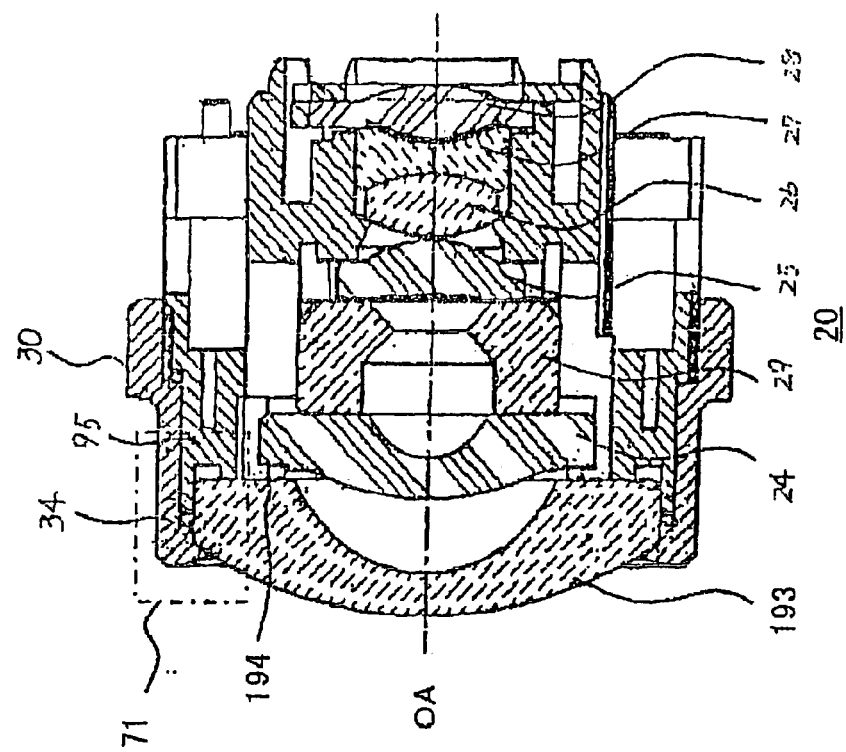
FIG. 12 is a sectional view of a lens assembly according to a first modification.

FIG. 12 is a sectional view of the lens assembly 20 according to the first modification. Although the O-ring 34 is disposed in a clearance between the first lens 23 and the pressure member 30 so as to be pressed by these members in FIG. 10, the O-ring 34 is disposed in the clearance between the pressure member 30 and a lens-barrel 95 so as to be pressed by these members in FIG. 12.

The lens-barrel 95 is disposed on an object-side portion of the lens assembly 20. A first lens 193 is disposed on the object side of the lens-barrel 95. The O-ring 34 made from a material such as HNBR is disposed in a clearance which is in a front end portion of the lens-barrel 95 and which is created by the step-cut structure of the pressure member 30. The first lens 193 is pressed substantially in the direction of the optical axis OA by the pressure member 30.

The first lens 193 is retained and housed in the lens-barrel 95. Then, the positioning in the direction of the optical axis OA, the centering are performed on the first lens 193. When the pressure member 30 is screwed in, the first lens 193 is pressed in the direction of the optical axis OA, and the O-ring 34 is pressed and deformed. Sealing with the O-ring 34 is performed in the outer circumferential portion of the first lens 193 and the front end portion of the lens-barrel 95.

In the aforementioned description, a predetermined surface on the image-surface side of the first lens 23 abuts against a predetermined surface on the object side of the second lens 24 so that the first lens 23 was positioned in the direction of the optical axis OA. On the other hand, in the modification, the first lens 193 is positioned in the direction of the optical axis OA by the lens-barrel 95. Thus, another O-ring 194 is put in the clearance formed between the object side of the second lens 24 and the image-surface side of the first lens 193, so as to press the second lens 24 in the direction of the optical axis OA to thereby fix the position where the second lens 24 is attached. However, such a fixing member is not limited to the O-ring 194. General elastic bodies having various shapes and using various raw materials, such as a plate spring, may be used. A collar formed in the outer circumferential surface of the first lens 23 in FIG. 10 does not have to be formed in the first lens 193 in FIG. 12. Therefore, the lens configuration becomes simple.

Figure 13:
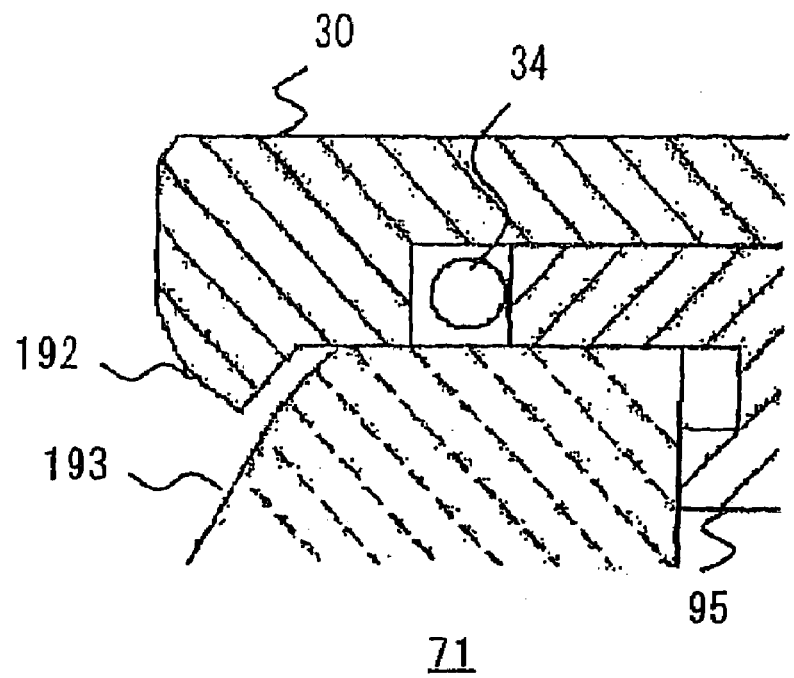
FIG. 13 is an enlarged sectional view of a given region of the lens assembly in FIG. 12.
Figure 14:
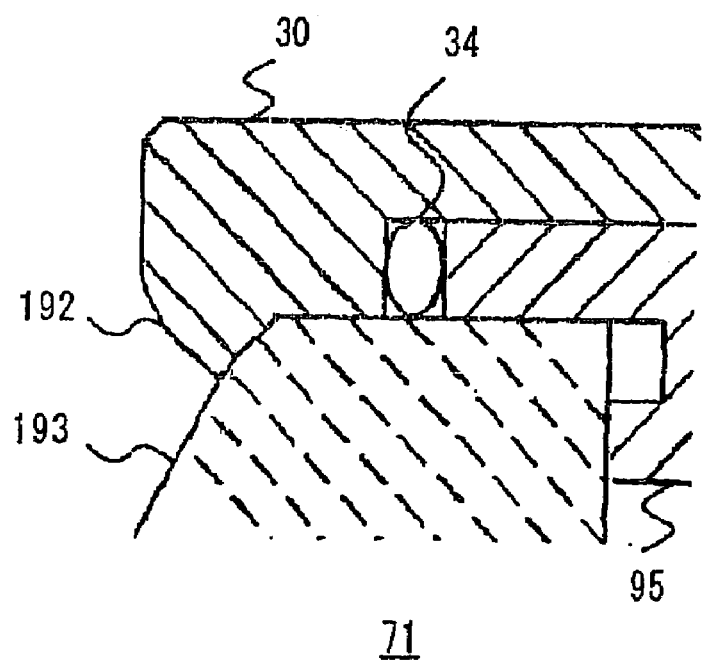
FIG. 14 is an enlarged sectional view of the given region of the lens assembly in FIG. 12.

FIGS. 13 and 14 are enlarged views of a region 71 of the lens assembly 20 shown in the sectional view of FIG. 12. The structure where the opening of the lens assembly 20 is caulked with the first lens 193 will be described.

The first lens 193 is retained and housed on the object side of the lens-barrel 95, and a small claw-like and annular protrusion 192 (pressing portion) curved inward is provided in an end portion of the pressure member 30. The pressure member 30 is screwed onto the lens-barrel 95 so that the first lens 193 is pressed by the lens-barrel 95 so as to be positioned in the optical axis direction. At the same time, the O-ring 34 disposed in the outer circumferential portion of the first lens 193 and in the front end portion of the lens-barrel 95 is pressed and deformed. Therefore, sealing is secured.

The O-ring 34 is designed to have an inner diameter larger than the outer diameter of the first lens 193 and an outer diameter smaller than the inner diameter of the pressure member 30. In such a manner, as shown in FIG. 13, the O-ring 34 is disposed without being pressed or deformed before the pressure member 30 is screwed onto the lens-barrel 95. As shown in FIG. 14, even after the pressure member 30 is screwed onto the lens-barrel 95, the O-ring 34 can avoid being influenced by any large frictional force which is caused by contact with the inner wall surface of the pressure member 30 or the front end portion of the lens-barrel 95. Thus, the effect as described previously can be obtained.

Figure 15:
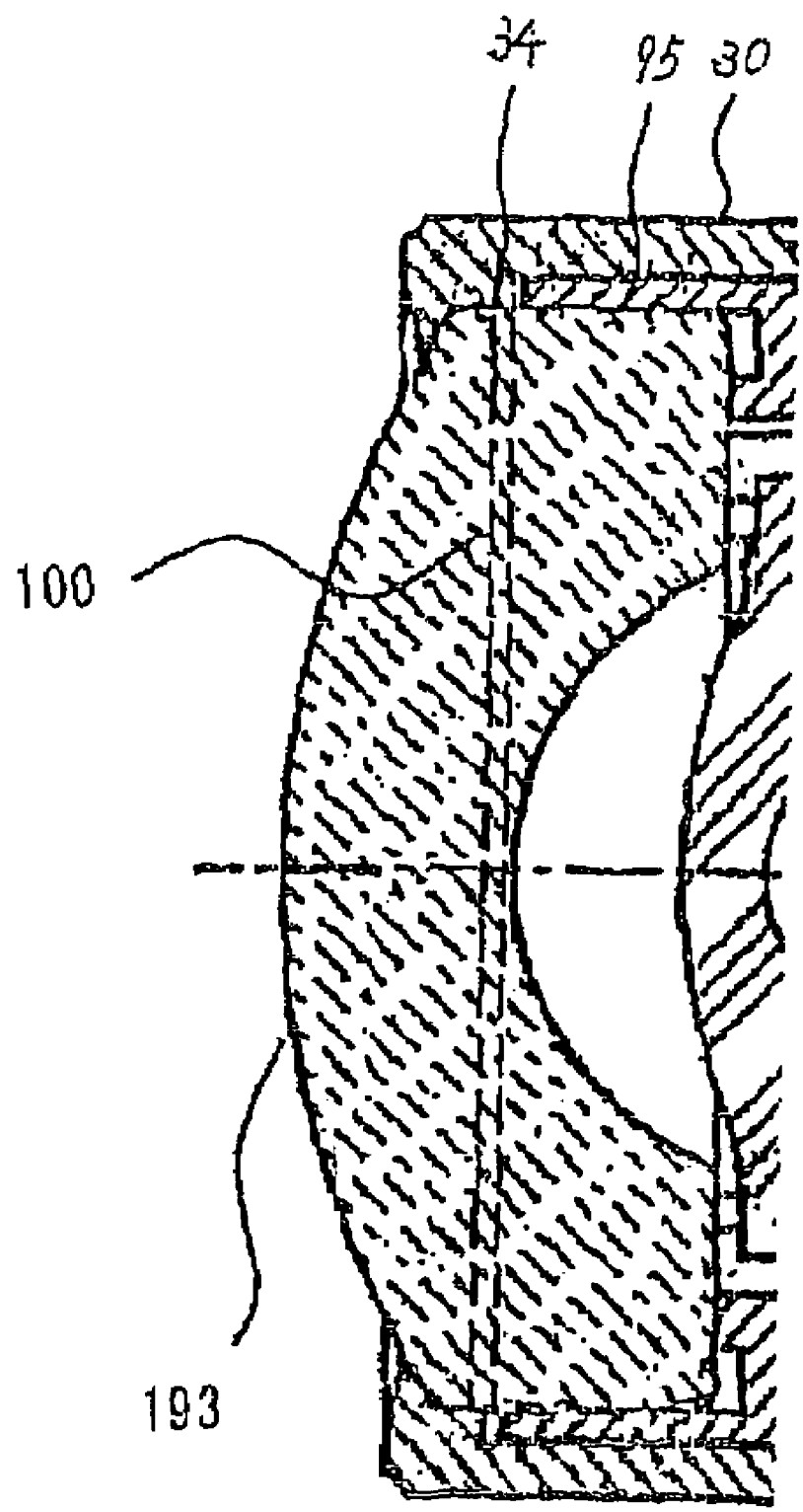
FIG. 15 is a sectional view showing the relationship between the configuration of the first lens and an O-ring used in the outer circumferential portion of the first lens.

Consideration in design can be given to the deformation of lenses. FIG. 15 is an enlarged sectional view showing the positional relationship between the shape of the first lens 193 and the O-ring 34 used in the outer circumferential portion of the first lens 193. As shown in FIG. 15, in this lens assembly 20, the thickness of the first lens 193 continuously exists on a line 100 where a force occurs in a radial direction of the first lens 193 due to the compression of the O-ring 34 as soon as the pressure member 30 is screwed in. Therefore, the concave portion of the first lens 193 is hardly deformed due to the force from the O-ring 34, and it is not necessary to use a lens having a high hardness. As a result, this configuration is advantageous in view of the manufacturing cost or the flexibility in design of a lens. Particularly, when external impact is great, this configuration is advantageous.

Figure 16:
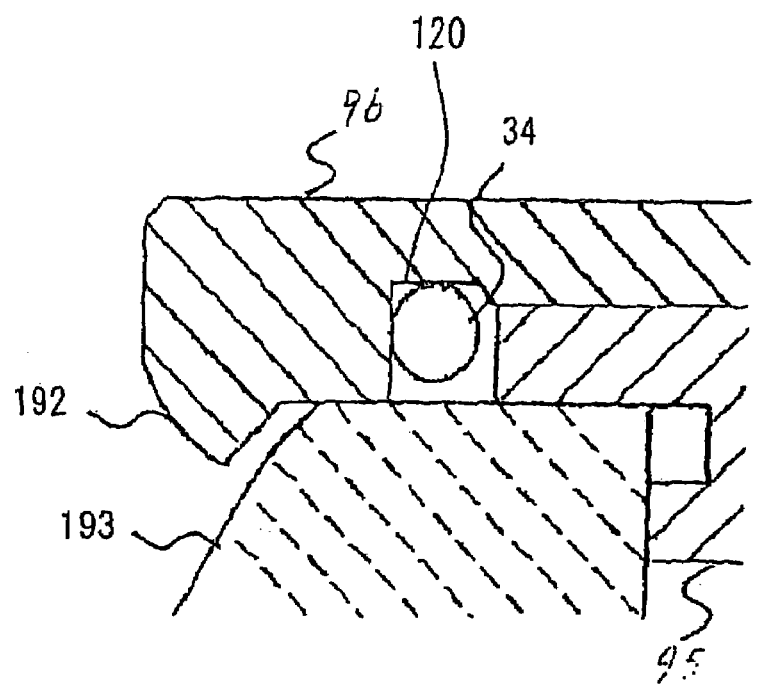
FIG. 16 is a sectional view showing a modification of the configuration in which the opening of the lens assembly shown in FIG. 13 is caulked.
Figure 17:
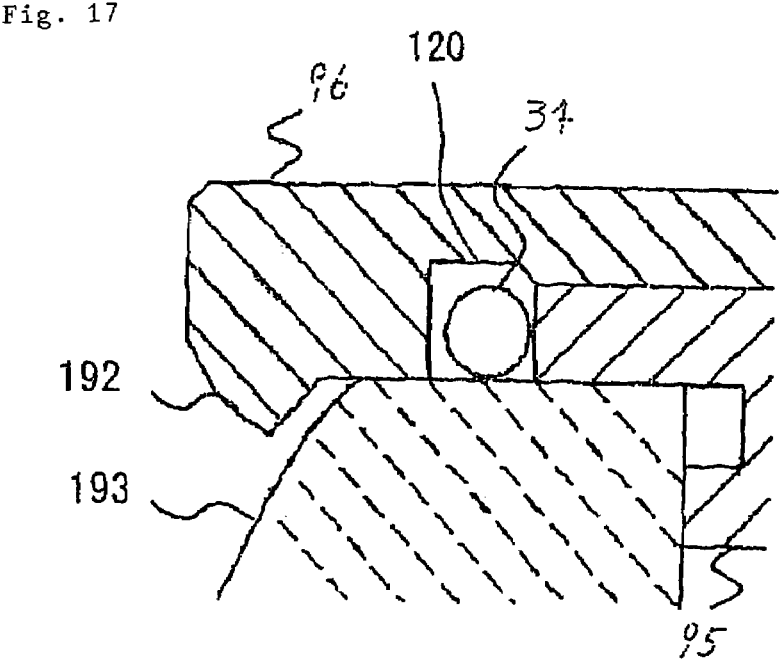
FIG. 17 is a sectional view showing a modification of the configuration in which the opening of the lens assembly shown in FIG. 14 is caulked.

FIGS. 16 and 17 are sectional views showing modifications of the configuration for caulking the opening of the lens assembly 20. The configuration, except for the pressure member 30, is similar to that in FIGS. 13 and 14, and description thereof will be therefore omitted here.

A pressure member 96 has a groove 120 in its inner wall surface correspondingly to the outer circumferential portion of the first lens 193 where the O-ring 34 is to be disposed. In FIG. 16, the O-ring 34 is provided to have a diameter large enough to abut against the pressure member 96. In FIG. 17, the O-ring 34 is provided to have a diameter small enough to abut against the first lens 193. Due to the groove 120, a force is hardly applied to the pressure member 96 in a direction to make the pressure member 96 leave the first lens 193 even if the O-ring 34 is pressed and deformed. Thus, the first lens 193 can be securely retained in the lens-barrel 95.

Figure 18:
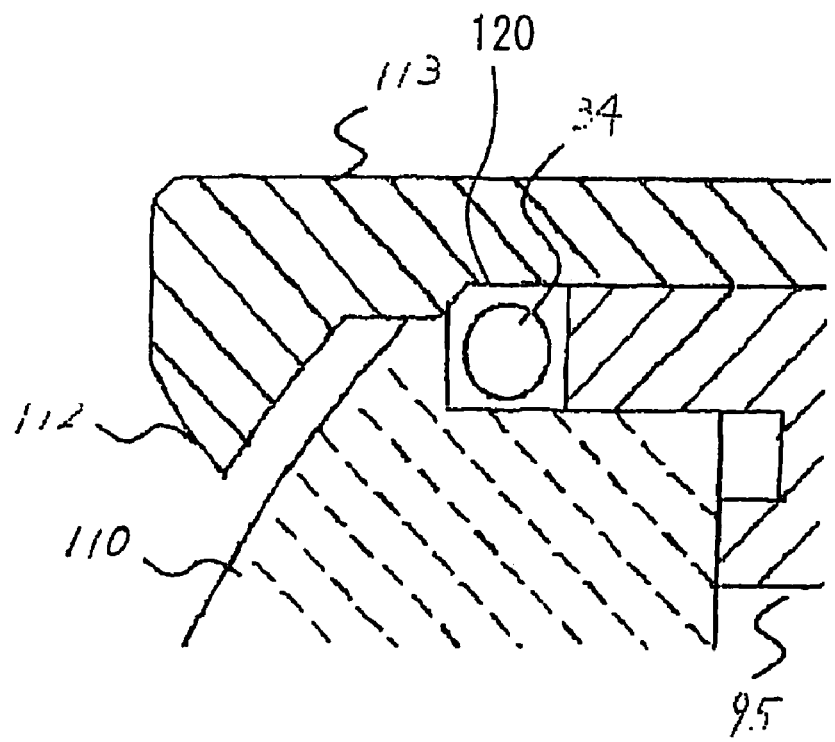
FIG. 18 is a sectional view showing another modification of the configuration in which the opening of the lens assembly shown in FIGS. 13 and 14 is caulked.

FIG. 18 is a sectional view showing a modification of the configuration where the opening of the lens assembly 20 is caulked as shown in FIGS. 13 and 14. A first lens 110 has a step provided in its outer circumferential portion so that the diameter of the image-surface side is reduced. The O-ring 34 is disposed in the step portion. A pressure member 113 has a claw-like protrusion 112 (pressing portion) in its front end, and a groove 120 is formed in a portion where the O-ring 34 is to be disposed. Since there is a step in the first lens 110, the pressure member 113 has only a step corresponding to the groove 120. Therefore, the protrusion 112 (pressing portion) is larger than that in FIGS. 13 and 14.

In the aforementioned configuration, the pressure member 113 is screwed onto the lens-barrel 95 so that the first lens 110 is retained in the lens-barrel 95 by the pressure member 113. At the same time, the O-ring 34 is pressed and deformed by the front end portion of the lens-barrel 95 and the first lens 110 to be caulked.

Figure 19:
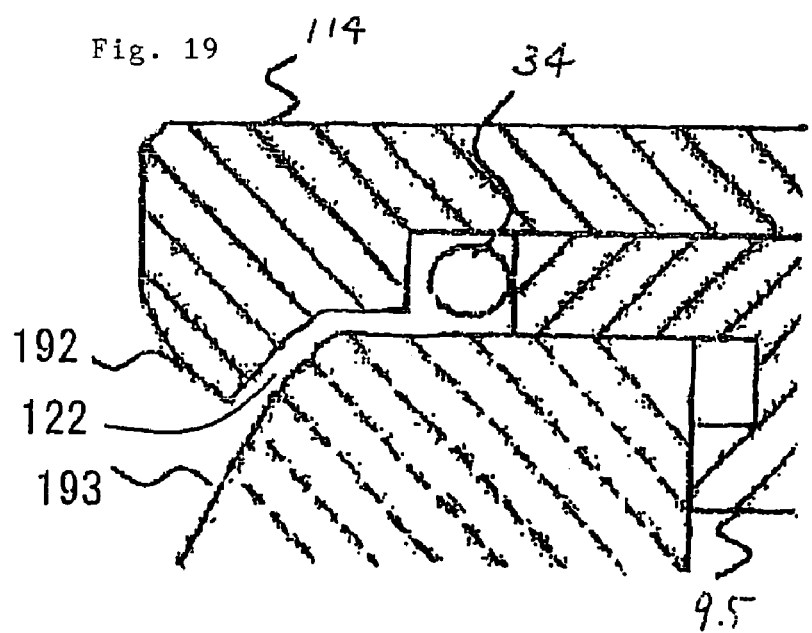
FIG. 19 is a sectional view showing another modification of FIG. 13.
Figure 20:
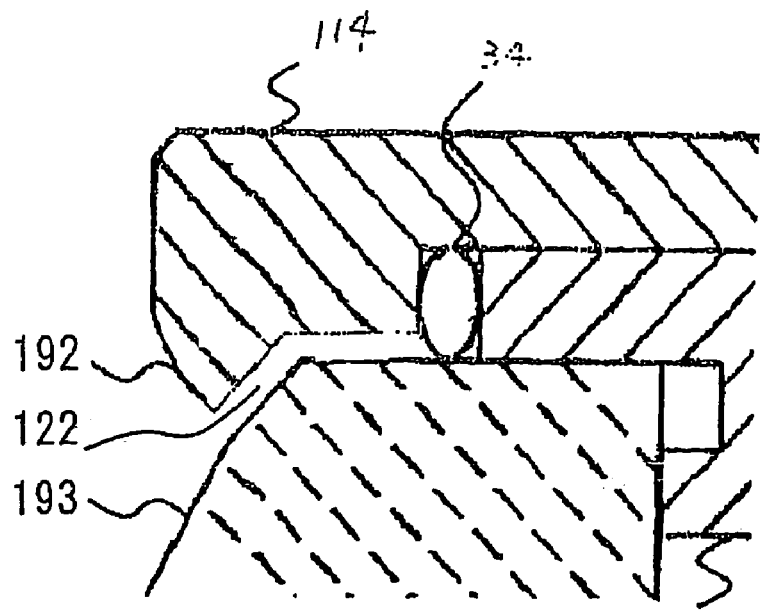
FIG. 20 is a sectional view showing another modification of FIG. 14.

FIGS. 19 and 20 show another modification of the configuration in FIGS. 13 and 14. The configuration in FIGS. 19 and 20 is the same as that in FIGS. 13 and 14, except that a clearance 122 is provided between the side surface of the first lens 193 and the pressure member 114. Due to the clearance 122, the force caused by the O-ring 34 pressed and deformed can be released so that the pressure member 114 can be prevented from extending in a direction to leave the first lens 193.

When heat or the like is applied to the lens portion from the outside, thermal expansion occurs in the periphery of the portion suffering the heat. However, due to the clearance 122 provided as described above, misalignment between the lens 193 and the pressure member 114 can be prevented from occurring due to the thermal expansion.

Figure 21:
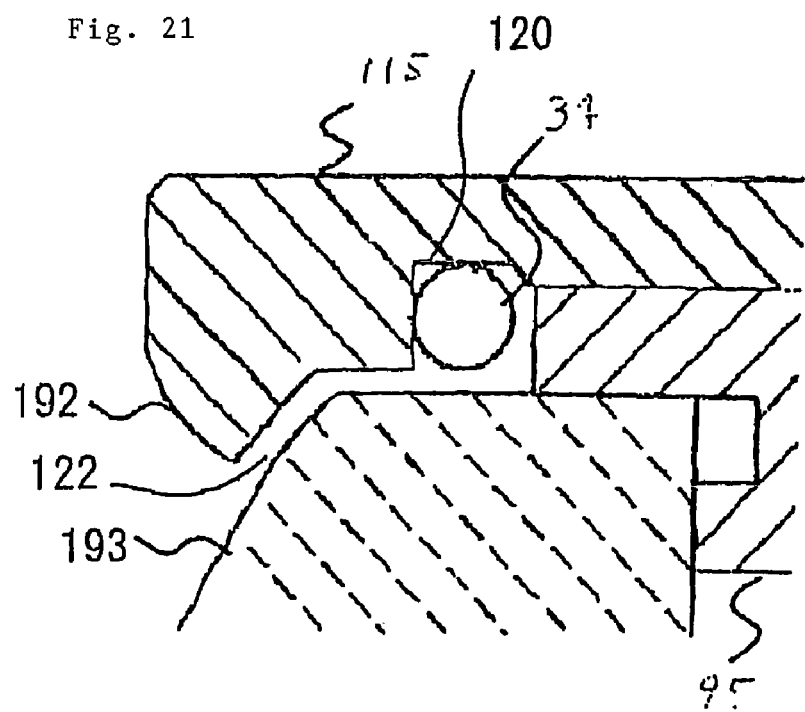
FIG. 21 is a sectional view showing a modification of FIG. 16.
Figure 22:
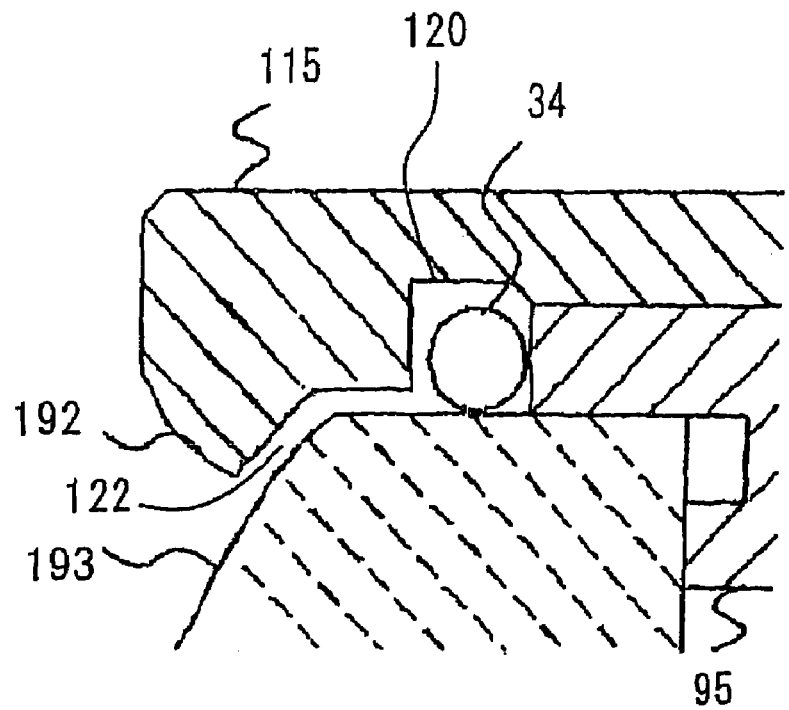
FIG. 22 is a sectional view showing a modification of FIG. 17.
Figure 23:
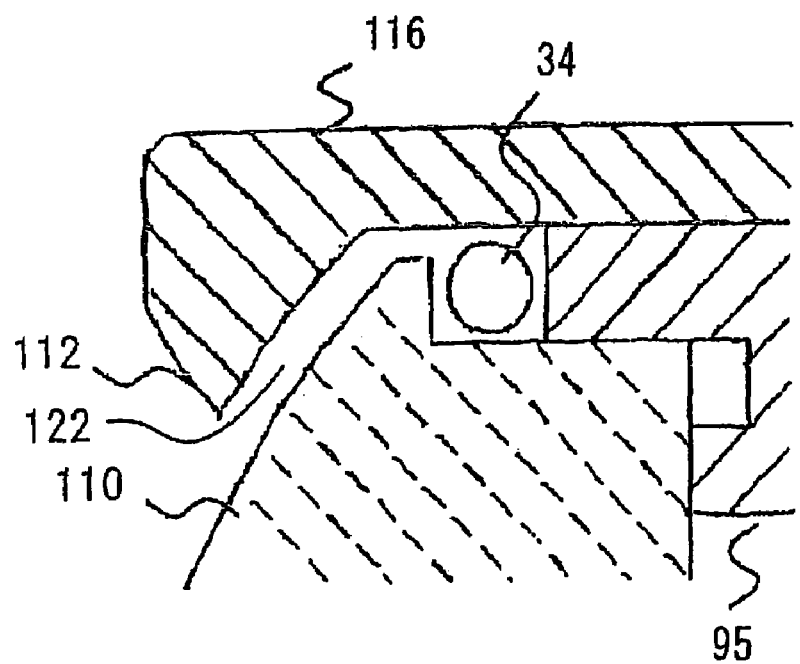
FIG. 23 is a sectional view showing a modification of FIG. 18.

Similarly FIGS. 21 and 22 show modifications of FIGS. 16 and 17, and FIG. 23 shows a modification of FIG. 18. The configuration in FIGS. 21 and 22 and the configuration in FIG. 23 are the same as that in FIGS. 16 and 17 and that in FIG. 18 respectively, except that the clearance 122 is provided between the side surface of the first lens 193, 110 and the pressure member 115, 116. The same effect as described above can be obtained.

(Second Modification)

Next, a modification of the configuration of the lens assembly in FIG. 10 will be described with reference to FIGS. 24 to 29.

FIGS. 24 to 29 are sectional views showing modifications of FIG. 10. Constituent parts, which are the same as those in FIG. 10, are denoted by the same reference numerals correspondingly.

The configuration of the lens assembly in FIG. 24 will be described.

A protrusion portion 204 is provided in the side surface of the first lens. The O-ring 34 is disposed on the object side of the protrusion portion 204 and in the side surface of the lens. The lens is housed in the lens-barrel 32 so that a part of the lens abuts against the lens-barrel 32 on the image side of the protrusion portion 204.

Figure 29:
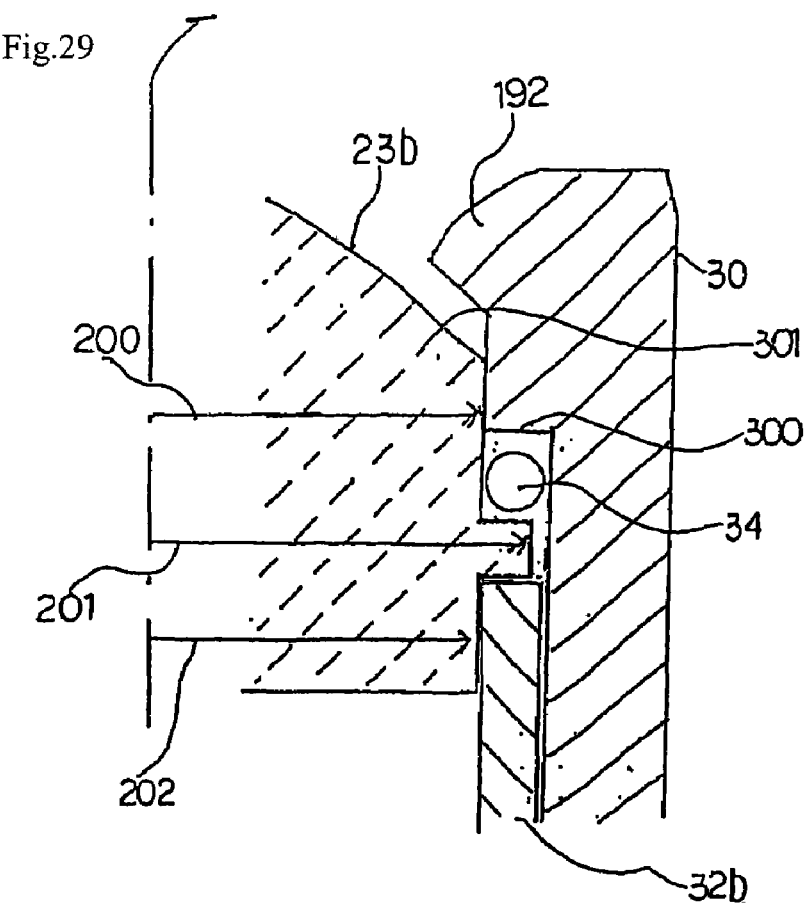
FIG. 29 is a sectional view showing a modification (second modification) of FIG. 10.

Detailed description will be made with reference to FIG. 29. A first lens 23b has a shape including a first diameter portion having a diameter 200, a second diameter portion having a diameter 201 longer than the diameter 200, and a third diameter portion having a diameter 202 as long as the diameter 200, which are disposed around the optical axis, in order of increasing distance from the object side. The first lens 23b is housed in the lens-barrel 32 (32b) in which the third diameter portion is located inside the lens-barrel 32 (32b).

In the modification, the second diameter portion corresponds to the protrusion portion 204.

Figure 24:
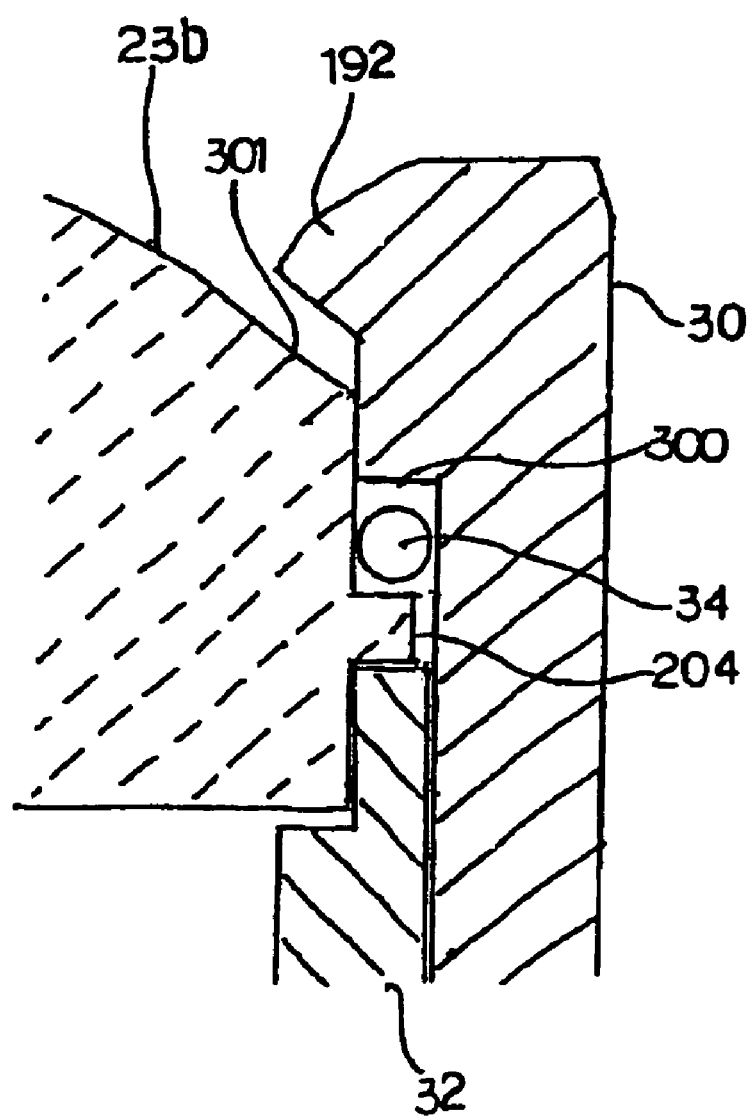
FIG. 24 is a sectional view showing a modification (second modification) of FIG. 10.

The configuration of the lens assembly in FIG. 24 is the same as the configuration of the lens assembly in FIG. 10, except the shape of the first lens. Accordingly, the description of the configuration of the lens assembly in FIG. 24 is omitted.

As described above, the protrusion portion 204 is provided in the side surface of the lens 23b, and the lens diameter on the object side of the protrusion portion 204 and the lens diameter on the image side thereof (the first and third diameter portions) are equal to each other. Accordingly, the shape of the lens can be made so simple that the shape of a mold for molding the lens can be also made simple. Therefore, the cost for forming the mold can decrease.

In the modification, although the first diameter portion is same with the third diameter portion in length, the configuration is not limited thereto. The lengths of the first and third diameter portions may be set desirably.

For example, the first lens 23 in FIG. 10 has a lens shape in which the second diameter, the third diameter and the first diameter are reduced in diameter length in that order.

According to this configuration, the pressing surface with which the first lens is pressed can be widened so that pressure can be stably applied to the first lens and the lens-barrel.

When the configuration is changed to the configuration in FIG. 10 so that the diameter of the third diameter portion is made shorter than the diameter of the first diameter portion, the abutment surface with which the protrusion portion (second diameter portion) of the lens abuts against the lens barrel 32 can be widened. Therefore, even if an external force is applied to the first lens in the optical axis direction, misalignment in the optical axis can be prevented.

Next, description will be made on the configuration of a lens assembly shown in FIG. 25.

Figure 25:
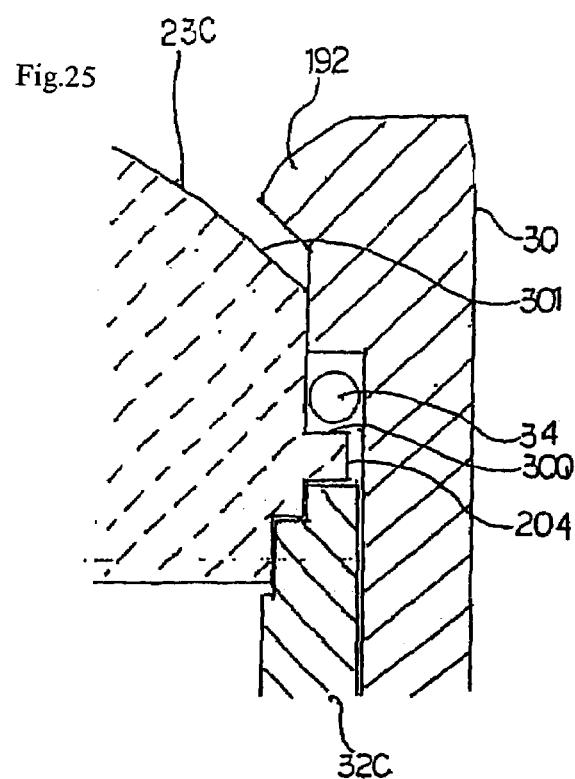
FIG. 25 is a sectional view showing a modification (second modification) of FIG. 10.

According to the configuration of the lens assembly shown in FIG. 25, a first lens 23c is formed so that the diameter 202 of the first lens 23b described in FIG. 24 is divided into two diameter portions which are different in length. A lens-barrel 32c is formed so that a step portion is formed near the front end portion of the lens-barrel 32 in accordance with the shape of the lens 23c. The two divided diameter portions of the lens 23c are inserted into the opening portion of the lens-barrel 32c to be housed in the lens-barrel 32c.

The other configuration is similar to that in FIG. 24.

Accordingly, the abutment surface between the lens 23c and the lens-barrel 32c can be widened. Thus, the effect of preventing the misalignment of the optical axis caused by external vibrations can be improved.

Even if the protrusion portion 204 is broken when the pressure member 30 is screwed onto the lens-barrel 30, the lens 23c can be fixed to the lens-barrel 32c on the image side of the protrusion portion 204. Thus, the lens 23c can be prevented from rattling due to external vibrations.

Next, description will be made on the configuration of a lens assembly in FIG. 26.

Figure 26:
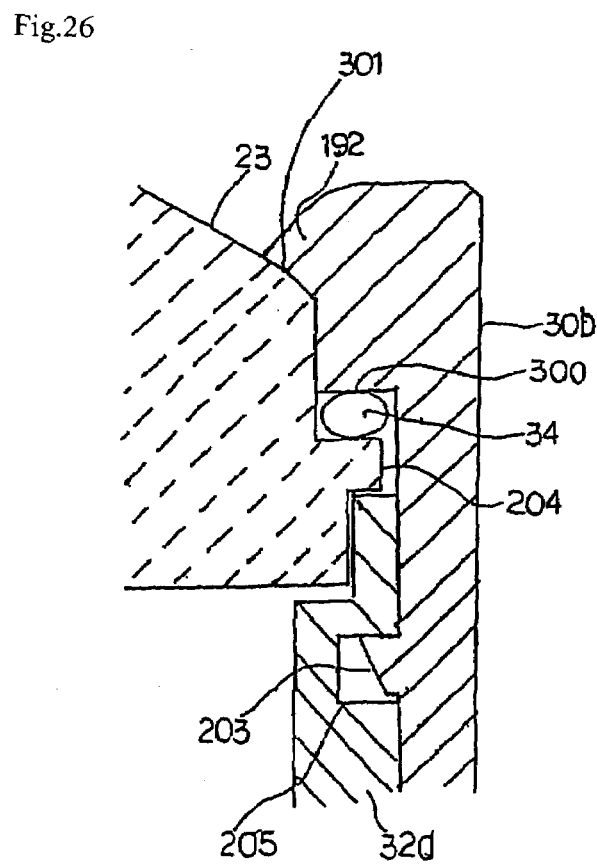
FIG. 26 is a sectional view showing a modification (second modification) of FIG. 10.

As shown in FIG. 26, a pressure member 30b having a lock portion 203 and a lens-barrel 32d having a recess portion 205 which locks the lock portion 203 therein are provided. The pressure member 30b is pushed onto the lens-barrel 32d so that the lock portion 203 is locked in the recess portion 205. Thus, the pressure member is fixed to the lens-barrel. The other configuration is similar to that of the lens assembly described with reference to FIG. 25, and description thereof will be therefore omitted.

In such a manner, the lock portion 203 is provided in the pressure member 30b, and the recess portion 205 is provided in the lens-barrel 32d correspondingly to the lock portion 203. Therefore, when the pressure member 30b is just pushed onto the lens-barrel 32d, the pressure member 30b can be fixed to the lens-barrel 32d.

Accordingly, the pressure member can be fixed to the lens-barrel so quickly that the manufacturing process can be performed in a short time. As a result, the manufacturing cost can be decreased. Particularly, when the opening of the front casing 2 is caulked with the pressure member 30, the lens-barrel 32, the O-ring 34 and the O-ring 54 are disposed in position in the front casing 2, while the lens-barrel 32 is disposed and pressed on the opening of the front casing 2 to be fixed to a predetermined position. In such a simple manner, the pressure member 30, the lens-barrel 32, the O-ring 34 and the O-ring 54 can be consecutively fixed in a predetermined layout.

The shapes of the pressure member and the lens-barrel can be made simple, for example, as compared with the system in which the pressure member is fixedly screwed onto the lens-barrel as described in the aforementioned modification, when molds for molding the pressure member and the lens-barrel are formed. Therefore, the manufacturing cost of the molds can be decreased.

Figure 27:
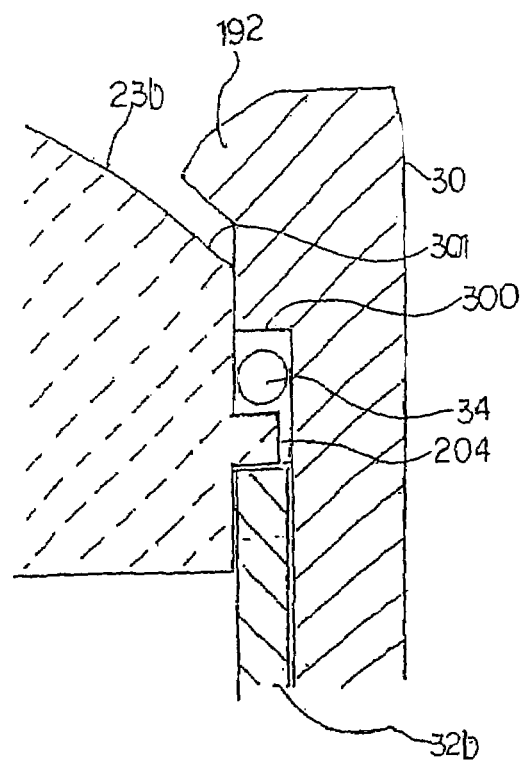
FIG. 27 is a sectional view showing a modification (second modification) of FIG. 10.

Next, description will be made about the configuration of a lens assembly in FIG. 27. This configuration is obtained by making the configuration of the lens-barrel 32 in FIG. 24 simpler.

That is, the lens-barrel 32 in FIG. 24 is designed to have a step for housing a first lens in the front end portion on the object side. However, the configuration in FIG. 27 is simplified by removing the step.

Accordingly, a mold for the lens-barrel can be made simple when the lens-barrel is manufactured. Thus, the manufacturing cost of the mold can be reduced.

In addition, since a part of light incident to the lens 23b is not blocked by the front end portion of the lens-barrel, the light-utilizing efficiency can be improved.

Figure 28:
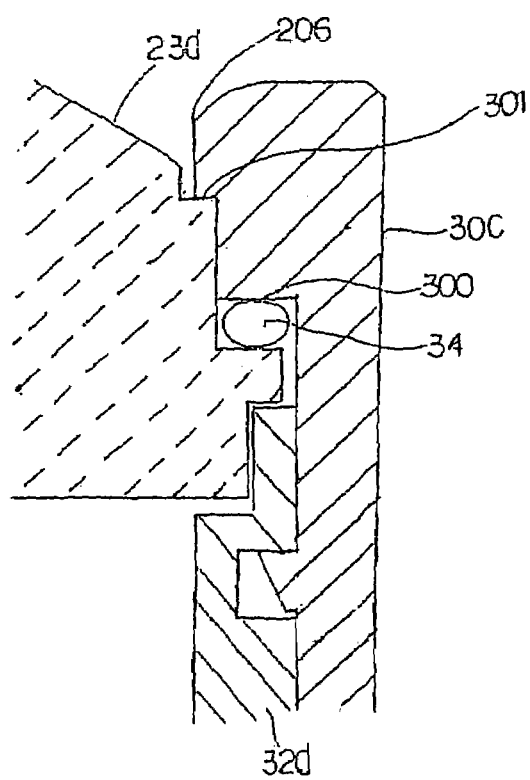
FIG. 28 is a sectional view showing a modification (second modification) of FIG. 10.

Description will be made of the configuration of the lens assembly in FIG. 28. The configuration is substantially the same as that in FIG. 26. However, a notch portion is provided by notching the object-side outer circumferential portion of the lens 23 (hereinafter, the configuration of the notched lens 23 will be referred to as "lens 23d"). Further, a protrusion provided in the front end portion of the pressure member 30 correspondingly to the notch portion is brought into contact with the notch portion. This protrusion has a shape notched corresponding to an abutment surface 301 so as to abut against the lens 23d in position (hereinafter, the configuration of the protrusion notched in position will be referred to as "protrusion 206", and the pressure member provided with the protrusion 206 will be referred to as "pressure member 30c").

In detail, the notch portion of the lens 23d and the abutment surface 301 of the protrusion 206 are formed substantially perpendicularly to the optical axis.

Accordingly, when the pressure member 30c is attached to the lens-barrel 32d, the front end portion of the pressure member 30c can reliably push the lens 23d in the optical axis direction. Thus, the hermeticity inside the lens-barrel can be improved.

The modifications are not limited to the aforementioned description, but they can be incorporated in another embodiment.

Description will be made on the control of squeeze of the O-ring in the respective modification described with reference to FIGS. 10, 11 and 24 to 29.

In the description, the distance from the abutment surface 301 to a pressing surface 300 will be referred to as "distance A". In the abutment surface 301, the protrusion 192 provided in the front end portion of the pressure member pushing the first lens in the optical axis direction abuts against the first lens 23. In the pressing surface 300, the pressure member applies pressure to the O-ring 34. The distance from the abutment surface 301 to the second diameter portion corresponding to the protrusion portion 204 will be referred to as "distance B". Further, The distance from the abutment surface 301 to the protrusion portion 204 will be referred to as "distance C".

In addition, when a tension as a specification of an O-ring is, for example, in a range of 8% to 30% that is the upper limit of compression permanent distortion in order to attain a sealing function, it is necessary to use the O-ring with its tension in the range of from 8% to 30%. Accordingly, the first lens 23 is designed to define the accuracy of dimension between the abutment surface 301 of the first lens 23 and the pressing surface of the protrusion 204, while the pressure member 30*b* is designed to define the accuracy of dimension between the protrusion portion 192 of the pressure member 30*b* and the pressing surface 300. Thus, the accuracy of the distance A and the accuracy of the distance B can be obtained, and therefore the accuracy of the distance C can be obtained. As a result, the accuracy of tension of the O-ring (the accuracy of the distance C) can be defined within a desired range. Thus, the deformation or damage of the O-ring itself can be prevented, and the hermeticity in the lens-barrel can be prevented from decreasing due to use with a pressing force smaller than its rated value.

Although the first to third diameter portions each having a predetermined length are provided in the first lens in the modification, the number of diameter portions is not limited thereto. It may be increased or reduced variously in accordance with application.

Imaging apparatus according to the second modification will be summarized below. The imaging apparatus according to the modification includes a front casing having a first opening, a rear casing, a packing member, a lens-barrel included in the front casing and the rear casing, a lens set housed in the lens-barrel, and a pressure member, which has a second opening, for pressing a first lens of the lens set, wherein the front casing and the rear casing are caulked with the packing member, and the first opening is caulked with the pressure member, while the second opening is caulked with the first lens.

The imaging apparatus according to the modification includes a casing having a first opening, a lens-barrel included in the casing, a lens set housed in the lens-barrel, a pressure member, which has a second opening, for pressing a first lens of the lens set in an optical axis direction, an elastic member disposed in the outer circumferential portion of the first lens, an imaging device included in the casing, a first diameter portion, a second diameter portion having a diameter larger than the diameter of the first diameter portion, and a third diameter portion having a diameter smaller than the diameter of the second diameter portion, the first to third diameter portions being disposed in the first lens in order of increasing distance from the object side, wherein at least the third diameter portion is located in the lens-barrel so that the first lens is housed in the lens-barrel, and the first opening is caulked with the pressure member, while the pressure member presses the second diameter portion through the elastic member so that the second opening is caulked with the first lens.

The imaging apparatus according to the modification includes a protrusion portion provided in the pressure member and for pressing the outer circumferential portion of the first lens, and a pressing surface provided in the pressure member and for pressing the elastic member, wherein the elastic member is disposed between the pressing surface and the second diameter portion.

The imaging apparatus according to the modification includes a front casing having a first opening, a rear casing, an elastic member, a lens-barrel included in the front casing and the rear casing, a lens set housed in the lens-barrel, a pressure member, which has a second opening, for pressing a first lens of the lens set, a lens protrusion portion provided in the side surface of the first lens, and an elastic member disposed on the object side of the lens protrusion portion, wherein at least a part of the first lens on the image side of the lens protrusion portion is fitted into the lens-barrel so that the first lens is housed in the lens-barrel, and the first opening is caulked with the pressure member, while the pressure member presses the lens protrusion portion through the elastic member so that the second opening is caulked.

The imaging apparatus according to the modification includes a protrusion portion provided in the pressure member and for pressing the outer circumferential portion of the first lens, and a pressing surface provided in the pressure member and for pressing the elastic member, wherein the elastic member is disposed between the pressing surface and the lens protrusion portion.

In the imaging apparatus according to the modification, a notch portion is provided in the object-side outer circumferential portion of the first lens, and the notch portion and the protrusion portion abut against each other so as to press the first lens.

The imaging apparatus according to the modification includes a lock portion provided in the pressure member, and a recess portion provided in the lens-barrel and for locking the lock portion therein, wherein the lock portion is locked in the recess portion so that the pressure member is fixed to the lens-barrel.

In the imaging apparatus according to the modification, the pressure member is a screw fitted member, and the pressure member is screwed down to the outer circumference of the lens-barrel so that the pressure member is fixed to the lens-barrel.

(Third Modification)

Figure 30:
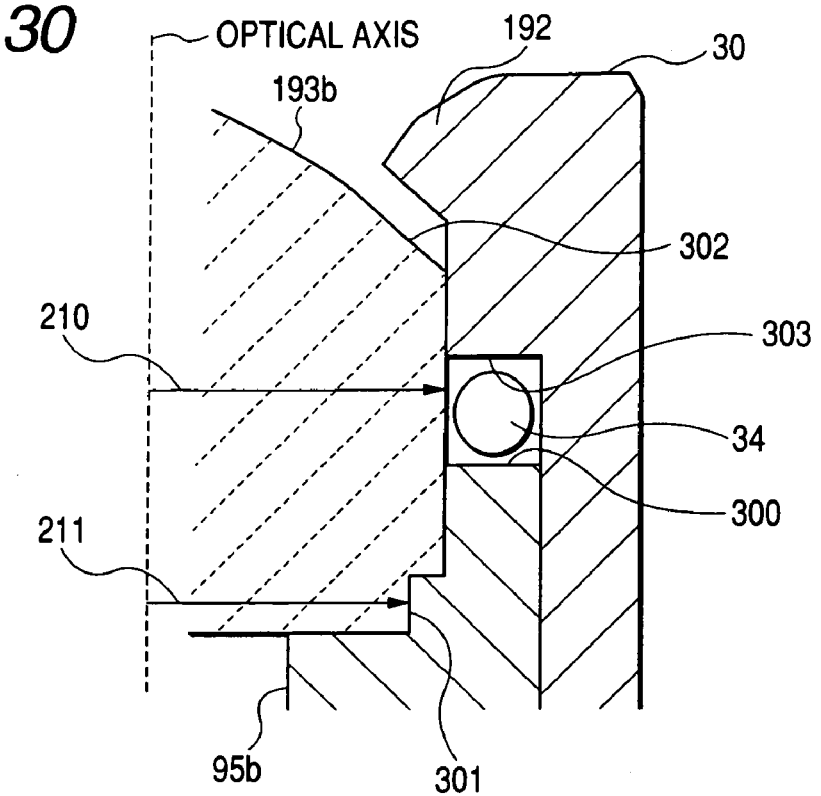
FIG. 30 is a sectional view showing a modification (third modification) of FIGS. 13 and 14.
Figure 31:
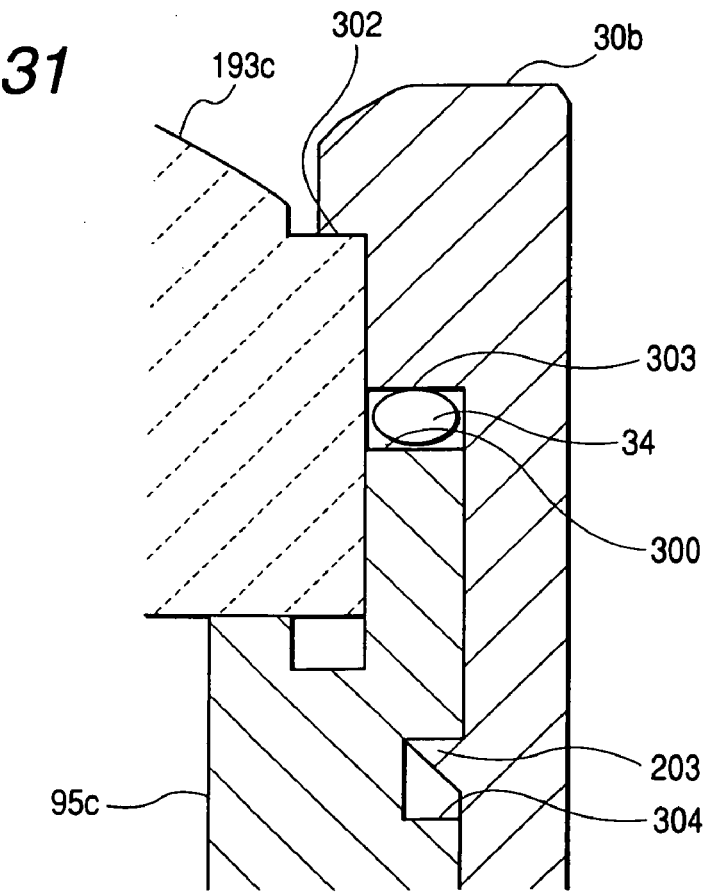
FIG. 31 is a sectional view showing a modification (third modification) of FIGS. 13 and 14.

Next, a modification of the configuration in FIGS. 13 and 14 will be described with reference to FIGS. 30 and 31. FIGS. 30 and 31 are sectional views showing modifications of FIGS. 13 and 14.

In FIGS. 30 and 31, members the same as those in FIGS. 13 and 14 are denoted by the same reference numerals correspondingly.

As shown in FIG. 30, a lens 193*b* has a first diameter portion having a diameter 210 and a second diameter portion having a diameter 211 shorter than the diameter 210, which are disposed around the optical axis. A lens-barrel 95*b* has a step portion 301 corresponding to the shape of the outer circumferential portion of the first and second diameter portions. The inner wall surface of the step portion 301 is brought into contact with the second diameter portion, while the object-side surface of the step portion 301 is brought into contact with the first diameter portion. Thus, the lens 193b is housed in the lens-barrel 95b.

A pressure member 30 having an opening portion is provided for pressing the lens 193b onto the lens-barrel 95b. A protrusion 192 and a pressure surface 303 for pressing an O-ring 34 which will be described later are provided in the pressure member 30.

Then, the O-ring 34 is placed in a position surrounded by the pressing surface 303, the outer circumferential surface of the first diameter portion, and the front end portion of the lens-barrel 95b. The protrusion 192 is brought into contact with the object-side outer circumferential portion of the lens 193b (the surface where the protrusion 192 abuts against the lens 193b will be referred to as "abutment surface 302"), and the pressure member 30 is screwed onto the lens-barrel 95b. As a result, the pressing surface 303 is pressed, while the O-ring 34 is pressed and deformed by the pressing surface 303. Thus, caulking is secured between the inner wall surface of the pressure member 30 and the outer circumferential portion of the lens 193b.

In such a manner, the first and second diameter portions are provided in the lens 193b, and the step portion 301 is provided in the lens-barrel 95b correspondingly to the first and second diameter portions. Thus, the abutment surface between the lens 193b and the lens-barrel 95b can be set to be so wide that the frictional force between the lens 193b and the lens-barrel 95b increases. Accordingly, the misalignment of the lens 193b caused by external vibration or impact applied thereto can be prevented so that a defective image caused by the misalignment of the optical axis can be prevented from being obtained.

Even when misalignment occurs in the abutment surface where the lens-barrel 95b and the first diameter portion abut against each other, the lens 193b and the lens-barrel 95b still can be positioned in predetermined positions as long as the lens-barrel 95b and the second diameter portion abut against each other in position. Thus, the misalignment of the optical axis can be prevented.

Next, description will be made on the configuration of a lens assembly in FIG. 31.

The configuration of the lens assembly in FIG. 31 is different from the configuration of the lens assembly in FIG. 30 in that the diameter of the second diameter portion is longer than the diameter of the first diameter portion.

That is, the object-side outer circumferential portion of the first lens 193 is notched to form a first lens 193c. An abutment surface 302 between the first lens 193c and a pressure member 30b is formed into a surface perpendicular to the optical axis. Thus, the lens 193c can be pushed surely in the optical axis direction.

Further, a recess portion 304 is provided in the lens-barrel 95c, and a lock portion 203 is provided in a predetermined portion of the pressure member 30b correspondingly to the recess portion 304. The pressure member 30b is disposed to cover the front end portion of the lens-barrel 95c, while the pressure member 30b is slid on the outer wall surface of the lens-barrel 95c so as to be pressed onto the image side. Thus, the pressure member 30b is fixed to the lens-barrel 95c.

Accordingly, only if the pressure member 30b is pushed onto the lens-barrel 95c, the pressure member 30b can be fixed to the lens-barrel 95c without necessity to screw the pressure member 30b onto the lens-barrel 95c. Thus, in comparison with the case where the pressure member is screwed onto the lens-barrel to be thereby fixed thereto, the O-ring 34 put between the pressure member and the lens-barrel can be prevented from being wrenched off by the rotation of the pressure member.

Description will be made on the control of squeeze of the O-ring in the respective modification described with reference to FIGS. 13, 14, 30 and 31.

In the description, the distance from the abutment surface 302 to the pressing surface 303 will be referred to as "distance A". In the abutment surface 302, the protrusion 192 provided in the front end portion of the pressure portion pushing the first lens in the optical axis direction abuts against the first lens 193. In the pressing surface 303, the pressure member applies pressure to the O-ring 34. The distance from the abutment surface 302 to the contact surface 300 between the O-ring 34 and the front end portion of the lens-barrel will be referred to as "distance B". The distance from the pressing surface 303 to the contact surface 300 will be referred to as "distance C".

In addition, when the tension as a specification of an O-ring is, for example, in a range of from 8% to 30% that is the upper limit of compression permanent distortion in order to attain a sealing function, it is necessary to use the O-ring with its tension in the range of from 8% to 30%. Accordingly, the first lens 193 is designed to define the accuracy of dimension between the abutment surface 302 of the first lens 193 and the contact surface 300 of the lens-barrel 95, while the pressure member 30 is designed to define the accuracy of dimension between the protrusion portion 192 of the pressure member 30 and the pressing surface 303. Thus, the accuracy of the distance A and the accuracy of the distance B can be obtained, and therefore the accuracy of the distance C can be obtained. As a result, the accuracy of tension of the O-ring (the accuracy of the distance C) can be defined within a desired range. Thus, the deformation or damage of the O-ring itself can be prevented, and the hermeticity in the lens-barrel can be prevented from decreasing due to use with a pressing force smaller than its rated value.

The configurations of the modifications in FIGS. 30 and 31 can be applied to the configuration of the pressure member 30 described previously, and the effects thereof can be exerted.

The imaging apparatus according to the third modification will be summarized below. The imaging apparatus according to the modification includes a camera casing having a first opening, a first lens whose convex surface faces the outside of the camera casing, a lens set including the first lens, a lens-barrel receiving the lens set and included in the camera casing, and an annular pressure member fixed to the lens-barrel, filling a clearance between the first opening of the camera casing and the outer circumferential portion of the first lens, and having a second opening, wherein the first opening is caulked with the pressure member, while the second opening is caulked with the first lens.

The imaging apparatus according to the modification includes a camera casing having a first opening, a first lens whose convex surface faces the outside of the camera casing, a lens set including the first lens, a lens-barrel receiving the lens set and included in the camera casing, an annular pressure member fixed to the lens-barrel, filling a clearance between the opening of the camera casing and the outer circumferential portion of the first lens, and having a second opening, first and second diameter portions disposed in the first lens in turn in order of increasing distance from the object side, the second diameter portion having a diameter smaller than the diameter of the first diameter portion, an elastic member disposed in a portion surrounded by the outer circumferential portion of the first diameter portion, the pressure member and the lens-barrel, and an imaging device included in the camera casing, wherein at least the second diameter portion of the first lens is located in the lens-barrel so that the first lens is housed in the lens-barrel, and the first opening is caulked with the pressure member, while the elastic member is pressed by the pressure member and the lens-barrel so as to caulk the second opening.

In the imaging apparatus according to the modification, the elastic member is located in a portion surrounded by the outer circumferential portion of the first lens and the front end portion of the lens-barrel, and the elastic member is pressed by the pressure member so as to caulk the outer circumferential portion of the first lens.

In the imaging apparatus according to the modification, a groove portion is provided in the inner wall surface of the pressure member so as to be located in a position where the elastic member should be disposed.

The imaging apparatus according to the modification includes a protrusion portion provided in the front end portion of the pressure member, and a pressing surface provided in the pressure member and for pressing the elastic member, wherein the elastic member is disposed between the front end portion of the lens-barrel and the pressing surface, and the first lens is pressed onto the lens-barrel by the protrusion portion, while the elastic member is pressed by the pressing surface.

The imaging apparatus according to the modification includes a lock portion provided in the pressure member, and a recess portion provided in the lens-barrel and for locking the lock portion therein, wherein the lock portion is locked in the recess portion so that the pressure member is fixed to the lens-barrel.

In the imaging apparatus according to the modification, the pressure member is a screwed type member, and the pressure member is screwed down to the outer circumference of the lens-barrel so that the pressure member is fixed to the lens-barrel.

In the imaging apparatus according to the modification, a notch portion is provided in the object-side outer circumferential portion of the first lens, and the notch portion and the protrusion portion of the pressure member abut against each other so as to press the first lens.

In the imaging apparatus according to the modification, the elastic member is formed into an annular shape, while the inner diameter of the elastic member is made larger than the outer diameter of the first lens, and the outer diameter of the elastic member is made smaller than the inner diameter of the pressure member.

(Fourth Modification)

Figure 32:
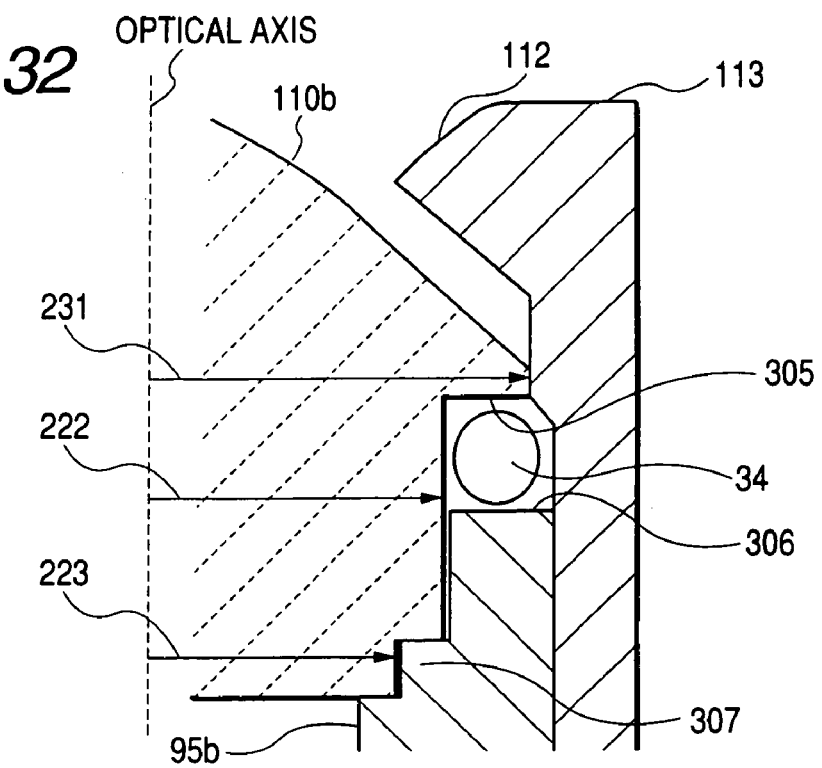
FIG. 32 is a sectional view showing a modification (fourth modification) of FIG. 18.
Figure 33:
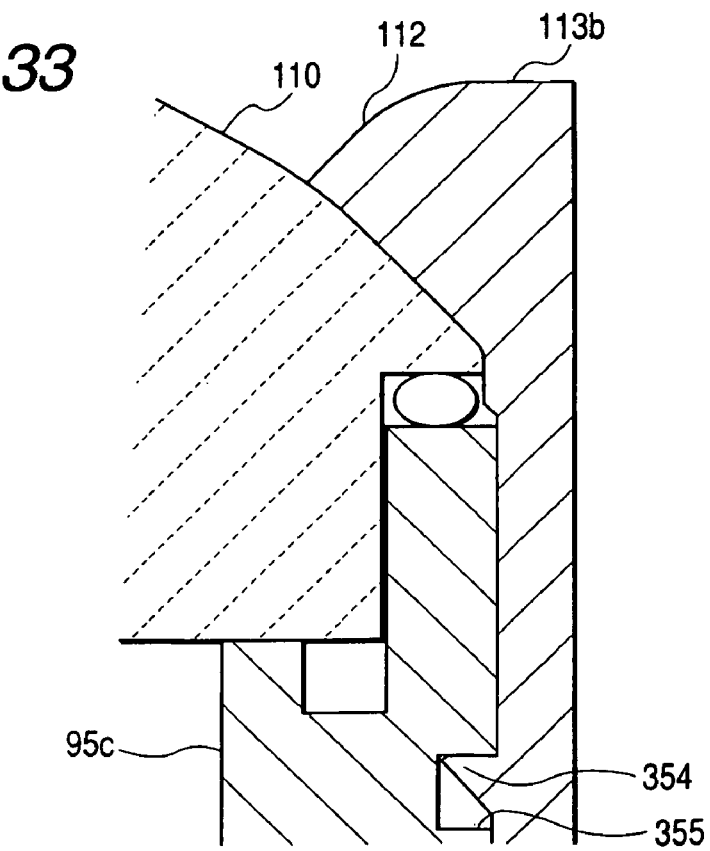
FIG. 33 is a sectional view showing a modification (fourth modification) of FIG. 18.
Figure 34:
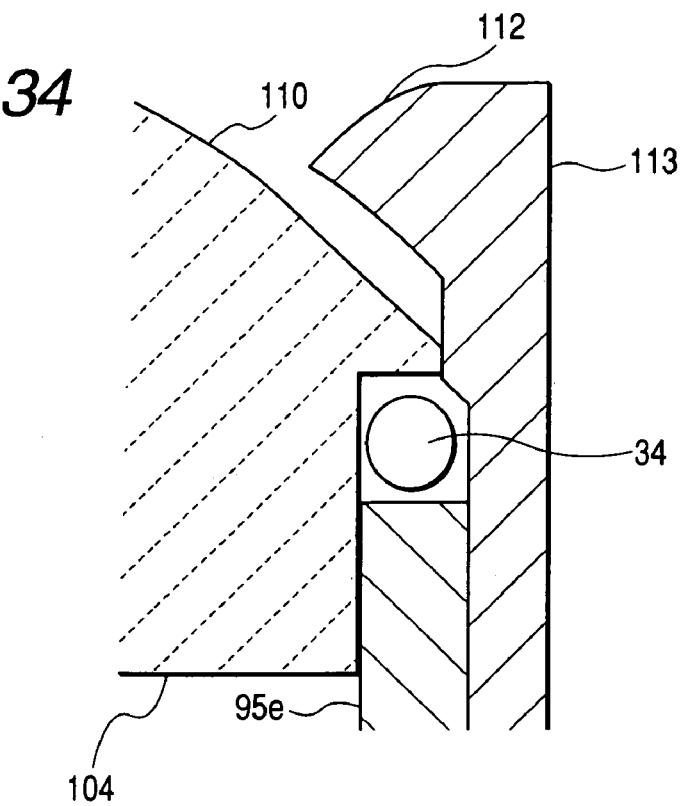
FIG. 34 is a sectional view showing a modification (fourth modification) of FIG. 18.

Next, a modification of the configuration in FIG. 18 will be described with reference to FIGS. 32 to 34. FIGS. 32 to 34 are sectional views sowing the modifications of FIG. 18.

As shown in FIG. 32, a lens 110*b* has a first diameter portion having a diameter 221, a second diameter portion having a diameter 222 smaller than the diameter 221, and a third diameter portion having a diameter 223 smaller than the diameter 222, which are disposed around its optical axis.

In addition, an O-ring is provided in a region surrounded by the outer circumferential portion of the second diameter portion, an image-side outer surface 305 (hereinafter, referred to as "abutment surface 305") of the first diameter portion, and a front end portion surface (hereinafter, referred to as "abutment surface 306") of a lens-barrel 95*b*.

The lens-barrel 95*b* is provided with a step portion 307 for abutting against the second and third diameter portions provided in the lens 110*b*, so as to position the lens 110*b*.

The area of the abutment surface 306 of the lens-barrel 95*b* is larger than that of the abutment surface 305 of the first diameter portion.

The other configuration is the same as that in FIG. 18.

According to the configuration of the modification, the second and third diameter portions are provided in the lens 110*b*, and the step portion 307 is provided in the lens-barrel 95*b* correspondingly to the second and third diameter portions. Accordingly, the abutment surface between the lens 110*b* and the lens-barrel 95*b* can be set to be so wide that the frictional force between the lens 110*b* and the lens-barrel 95*b* increases. Thus, the misalignment of the lens 110*b* caused by external vibration or impact applied thereto can be prevented so that a defective image caused by the misalignment of the optical axis can be prevented from being obtained.

For example, even if looseness occurs due to a gap formed in the abutment surface between the lens-barrel 95*b* and the first diameter portion, the lens 110*b* can be housed in a specified position of the lens-barrel 95*b* due to the abutment surface between the second diameter portion and the lens-barrel 95*b* or the abutment surface between the third diameter portion and the lens-barrel 95*b*. Thus, the lens 110*b* can be housed in the lens-barrel 95*b* without misalignment of its optical axis.

Next, description will be made on the configuration of a lens assembly shown in FIG. 33.

The lens assembly shown in FIG. 33 has a pressure member 113*b* having a lock portion 354 and a lens-barrel 95*c* having a recess portion 355 for locking the lock portion 354 therein. Thus, the pressure member 113*b* is pressed onto the lens-barrel 95*c* to thereby lock the lock portion 354 in the recess portion 355. Thus, the pressure member is fixed to the lens-barrel 95*c*. The other configuration is similar to the configuration of the lens assembly described with reference to FIG. 18, and description thereof will be omitted.

In such a manner, the lock portion 354 is provided in the pressure member 113*b*, and the recess portion 355 is provided in the lens-barrel 95*c* correspondingly to the lock portion 354. Accordingly, the pressure member 113*b* and the lens-barrel 95*c* can be fixed merely by pushing the pressure member 113*b* onto the lens-barrel 95*c*.

Accordingly, the pressure member 113*b* can be fixed to the lens-barrel so quickly that the manufacturing process can be performed in a short time. As a result, the manufacturing cost can decrease.

In addition, the shapes of the pressure member and the lens-barrel can be made simple, for example, as compared with the system in which the pressure member is fixedly screwed onto the lens-barrel as described in the embodiment. Accordingly, when molds for molding the pressure member and the lens-barrel are formed, the manufacturing cost of the molds can also be decreased.

Next, description will be made on the configuration of a lens assembly shown in FIG. 34.

As shown in FIG. 34, the object-side front end portion of a lens-barrel 95*e* is brought into contact with only the side surface of the outer circumferential portion of a lens 110, and an O-ring 34 is disposed on the head portion of the lens-barrel 95*e*. The other configuration is similar to the configuration of FIG. 18.

Due to the simple configuration of the lens-barrel 95*e*, the mold for producing the lens-barrel 95*e* does not have to be formed into a complicated shape. Thus, the cost to produce the mold can be suppressed.

In addition, since the image-side surface of the lens 110 does not abut against the lens-barrel 95*e*, light passing through the lens 110 is not blocked by the lens-barrel 95e. Thus, the light-utilizing efficiency can be improved.

Imaging apparatus according to the fourth modification will be summarized below. The imaging apparatus according to the modification includes a camera casing having a first opening, a lens set including a first lens whose convex surface faces the outside, a lens-barrel receiving the lens set, and a pressure member having a second opening, disposed in a front portion of the lens-barrel and fixing the first lens, wherein the pressure member is made to project from the first opening of the camera casing so as to caulk the first opening of the camera casing, while the convex surface of the first lens is made to project from the second opening of the pressure member so as to caulk the second opening.

The imaging apparatus according to the modification includes a camera casing having an opening, a lens set including a first lens whose convex surface faces the outside through the opening of the camera casing, a lens-barrel receiving the lens set, a pressure member disposed in a front portion of the lens-barrel and fixing the first lens, an imaging device included in the camera casing, a pressing portion provided in the lens-barrel, an abutment portion provided in the lens-barrel and abutting against the first lens, and first and second diameter portions disposed in the first lens in turn in order of increasing distance from the object side, the second diameter portion having a diameter smaller than the diameter of the first diameter portion, wherein the second diameter portion is located in the lens-barrel so that the first lens is housed in the lens-barrel, and the first lens is pressed by the pressure member so that the first lens is fixed to the lens-barrel, while an elastic member is pressed to secure caulking between the first lens and the pressure member.

In the imaging apparatus according to the modification, the abutment surface between the lens-barrel and the elastic member is larger than the abutment surface between the first lens and the elastic member.

The imaging apparatus according to the modification includes a lock portion provided in the pressure member, and a recess portion provided in the lens-barrel and for locking the lock portion therein, wherein the lock portion is locked in the recess portion so that the pressure member is fixed to the lens-barrel.

In the imaging apparatus according to the modification, the pressure member is a screw fitted member, and the pressure member is screwed down to the outer circumference of the lens-barrel so that the pressure member is fixed to the lens-barrel.

(Fifth Modification)

Figure 35:
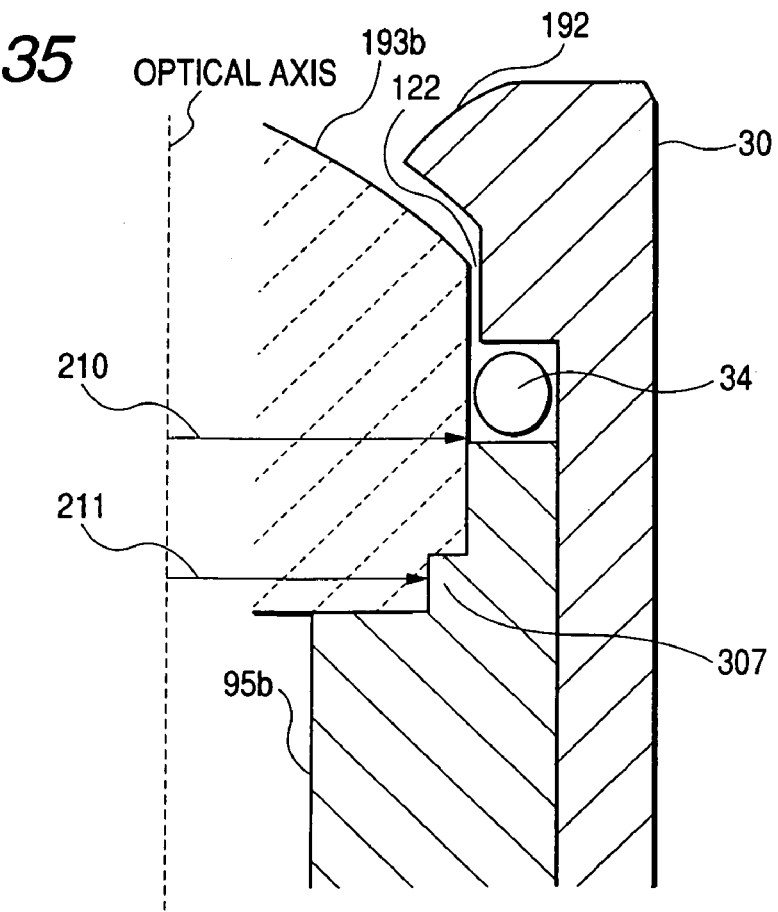
FIG. 35 is a sectional view showing a modification (fifth modification) of FIGS. 19 and 20.
Figure 36:
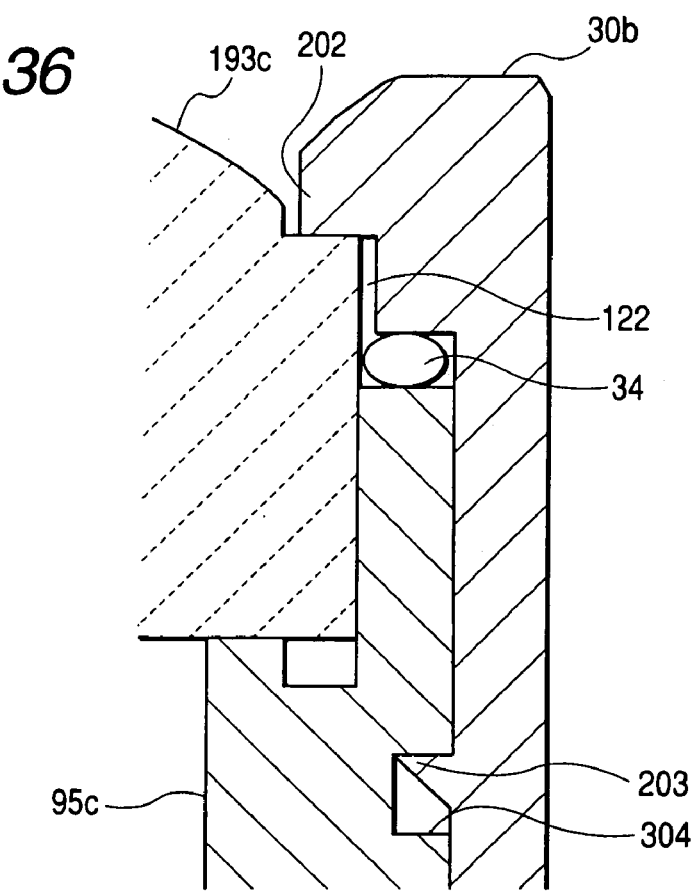
FIG. 36 is a sectional view showing a modification (fifth modification) of FIGS. 19 and 20.

Next, a modification of the configurations in FIGS. 19 and 20 will be described with reference to FIGS. 35 and 36. FIGS. 35 and 36 are sectional views showing modifications of FIGS. 19 and 20.

As shown in FIG. 35, a lens 193b has a first diameter portion having a diameter 210 and a second diameter portion having a diameter 211, which are disposed around the optical axis. The diameter of the second diameter portion is defined to be shorter than the diameter of the first diameter portion. A front end portion provided in a lens-barrel 95b is formed as a step portion 307 corresponding to the first and second diameter portions of the lens 193b so as to abut against the outer circumferential portions of the first and second diameter portions of the lens 193b. The second diameter portion abuts against the image-side surface of the lens 193b.

An O-ring 34 is placed in a position surrounded by the front end portion of the lens-barrel 95b, the outer circumferential portion of the first diameter portion of the lens 193b, and a pressure member 30. When the pressure member 30 is screwed onto the lens-barrel 95b, the O-ring 34 disposed outside the first diameter portion of the lens 193b is pressed. As a result, the opening portion of the pressure member 30 is caulked with the lens 193b.

In the modification, a clearance 122 is provided between the outer circumferential portion of the lens 193b and the inner wall surface of the pressure member 30 as described previously.

Accordingly, even if the O-ring 34 receives a pressing force greater than its rated value, a part of the O-ring 34 can elastically expand to the clearance 122. Thus, the O-ring 34 can be prevented from being damaged, for example, from being torn off. Further, the direction of a force applied to the pressure member 30 in a direction to make the pressure member 30 leave the lens 193b can be converted into the optical axis direction.

Since the abutment surface between the image-side outer circumferential portion of the lens 193b and the lens barrel 95b is widened, the lens 193b can be housed in the lens-barrel 95b without occurrence of misalignment in the optical axis. Therefore, misalignment in the optical axis of the lens 193b can be prevented.

Next, description will be made on the configuration of a lens assembly shown in FIG. 36.

In the configuration of FIG. 36, the object-side outer circumferential portion of a lens 193c is notched to form a notch portion. A protrusion portion 202 for pressing the notch portion in the optical axis direction is provided in the front end portion of a pressure member 30b.

The abutment surface between the protrusion portion 202 and the notch portion is provided substantially perpendicularly to the optical axis of the lens.

A lock portion 203 is provided in the pressure member 30b, and a recess portion 304 for locking the lock portion 203 therein is provided in the outer circumferential portion of a lens-barrel 95c described above. The pressure member 30b is fitted to the lens-barrel 95c. The pressure member 30b is pushed in the optical axis direction relatively to the lens-barrel 95c so that the lock portion 203 is locked in the recess portion 304. Thus, the lens-barrel 95c and the pressure member 30b are fixed.

In such a manner, the notch portion is provided in the les 193c, and the protrusion portion 202 is provided in the pressure member 30b correspondingly to the notch portion. Thus, the lens 193c can be pressed surely in the optical axis direction by the pressure member 30b.

In addition, the lock portion 203 provided in the pressure member 30b can be locked in the recess portion 304 provided in the lens-barrel 95c. Accordingly, as compared with the case where the pressure member 30b is screwed and inserted into the lens-barrel 95c, the O-ring 34 can be prevented from being entangled with the torsional rotation of the pressure member 30b and thereby damaged. Thus, the outer circumferential portion of the lens 193c can be caulked satisfactorily.

Imaging apparatus according to the fifth modification will be summarized below. The imaging apparatus according to the modification includes a camera casing having a first opening, a lens-barrel included in the camera casing, a lens set housed in the lens-barrel, and a pressure member pressing a first lens of the lens set and having a second opening, wherein the pressure member is disposed to project from the first opening, while the first lens can be removably attached to the lens-barrel by the pressure member, and the second opening of the pressure member is caulked with the first lens.

The imaging apparatus according to the modification includes a camera casing having a first opening, a lens set, an elastic member disposed in the outer circumferential portion of a first lens of the lens set, a lens barrel abutting against the first lens of the lens set, a pressure member having a second opening, a protrusion portion provided in the pressure member, and a pressing surface provided in the pressure member, wherein the first lens of the lens set is pressed onto the lens-barrel by the protrusion portion, while the elastic member is pressed by the pressing surface so as to caulk the second opening. In the imaging apparatus, a predetermined clearance is provided between the outer circumferential portion of the first lens of the lens set and the inner wall surface of the pressure portion.

The imaging apparatus according to the modification further includes a lock portion provided in the pressure portion, and a recess portion provided in the lens-barrel and for locking the lock portion therein, wherein the lock portion is locked in the recess portion so that the pressure member is fixed to the lens-barrel.

In the imaging apparatus according to the modification, the pressure member is a screw fitted member, and the pressure member is screwed down to the lens-barrel so that the pressure member and the lens-barrel are fixed.

In the imaging apparatus according to the modification, a first diameter portion having a first diameter of the first lens and a second diameter portion having a second diameter larger than the diameter of the first diameter portion are provided in the first lens, so that the outer circumferential portion of the first diameter portion abuts against the protrusion portion of the pressure member, while the second diameter portion abuts against the lens-barrel.

(Sixth Modification)

Next, a modification of the configuration in FIG. 18 will be described with reference to FIGS. 37 to 39.

Figure 37:
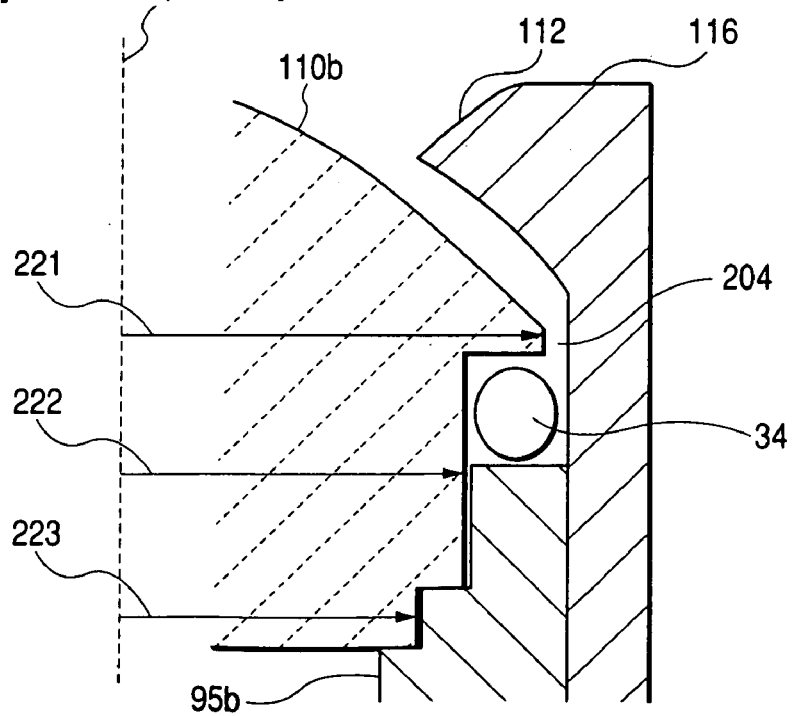
FIG. 37 is a sectional view showing a modification (sixth modification) of FIG. 18.
Figure 38:
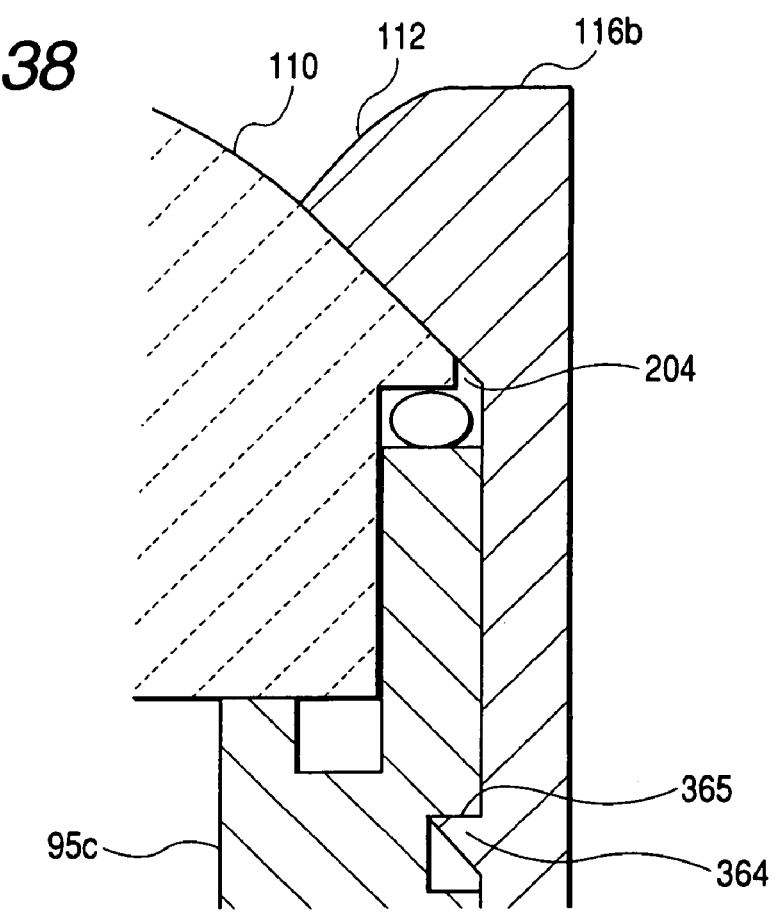
FIG. 38 is a sectional view showing a modification (sixth modification) of FIG. 18.
Figure 39:
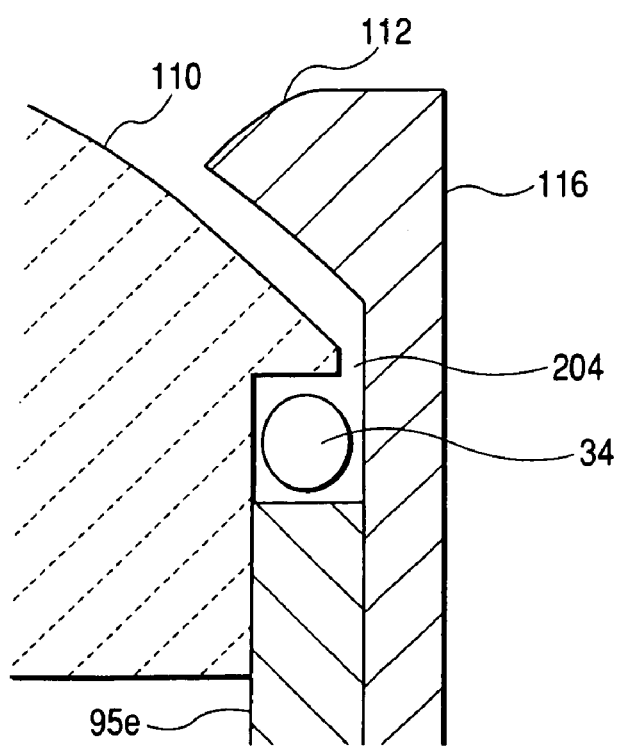
FIG. 39 is a sectional view showing a modification (sixth modification) of FIG. 18.

FIGS. 37 to 39 are sectional views showing the modifications of FIG. 18.

As shown in FIG. 37, a first lens 110b has a shape including a first diameter portion having a diameter 221, a second diameter portion having a diameter 222, and a third diameter portion having a diameter 223, which are disposed around the optical axis. The first to third diameters are reduced in that order.

The front end portion of a lens-barrel 95b is formed to abut against the outer circumferential portions of the second and third diameter portions of the first lens 110b. A clearance 204 is provided between the inner wall surface of a pressure member 116 and the outside surface of the first lens 110b. The other configuration is the same as that of FIG. 18.

Accordingly, when the third diameter portion is provided to be smaller than the second diameter portion, the abutment surface between the first lens 110b and the lens-barrel 95b can be widened. Therefore, the first lens 110b can be housed in the lens-barrel 95b without misalignment. Thus, even if the first lens 110b or the pressure member 116 suffers external vibration or impact, the misalignment in the optical axis of the first lens 110b can be prevented.

Even if a clearance may be produced in the abutment surface between the lens-barrel 95b and the first diameter portion of the first lens 110b so that required abutment cannot be secured therebetween, the first lens 110b can be housed in a predetermined position of the lens-barrel 95b by means of the abutment surface between the second diameter portion of the first lens 110b and the lens-barrel 95b or the abutment surface between the third diameter portion and the lens-barrel 95b. Thus, the first lens 110b can be housed in the lens-barrel 95b without misalignment of the optical axis as long as any one of the diameter portions is fixed to the lens-barrel 95b in position.

Further, due to the clearance 204 provided between the first lens 110b and the pressure member 116, a part of an O-ring 34 will enter the clearance 204 even if the O-ring 34 is pressed by a force greater than its rated value when the pressure member 116 is pushed to fix the first lens 110b to the lens-barrel 95b. Thus, since the force to push the pressure member 34 perpendicularly to the optical axis can be reduced, the protrusion portion 112 of the pressure member 116 can be prevented from being detached from the lens 1110b.

Next, description will be made on the configuration of a lens assembly shown in FIG. 38.

A pressure member 116b having a lock portion 364, and a lens-barrel 95c having a recess portion 365 for locking the lock portion 364 therein are provided. When the pressure member 116b is pushed onto the lens-barrel 95c, the lock portion 364 is locked in the recess portion 365 so that the pressure member 116b is fixed to the lens-barrel 95c. A clearance 204 is provided between the pressure member 116b and the lens 112. The other configuration is similar to that of the lens assembly described with reference to FIG. 18, and description thereof will be therefore omitted.

In such a manner, the lock portion 364 is provided in the pressure member 116b, and the recess portion 365 is provided in the lens-barrel 95c correspondingly to the lock portion 364. Accordingly, the pressure member 116b and the lens-barrel 95c can be fixed merely by pushing the pressure member 116b onto the lens-barrel 95c.

Thus, the pressure member 116b can be fixed to the lens-barrel 95c so quickly that the manufacturing process can be performed in a short time. As a result, the manufacturing cost can be suppressed. Particularly, when the opening of the front casing 2 is caulked with the pressure member 30, the pressure member 30, the lens-barrel 32, and the O-rings 34 and 54 can be fixed sequentially in a predetermined layout only by disposing the pressure member 30, the lens-barrel 32, and the O-rings 34 and 54 in the front casing 2 in position, inserting the lens-barrel 32 or the like into the opening of the front casing 2, then fixing it in a predetermined position.

As compared with the system in which the pressure member is fixedly screwed onto the lens-barrel as described in the modification, the complicated shape of the pressure member capable of being screwed onto the lens-barrel can be made simple. Accordingly, when molds for molding the pressure member and the lens-barrel are formed, the manufacturing cost of the molds can be also suppressed.

Next, description will be made on the configuration of a lens assembly shown in FIG. 39.

As shown in FIG. 39, the object-side front end portion of a lens-barrel 95e is brought into contact with only the side surface of the outer circumferential portion of a lens 110, and an O-ring 34 is disposed on the head portion of the lens-barrel 95e. The other configuration is similar to the configuration of FIG. 18.

Due to the simple configuration of the lens-barrel 95e, the mold for producing the lens-barrel 95e does not have to be formed into a complicated shape. Thus, the cost to produce the mold can be suppressed.

Further, since the image-side surface of the lens 110 does not abut against the lens-barrel 95e, light passing through the lens 110 is not blocked by the lens-barrel 95e. Thus, the light-utilizing efficiency can be improved.

Imaging apparatus according to the sixth modification will be summarized below. The imaging apparatus according to the modification includes a first elastic member, a second elastic member, a camera casing having a first opening, a lens-barrel included in the camera casing, a lens set housed in the lens-barrel, and a pressure member having a second opening and pressing a first lens of the lens set, wherein the first elastic member is put between the pressure member and the first lens so as to caulk the first opening, while the second opening of the pressure member is caulked with the first lens and the second elastic member.

The imaging apparatus according to the modification includes a camera casing having a first opening, a lens-barrel included in the camera casing, a lens set housed in the lens-barrel, a pressure member having a second opening and pressing a first lens of the lens set, an elastic member for caulking between the lens-barrel and the first lens, an imaging device included in the camera casing, first and second diameter portions disposed in the first lens in turn in order of increasing distance from the object side, the second diameter portion having a diameter smaller than the diameter of the first diameter portion, an elastic member disposed in the outer circumferential portion of the second diameter portion, a pressing surface provided in the pressure member, an abutment surface provided in the pressure member and abutting against the first lens, and a pressing surface provided in the lens-barrel and pressing the elastic member, wherein a predetermined clearance is provided between the outer circumferential portion of the first lens and the inner wall surface of the pressure member, and the first opening is caulked with the pressure member, while the first lens is pressed onto the lens-barrel by the pressing surface of the pressure member, and the elastic member is pressed by the pressing surface of the lens-barrel so as to caulk the second opening.

In the imaging apparatus according to the modification, the abutment surface between the lens-barrel and the elastic member is larger than the abutment surface between the first lens and the elastic member.

The imaging apparatus according to the modification includes a lock portion provided in the pressure member, and a recess portion provided in the lens-barrel correspondingly to the lock portion, wherein the lock portion is locked in the recess portion so that the pressure member is fixed to the lens-barrel.

In the imaging apparatus according to the modification, the pressure member is screwed down to the lens-barrel so that the pressure member and the lens-barrel are fixed.

In the imaging apparatus according to the modification, a third diameter portion smaller than the second diameter portion is additionally provided in the first lens, and at least the outer circumferential portion of the third diameter portion abuts against the vicinity of the object-side front end portion of the lens-barrel.

Detailed Description about First Embodiment
(Caulking Structure)

In the first embodiment, description will be made in detail about the point that wide-angle imaging can be achieved in spite of a caulking structure.

Figure 40:
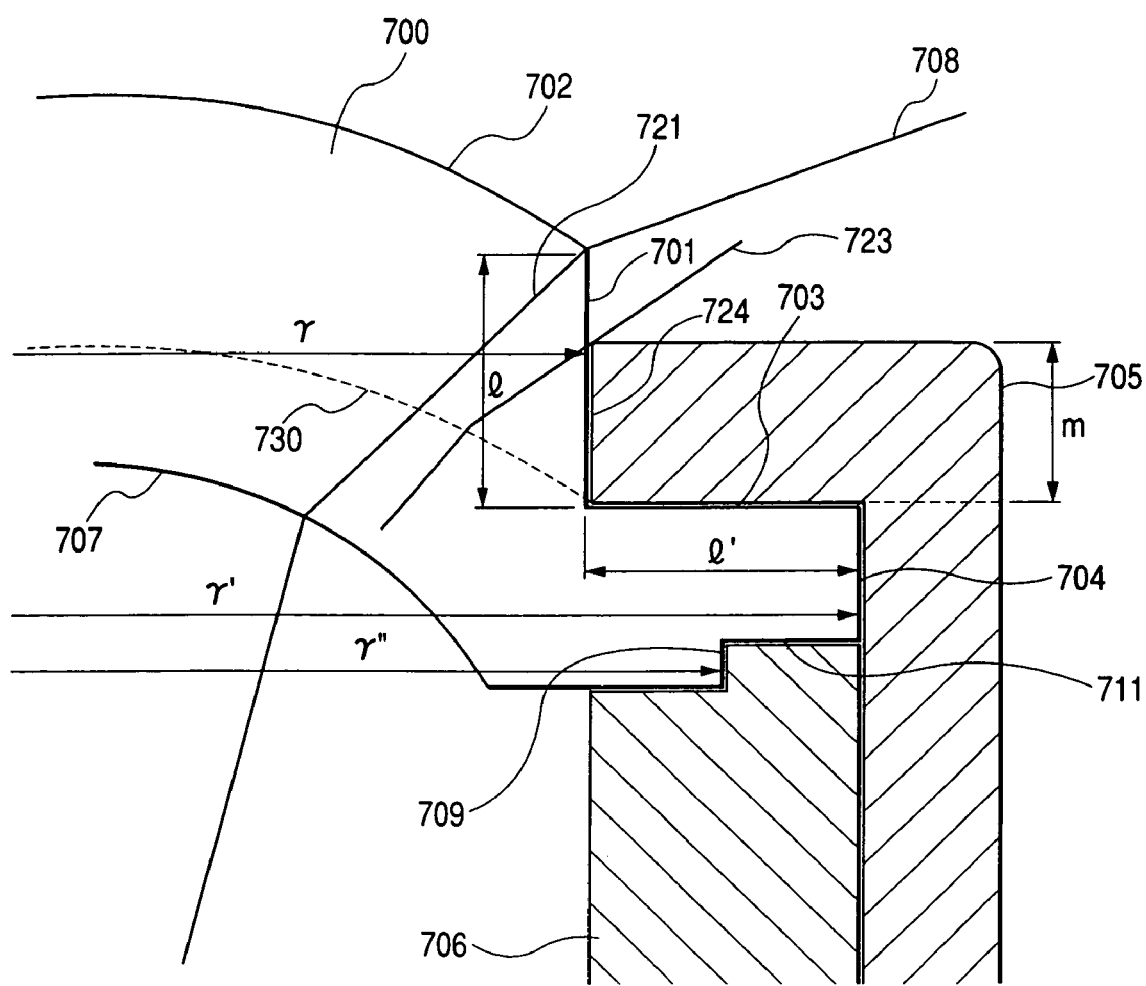
FIG. 40 shows an imaging apparatus having a structure in which not sealing but simple caulking without use of an O-ring is performed.

FIG. 40 shows an imaging apparatus having a structure in which not sealing but simple caulking without use of an O-ring is performed, in contrast to the configuration of the first embodiment shown in FIGS. 1 to 11 in which sealing is performed with an O-ring.

As shown in FIG. 40, a first lens 700 includes a convex surface 702 for wide-angle photographing, and an imaging lens surface 707. The convex surface 702 is provided on the object side of the first lens 700, and the imaging lens surface 707 is provided on the imaging side (not-shown imaging device side). The first lens includes a first diameter portion 701 having a diameter "r", a second diameter portion 704 having a diameter "r'" satisfying r'>r, and a third diameter portion 709 having a diameter "r''" satisfying r<r''<r', in order of increasing distance from the object side. Due to these diameter portions, a predetermined diameter (diameter r) is provided on the imaging side of the first lens 700, while a rising portion 721 having a predetermined rising length "l" is formed. In addition, due to these diameter portions, a flat portion having a length "l'" and substantially perpendicular to the optical axis is formed continuously to the rising portion 721.

A protrusion portion 711 formed in a lens-barrel 706 and for positioning the first lens positions a step portion formed by the second and third diameter portions 704 and 709 on the imaging side of the first lens 700. Thus, the first lens 700 is positioned and housed in the lens-barrel 706.

Further, the flat portion 703 of the first lens 700 is pressed onto the imaging side by a ring-like pressure member 705 disposed on the object side of the first lens 700. Thus, the first lens 700 is pressed and fixed onto the lens-barrel 706. The pressure member 705 is fixedly screwed down to the outer circumferential portion of the lens-barrel 706. In addition, a not-shown step portion is provided in the outer circumference of the pressure member 705. While the pressure member 705 projects from an opening of a not-shown camera casing, the step portion of the pressure member 705 is inserted into the opening of the camera casing so as to caulk the opening of the camera casing.

The object side inner circumference of the pressure member 705 is disposed to extend along the outer circumferential portion of the first lens 700. Particularly, an inner circumferential surface 724 of the pressure member 705 is formed substantially all over the outer circumference of the rising portion 721 of the first lens 700.

When the imaging apparatus is requested to have especially high sealing performance, it means that the pressing force with which the first lens 700 is pressed and fixed onto the lens-barrel 706 has to be kept high. Therefore, the pressure member 705 for pressing the first lens 700 onto the lens-barrel 706 must secure its thickness "m" large enough to keep retaining the flat portion 703 of the first lens 700 with a high pressing force. When the thickness "m" is thin, the ability to press and retain the first lens 700 is so low that sufficient sealing performance cannot be obtained, or sufficient sealing performance will not be able to be obtained after large deterioration with age even if sufficient sealing performance can be obtained at the beginning.

Accordingly, though depending on the requested sealing performance or the material of the pressure member, the thickness "m" of the pressure member 705 for pressing and retaining the first lens 700 must be not smaller than some thickness.

FIG. 40 also shows an example in which use of the pressure member 705 having a thickness m enough to secure sealing performance similarly impairs the wide-angle performance conspicuously when the first lens 700 is replaced by a first lens 722 not provided with the rising portion 721.

A dotted line 730 in FIG. 40 designates the object side convex surface of the first lens 722. The maximum wide-angle view of the imaging apparatus in this case follows the line 723. That is, light beams wider in angle than the line 723 are blocked by the side surface 724 of the pressure member 705 so that the wide-angle view is narrowed correspondingly. For this reason, the thickness of the pressure member 705 to be used must be increased as higher sealing performance is requested. It is therefore difficult to allow the high sealing performance to be compatible with the wide-angle view.

On the other hand, in the imaging apparatus having the first lens 700 with the rising portion 721, the maximum wide-angle view follows the line 708. In comparison with the case of the first lens 722 having no rising portion, an extremely wide-angle view can be obtained because there is no fear that light beams are blocked by the side surface 724 of the pressure member 705.

That is, when the rising portion 721 is made as long as or longer than the thickness "m" of the pressure member 705 which is thick enough to satisfy the sealing performance, a sufficient wide-angle view can be obtained while sufficient sealing performance is secured.

Although the embodiment shows the first lens 700 which is circular in section perpendicular to the optical axis, not to say, the invention is also applicable to a lens having an elliptic shape or a quadrilateral shape as long as it can form an optics capable of imaging an object on a not-shown imaging device.

In addition, although the embodiment shows the first lens 700 in which the third diameter portion 709 is larger in diameter than the first diameter portion 701 and smaller in diameter than the second diameter portion 704, the invention is not limited by the size of the diameter of third diameter portion 709. It is not to say, the invention is also applicable to a structure in which the third diameter portion 709 is dispensable as long as the first lens 700 is positioned and retained in the lens-barrel 706. In addition, the first lens 700 does not have to be positioned directly in the lens-barrel 706. For example, the first lens 700 may be positioned by a not-shown second lens positioned and housed in the lens-barrel 706, so that the first lens 700 is positioned indirectly in the lens-barrel 706 and housed therein.

Detailed Description about First Embodiment
(Sealing Structure)

In the first embodiment, description will be made in detail about the point that wide-angle imaging can be achieved in spite of a sealing structure using an O-ring as a sealing material.

Figure 41:
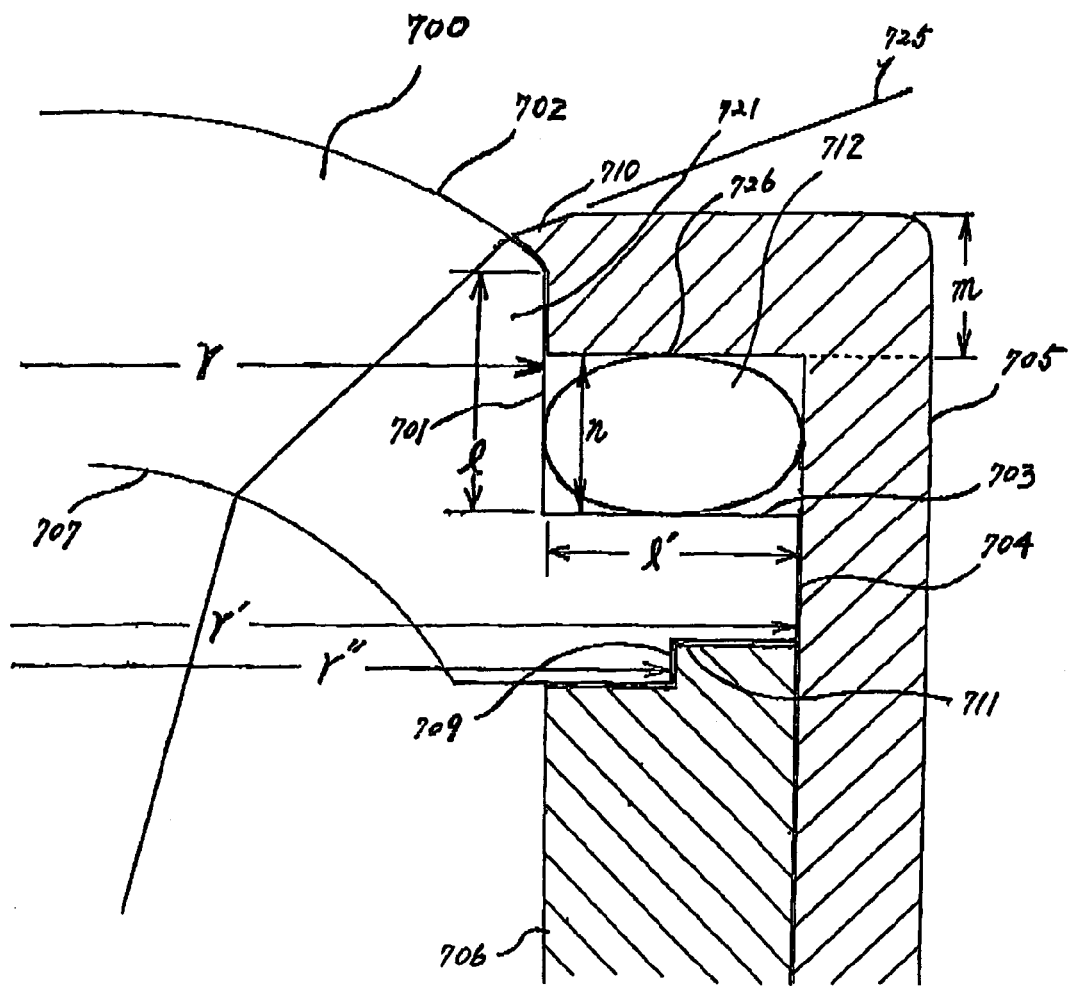
FIG. 41 is a diagram for explaining the fact that a sufficient wide-angle view can be obtained while sufficient sealing performance is secured in the configuration of the first embodiment in which sealing is performed using an O-ring.

FIG. 41 is a diagram for explaining the fact that a sufficient wide-angle view can be obtained while sufficient sealing performance is secured in the configuration of the first embodiment in FIGS. 1 to 11 in which sealing is performed using an O-ring.

In FIG. 41, parts having the same contents as those in FIG. 40 are denoted by the same reference numerals correspondingly, and description thereof will be therefore omitted.

In FIG. 41, the first lens 700 having the rising portion 721 is used in the same manner as in FIG. 40, but there are different points as follows. An O-ring 712 is disposed between the flat portion 703 of the first lens 700 and the pressure member 705. In addition, the pressure member 705 for pressing and retaining the flat portion 703 of the first lens 700 onto the imaging side includes a protrusion 710 at its front end close to the convex surface 702 of the first lens 700.

The pressure member 705 is designed to have a thickness "m" enough to obtain requested good sealing performance by pressing and retaining the flat portion 703 of the first lens 700 through the O-ring 712.

When the imaging apparatus is requested to have especially high sealing performance, it is necessary not only to press and fix the first lens 700 onto the lens-barrel 706 through the O-ring 712 but also to compress the O-ring 712 at a compression ratio proper for the sealing. Therefore, the pressure member 705 for pressing the first lens 700 onto the lens-barrel 706 through the O-ring 712 has to secure its thickness "m" large enough to keep retaining the flat portion 703 of the first lens 700 with a high pressing force and to compress and retain the O-ring 712 at a proper compression ratio. When the thickness "m" is thin, there occurs a problem that the ability to press and retain the first lens 700 is low, or the. O-ring 712 cannot be compressed at a proper compression ratio. Thus, requested sealing performance cannot be obtained. Even if sufficient sealing performance can be obtained at the beginning, the pressing/retaining ability may be lowered by degeneration or the like of the pressure member 705 due to deterioration with age. Thus, sufficient sealing performance will not be able to be obtained.

Accordingly, though depending on the requested sealing performance or the material of the pressure member, the thickness "m" of the pressure member 705 for pressing and retaining the first lens 700 through the O-ring 712 must be not smaller than some thickness.

Next, description will be made about the protrusion 710 disposed at the front end of the pressing member 705 for pressing and retaining the flat portion 703 of the first lens 700 onto the imaging side, which front end is close to the convex surface 702 of the first lens 700.

The protrusion 710 is the same member as an annular protrusion 192 shown in FIGS. 10 and 11. The protrusion 710 (protrusion 192) indeed has an operation to abut against the convex surface 702 of the first lens 700 and press the first lens 700 onto the imaging side. However, not the protrusion 710 (protrusion 192) but an imaging-side surface portion 726 of the pressure member 705 for pressing and deforming the O-ring 712 on the elliptic upper portion (object side) of the O-ring 712 in FIG. 41 presses the first lens 700 actually. Therefore, the protrusion 710 (protrusion 192) serves chiefly not to press the first lens 700 but to set the compression ratio of the O-ring 712 which will be described below.

The controlled value of the compression ratio of the O-ring 712 has to be controlled in a range of from 15% to 35% in the embodiment as described previously. In the prior art, therefore, when the pressure member 705 is fixed by screwing, the quantity of screwing (number of turns of screwing) of the pressure member 705 or the distance of movement of the pressure member 705 caused by screwing is detected in a manufacturing process of this imaging apparatus. Thus, screwing is performed till a specified quantity is detected so that a thickness "n" in FIG. 41 is fixed. As a result, the compression ratio of the O-ring 712 is controlled.

It is not easy to detect the screwing quantity or the movement distance. In addition, since manufacturing equipment or process unnecessary for the manufacturing process is added thereto, the productivity, the yield and the cost are adversely affected on a large scale.

According to the embodiment, however, the thickness "n" is set in a position where the protrusion 710 (protrusion 192) abuts against the convex surface 702 of the first lens 700. That is, the thickness "n" of the compression space of the O-ring 712 is designed so that the O-ring 712 is compressed at a proper compression ratio in the positional condition that the protrusion 710 (protrusion 192) abuts against the convex surface 702 so as to prevent the pressure member 705 from being screwed in. Thus, the compression ratio of the O-ring 712 can be controlled properly.

Therefore, simply by controlling only the screwing torque of the pressure member 705, the detection of the screwing quantity or the movement distance is dispensable. Thus, it is possible to cut the unnecessary manufacturing process, improve the yield and cut the unnecessary manufacturing equipment in comparison with those in the prior art.

The protrusion 710 (protrusion 192) is not requested to have an operation to press and retain the first lens 700. Accordingly, the protrusion 710 (protrusion 192) does not need the thickness "m" as described previously, but can be formed to have a comparatively small thickness. As a result, though the wide-angle view of the first lens 700 may be impaired slightly, it is apparent that a good wide-angle view characteristic is still secured as shown by the line 725 shown in FIG. 41, which line 725 designates the wide-angle view.

Next, description will be made about dimensions of members when the imaging apparatus according to this embodiment is designed as on-vehicle imaging apparatus.

Figure 42:
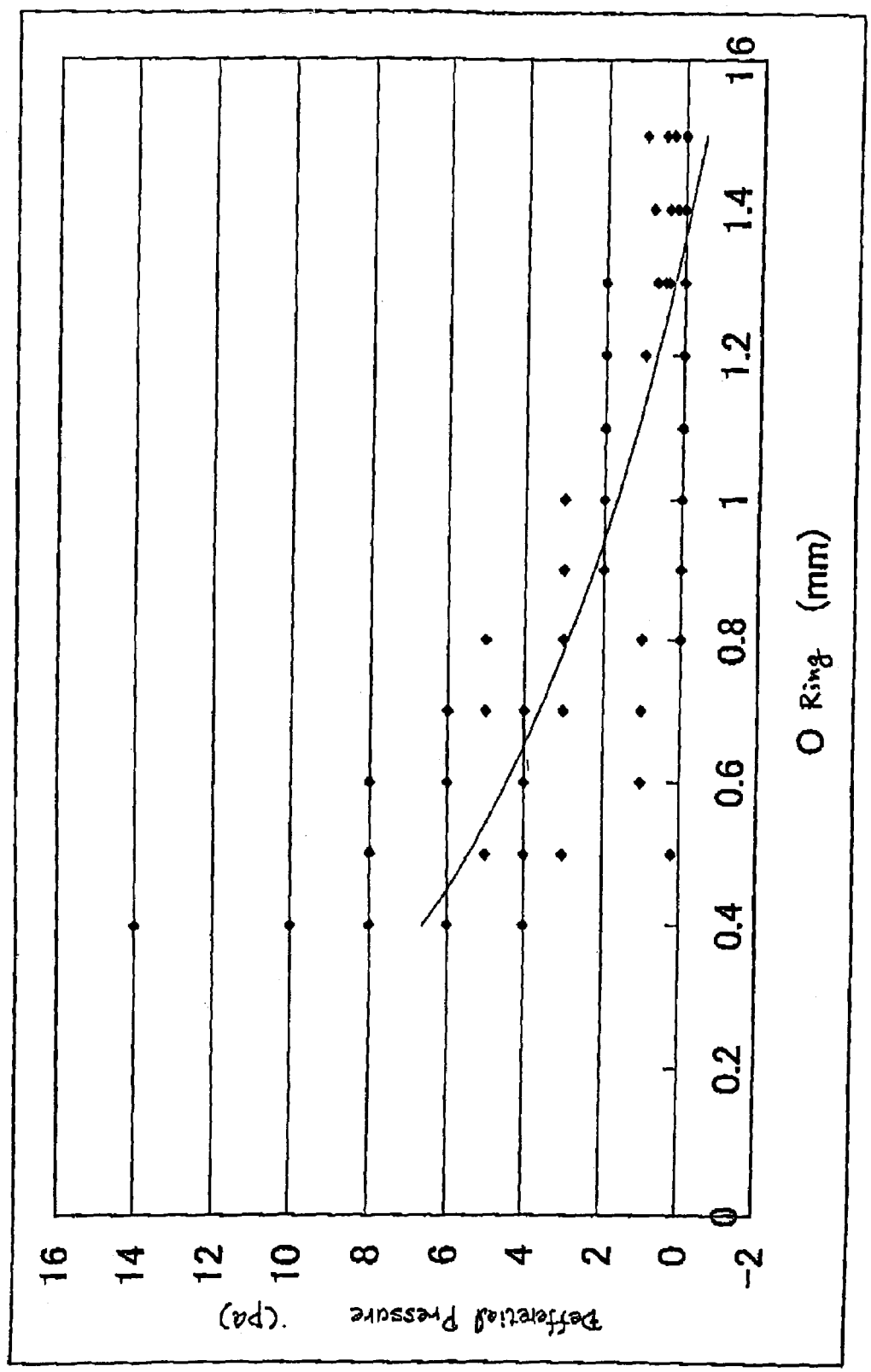
FIG. 42 shows a result of a test generally called differential pressure test.

FIG. 42 shows a result of a test generally called differential pressure test. The test was performed as follows. That is, pressure using a given medium was applied to a front surface portion of the imaging apparatus according to this embodiment via a first path, while the pressure was applied to a reference member via a second path. The difference in pressure between the two paths was measured while the diameter of the O-ring 712 was varied. This test shows that better sealing performance can be obtained as the differential pressure value in the ordinate is smaller. Measuring is performed five times with each diameter.

On-vehicle imaging apparatus is generally requested to have a differential pressure value of 10 Pa or lower in each of the five times of the differential pressure test. Accordingly, from FIG. 42, the diameter of the O-ring 712 has to be designed to be 0.5 mm or longer. On the other hand, when the diameter of the O-ring 712 is set to be 3.0 mm or longer, the pressing force of the pressure member 705 required for setting the compression ratio of the O-ring to be in a range of from 15% to 35% exceeds $350 \times 10^8$ N/m² corresponding to the glass strength of a general optical glass lens though the pressing force is also affected by the thickness of the second diameter portion 704 of the first lens 700. Thus, from the point of view of the strength, it is not good to set the diameter of the O-ring 712 to be 3.0 mm or longer. It is therefore preferable that the diameter of the O-ring 712 is between 0.5 mm and 3.0 mm.

In addition, as is apparent from FIG. 42, the measured differential pressure value settles near 0 substantially when the diameter of the O-ring 712 reaches 1.4 mm or longer. Thus, it is not preferable to select a more expensive O-ring having a diameter not shorter than 1.4 mm. In addition, since the pressing force is requested to have a larger value with the increase of the diameter, it is necessary to select various members having higher strength. Thus, there is a fear that the cost of various members will increase or the apparatus as a whole will become too large.

When the length "l" of the flat portion 703 of the first lens 700 is not longer than a predetermined length, there is a problem that the first lens 700 becomes easy to be broken due to impact or the like during manufacturing or transportation of the first lens 700. It is therefore desired to design the length "l" of the flat portion 703 to be not shorter than 0.7 mm. On the other hand, when the O-ring 712 is pressed and deformed, the O-ring 712 had better be deformed to come into close contact with both the first diameter portion 701 of the first lens 700 and the inner circumferential surface of the pressure member 705 as shown in FIG. 41. In this case, the sealing performance is improved conspicuously in comparison with the case where the O-ring 712 comes into no contact when deformed.

It is therefore desired to make the diameter of the O-ring 712 not shorter than 0.7 mm and not longer than 1.4 mm.

Description will be made about an example in which the imaging apparatus is designed with the O-ring 712 having a diameter of 0.6 mm in order to miniaturize the image apparatus. When the compression ratio is controlled to be 15%, the thickness "n" of the O-ring 712 in the optical axis direction is 0.435 mm.

The thickness "Z" (corresponding to the length "l'" of the flat portion 703) of the O-ring 712 in a direction perpendicular to the optical axis is expressed by Z>0.65 mm from Z×n>(0.6/2)²π.

The thickness "m" of the pressure member is defined by:

$$m = \sqrt{0.9/l'}$$

Accordingly, the shortest length "l" required for the rising portion 721 of the first lens 700 is expressed by:

$$l = n + m.$$

Accordingly, l=1.2041

Thus, it is more preferable that the rising length of the rising portion 721 is made at least 1.205 mm.

The inner diameter of the O-ring 712 is made larger than the outer diameter of the first diameter portion 701 of the first lens 700, and the outer diameter of the O-ring 712 is made shorter than the inner diameter of the pressure member 705. With such a design, not to say, even when the pressure member 705 has been screwed down to the lens-barrel 706, the O-ring 712 can avoid enough contact which would otherwise generate a large frictional force between the inner circumferential surface of the pressure member 705 and an edge portion formed by the first diameter portion 701 and the flat portion 703 of the first lens 700. As a result, unnecessary frictional force or torsional force in the rotating direction does not occur in the O-ring 712, and the O-ring 712 does not suffer any damage. It is therefore possible to suppress deterioration with age over a long term.

In the embodiment, the protrusion 710 (protrusion 192) is provided in the front end of the pressure member 705 in order to control the compression ratio of the O-ring 712. However, the invention is not limited to such a configuration. Unlike the pressure member shown in FIG. 40, the protrusion does not have to be provided in the front end of the pressure member. Further, a member for regulating the screwing quantity of the pressure member 705 may be provided near the threaded portion of the lens-barrel 706 to which the pressure member 705 should be fixedly screwed down.

There has been described about an example in which an O-ring is used as a sealing material. However, this embodiment is not limited to such an example. It is not to say, a liquid-form or tape-form sealing material may be used.

The imaging apparatus according to the first embodiment will be summarized below in association with sealing or caulking. Imaging apparatus according to this embodiment includes a camera casing having an opening, a lens set housed in a lens-barrel, and a pressure member in a cylindrical shape having an opening defined by an annular pressure portion, wherein the opening of the pressure member is caulked with a first lens of the lens set by fixing the pressure member to an outer circumferential portion of the lens-barrel; and the opening of the camera casing is caulked by fixedly housing the fixed pressure member in the camera casing in which a front end portion of the fixed pressure member projects outside from the opening of the camera casing.

In addition, in the imaging apparatus according to this embodiment, the lens set housed in the lens-barrel is a wide-angle lens set; the opening of the pressure member is caulked with a first lens of the wide-angle lens set, and the pressure member is fixedly screwed down to the outer circumferential portion of the lens-barrel in which a convex surface of the first lens projects from the opening of the pressure member to an outside of the pressure member, while an inner circumference of the pressure member is disposed to extend along an outer circumferential portion of the first lens of the lens set.

In addition, in the imaging apparatus according to this embodiment, the lens set housed in the lens-barrel is a wide-angle lens set, a step portion is provided in an outer circumference of the pressure member, the first lens has a protrusion portion provided to form a first step portion and a second step portion in a side surface formed between an object-side convex surface and an imaging-side surface of a first lens of the wide-angle lens set, the first lens is positioned to be housed in the lens-barrel by the second step portion, the opening of the pressure member is sealed off with the first lens and a first sealing material disposed in the first step portion of the first lens, while the pressure member is fixedly screwed down to an outer circumferential portion of the lens-barrel in which the object-side convex surface of the first lens projects from the opening of the pressure member to an outside of the pressure member, and a front end of the pressure member screwed down fixedly projects from the opening of the camera casing, and the pressure member screwed down fixedly is fixedly housed in the camera casing in which the opening of the camera casing is sealed off with the pressure member screwed down fixedly and a second sealing material disposed in the step portion of the pressure member.

In addition, another imaging apparatus according to this embodiment includes a camera casing having an opening, a wide-angle lens set housed in a lens-barrel, a pressure member in a cylindrical shape having an opening defined by an annular pressure portion, a step portion provided in an outer circumference of the pressure member, a rising portion having a predetermined diameter which is provided on an object side of a first lens of the wide-angle lens set, and a flat portion, which is perpendicular to an optical axis, provided continuously to the rising portion, wherein the pressure member presses the flat portion of the first lens, and the opening of the pressure member caulked with the first lens, while the pressure member is fixedly screwed down to an outer circumferential portion of the lens-barrel in which a convex surface of the first lens projects from the opening of the pressure member to an outside of the pressure member, and a front end portion of the pressure member which is fixedly screwed down projects from the opening of the camera casing, and the pressure member screwed down fixedly is fixedly housed in the camera casing in which the opening of the camera casing is caulked with the step portion of the pressure member.

In addition, the imaging apparatus according to this embodiment further includes a sealing material disposed between the pressure member and the first lens, and a protrusion provided in a front end of the pressure member and for abutting against an object side surface of the first lens; wherein compression ratio of the sealing material compressed by the pressure member is established by abutment between the protrusion and the object side surface of the first lens.

In addition, in the imaging apparatus according to this embodiment, a sealing material for sealing is disposed between the pressure member and a first lens, and a clearance between the pressure member and the first lens is larger than a width of the sealing material before the pressure member is fixedly screwed down to the lens-barrel, while the sealing material is pressed and deformed to close the clearance when the pressure member is fixedly screwed down to the lens-barrel.

In addition, in the imaging apparatus according to this embodiment, a sealing material for sealing is disposed between the pressure member and the camera casing, and a clearance between the pressure member and the camera casing is larger than a width of the sealing material before the pressure member is fixedly screwed down to the lens-barrel, while the sealing material is pressed and deformed to close the clearance when the pressure member is fixedly screwed down to the lens-barrel.

In addition, in the imaging apparatus according to this embodiment, a diameter of the sealing material is larger than or equal to 0.5 mm and is smaller than or equal to 3.0 mm.

In addition, in the imaging apparatus according to this embodiment, a diameter of the sealing material is larger than or equal to 0.7 mm and is smaller than or equal to 1.4 mm.

In addition, in the imaging apparatus according to this embodiment, a length of the flat portion is larger than or equal to 0.7 mm.

In addition, in the imaging apparatus according to this embodiment, a rising length of the rising portion is larger than or equal to 1.1 mm.

In addition, another imaging apparatus according to this embodiment includes a camera casing having an opening, and a lens assembly including a lens-barrel for housing a lens set positioned relatively to each other, a pressure member in a cylindrical shape surrounding an outer circumference of the lens-barrel, and an opening defined by the pressure member, wherein the opening of the pressure member is caulked with a first lens of the lens set by fixedly screwing the pressure member down to an outer circumferential portion of the lens-barrel, and the opening of the camera casing is caulked by fixedly housing the pressure member screwed down fixedly in the camera casing in which a front end portion of the pressure member screwed down fixedly projects outside from the opening of the camera casing.

In addition, in the imaging apparatus according to this embodiment, the camera casing has a front casing including the opening of the camera casing, and a rear casing, and the lens assembly is inserted into the front casing from a rear side thereof and then fixed by screwing from the rear side, while the front casing and the rear casing are fixed by screwing from the rear side of the rear casing.

Seventh Modification Related to the First Embodiment

In conjunction with the first embodiment, description will be made about a seventh modification in which wide-angle imaging can be performed in spite of a sealing structure using an O-ring.

Figure 43:
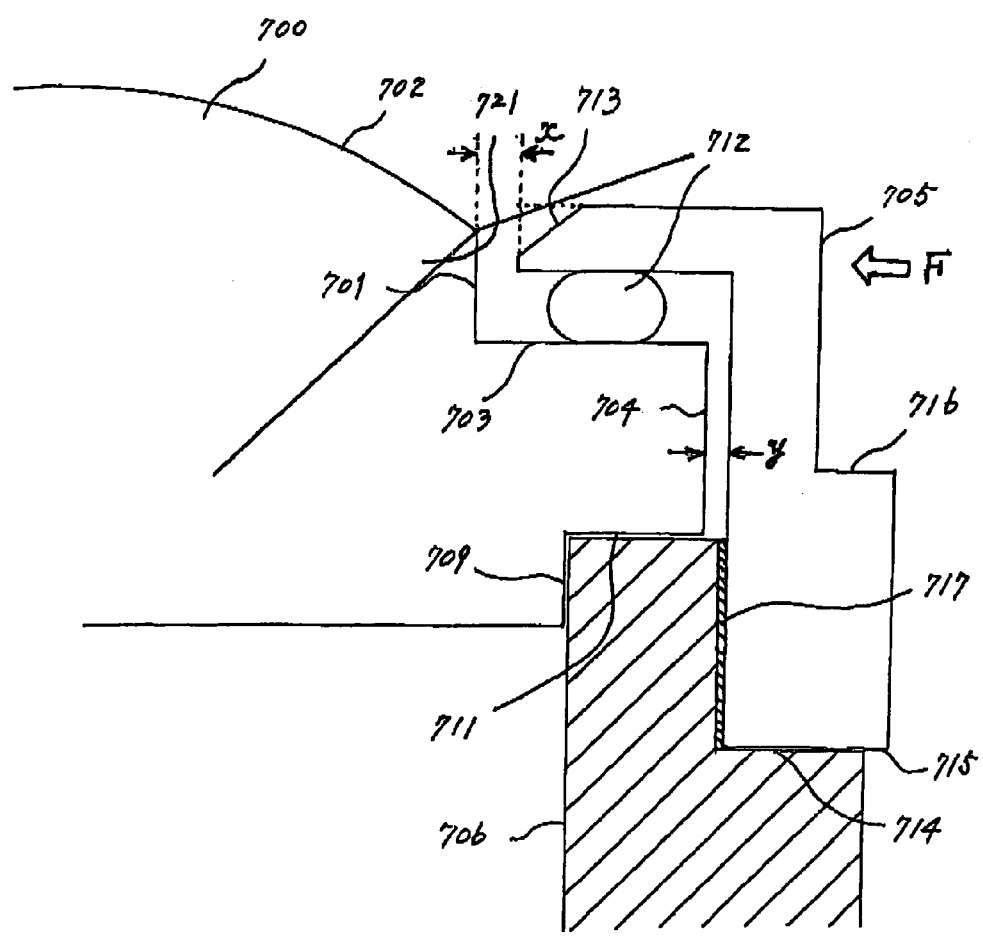
FIG. 43 is a diagram showing seventh modification in which the compression ratio of an O-ring is controlled by a regulating portion provided in a lens-mirror.

FIG. 43 is a diagram showing the seventh modification in which the compression ratio of the O-ring 712 is controlled by a regulating portion 714 provided in the lens-barrel 706, differently from the configuration of the first embodiment in FIG. 41 in which the compression ratio of the O-ring 712 as a sealing material is controlled by the protrusion 710 provided in the front end of the pressure member 705.

In FIG. 43, parts having the same contents as those in FIG. 40 or FIG. 41 are denoted by the same reference numerals correspondingly, and description thereof will be therefore omitted. In addition, the reference numeral 716 represents a step portion provided in the pressure member 705 (not shown in FIGS. 40 and 41).

In FIG. 43, the first lens 700 having the rising portion 721 is used in the same manner as in FIG. 41. However, unlike the case in FIG. 41, the protrusion 710 for regulating the screwing quantity of the pressure member 705 or the like is not provided in the front end of the pressure member 705. In place of the protrusion 710, the regulating portion 714 for abutting against the lower end surface of the pressure member 705 is provided in the lens-barrel 706 in order to prevent the pressure member 705 from being screwed down beyond a predetermined quantity.

The screwing quantity of the pressure member 705 is regulated to be constant by the regulating portion 714. As a result, the compression ratio of the O-ring 712 is controlled to be constant.

In FIG. 43, the pressure member 705 has a notch portion 713 at its front end. Due to the notch portion 713, the wide-angle view of the first lens 700 can be secured to be wider than in the case where the notch portion is not provided (as illustrated by the dotted line in FIG. 43). In other words, due to the notch portion 713 provided, the rising length of the rising portion 721 of the first lens 700 can be reduced so that the apparatus can be miniaturized.

In the modification shown in FIG. 43, a distance "x" between the inner circumferential surface of the pressure member 705 and a side surface of the first diameter portion 701 of the first lens 700 and a distance "y" between the inner circumferential surface of the pressure member 705 and a side surface of the second diameter portion 704 of the first lens 700 are secured to be wider than those in FIG. 40 or FIG. 41 respectively.

Due to spacing between the pressure member 705 and the first lens 700 caused by the distances "x" and "y", it is possible to obtain the following operation and effect. That is, when the outer circumferential portion of the pressure member 705 projecting over the apparatus suffers some kind of external force "F", deformation is tolerated only in the pressure member 705 while the influence of the external force on the first lens 700 requested to retain its accuracy is relieved.

The quantity of the spacing is set suitably in accordance with the material of the pressure member 705. In addition, it is more preferable to secure spacing for both the distances "x" and "y". However, even when spacing is secured for one of the distances "x" and "y", corresponding operation and effect can be expected. It is not to say, spacing may be secured for only one of the distances "x" and "y" according to this modification.

Eighth Modification Related to the First Embodiment

In conjunction with the first embodiment, description will be made about eighth modification in which wide-angle imaging can be performed in spite of a sealing structure using an O-ring.

Figure 44:
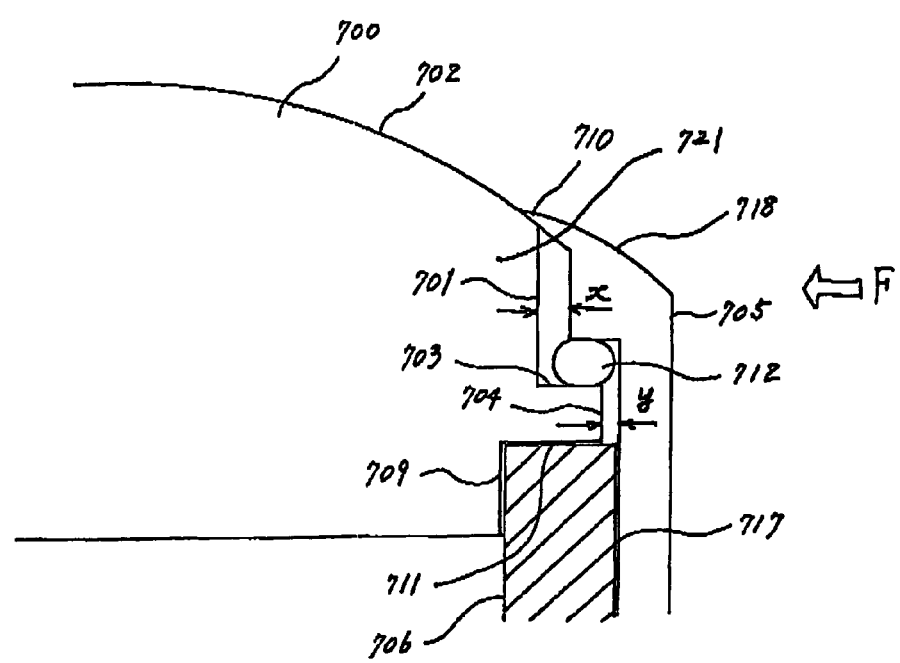
FIG. 44 shows a diagram showing eighth modification in which the deviation of accuracy of a first lens caused by external force is relieved.

FIG. 44 is a diagram showing the eighth modification in which the compression ratio of the O-ring 712 is controlled by the protrusion 710 in the same manner as the configuration of the first embodiment in FIG. 41 in which the compression ratio of the O-ring 712 as a sealing material is controlled by the protrusion 710 provided in the front end of the pressure member 705. However, the modification is further provided with a structure in which the deviation of accuracy of the first lens 700 caused by external force is relieved in the same manner as in the modification shown in FIG. 43.

In FIG. 44, parts having the same contents as those in FIG. 40, FIG. 41 or FIG. 43 are denoted by the same reference numerals correspondingly, and description thereof will be therefore omitted.

In FIG. 44, an inclined surface 718 inclined gently as the position goes farther from the optical axis is provided in the object side front end of the pressure member 705. Due to the inclined surface, even if some kind of substance collides with the pressure member 705, the collision can be released effectually through the inclined surface 718. Not only is the pressure member 705 itself prevented from being broken, but the influence on the first lens 700 can be also reduced conspicuously.

In the modification shown in FIG. 44, a distance "x" between the inner circumferential surface of the pressure member 705 and a side surface of the first diameter portion 701 of the first lens 700 and a distance y between the inner circumferential surface of the pressure member 705 and a side surface of the second diameter portion 704 of the first lens 700 are secured to be wider than those in FIG. 40 or FIG. 41 respectively.

Due to spacing between the pressure member 705 and the first lens 700 caused by the distances "x" and "y", it is possible to obtain the following operation and effect. That is, when the outer circumferential portion of the pressure member 705 projecting over the apparatus suffers some kind of external force "F", deformation is tolerated only in the pressure member 705 while the influence of the external force on the first lens 700 requested to retain its accuracy is relieved.

The quantity of the spacing is set suitably in accordance with the material of the pressure member 705. In addition, it is more preferable to secure spacing for both the distances "x" and "y". However, even when spacing is secured for one of the distances "x" and "y", corresponding operation and effect can be expected. It is not to say, spacing may be secured for only one of the distances "x" and "y" according to this modification.

Ninth Modification Related to the First Embodiment

In conjunction with the first embodiment, description will be made about a ninth modification in which wide-angle imaging can be performed in spite of a sealing structure using an O-ring.

Figure 45:
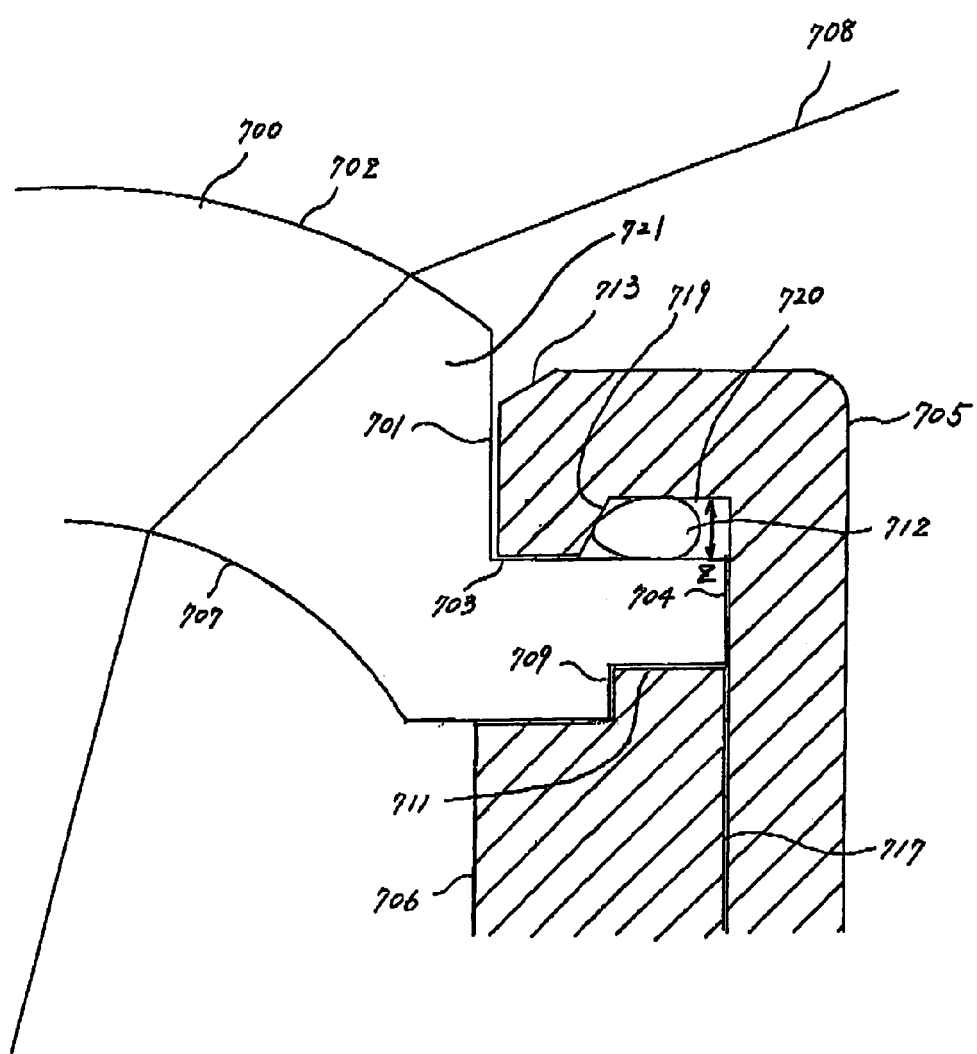
FIG. 45 is a diagram showing ninth modification in which the compression ratio of an O-ring is controlled by a recess portion provided in a pressure member itself.

FIG. 45 is a diagram showing the ninth modification in which the compression ratio of the O-ring 712 is controlled by a recess portion 720 provided in the pressure member 705 itself, differently from the configuration of the first embodiment in FIG. 41 in which the compression ratio of the O-ring 712 as a sealing material is controlled by the protrusion 710 provided in the front end of the pressure member 705.

In FIG. 45, parts having the same contents as those in FIG. 40, FIG. 41, FIG. 43 or FIG. 44 are denoted by the same reference numerals correspondingly, and description thereof will be therefore omitted.

In FIG. 45, the first lens 700 having the rising portion 721 is used in the same manner as in FIG. 41. However, unlike the case in FIG. 41, the protrusion 710 for regulating the screwing quantity of the pressure member 705 or the like is not provided in the front end of the pressure member 705. In place of the protrusion 710, the compression ratio of the O-ring 712 is controlled by an optical-axis-direction depth z of the recess portion 720 provided in the pressure member 705.

The recess portion 720 has a slope 719. Due to the slope 719, it is possible to prevent deformation such as distortion of the O-ring 712 when the pressure member 705 is being screwed in.

Instead of the configuration shown in FIG. 45, a recess portion for controlling the compression ratio of the O-ring 712 may be provided in the first lens 700 while the surface of the pressure member 705 for pressing the first lens 700 is formed to be flat.

Thus, according to the first embodiment, it is possible to provide the imaging apparatus improved particularly in environmental resistance performance.

Second Embodiment

The first embodiment explains the imaging apparatus improved in environmental resistance performance and the like. In the second embodiment, description will be made on a focus adjusting mechanism and a camera using the same. Description will begin with the background of such a focus adjusting mechanism and such a camera.

In recent years, as the advance in imaging devices such as CCD (Charged-Coupled Device) or CMOS (Complementary Metal-Oxide Semiconductor) as to improvement of their performance or miniaturization, a camera which is capable of photographing in more various environments than ever is demanded. For example, as the car navigation system is popularized, a camera has been mounted on many vehicles in order to achieve functions using displays of the car navigation systems.

An on-vehicle camera generally has a waterproof function on the assumption that it may be used outdoors. Further, a space where the on-vehicle camera can be mounted is often limited for reasons of its layout. It is therefore inevitable to miniaturize the on-vehicle camera. For example, JP-A-8-84277 discloses a camera which is proofed against vibration and is superior in waterproof performance.

According to the technique disclosed in JP-A-8-84277, waterproof treatment is performed on a board portion and lenses by covering the whole of the board portion with a resin molding in close contact therewith and without clearance therebetween. In the camera configured thus, the focus cannot be adjusted even if it is found that the lenses are out of focus after the waterproof treatment is performed. In such a case, the camera becomes defective. At present, a request as to the cost becomes severe while there is a rapidly increasing demand for miniature cameras. In such circumstances, it is desired that defective products are not produced as much as possible.

A focus adjusting mechanism according to the embodiment includes a lens assembly in which a lens set is incorporated, an adjustment ring subjected to internal threading and fitted to the lens assembly rotatably, a retention plate fixed to the lens assembly for retaining the adjustment ring so as to prevent the adjustment ring from falling away from the lens assembly while keeping the degree of freedom in rotation of the adjustment ring, and a lens holder fitted to the lens assembly without rotating relatively to the lens assembly but movably in the direction of the optical axis of the lens assembly, and subjected to external threading so as to have the same diameter as the inner diameter of the adjustment ring. The adjustment ring and the lens holder are fitted to each other in their threaded portions, so that the lens holder moves forward/backward in the optical axis direction with the rotation of the adjustment ring.

When an imaging device receiving an image from the lens assembly is provided on the side where the lens holder is not fitted to the lens assembly, the focus of the image received by the imaging device can be adjusted only by the adjustment ring. That is, it is not necessary to adjust the lens assembly, that is, lenses.

The lens assembly typically has a configuration in which a plurality of lenses are attached to the lens holder in order to satisfy desired performance. To adjust the lenses is a work requiring a lot of labor. Particularly, when adjustment is required after the lens assembly is assembled, it is necessary to take the lens assembly out of the lens holder. It is desired to avoid such a work.

In the case of the lens assembly that has a waterproof structure, a sealing material such as an O-ring is used between lenses or between a lens and a lens-barrel. When the sealing material moves or deforms as a result of adjusting a lens included in the lens assembly, desired waterproof performance cannot be obtained. On the other hand, according to the configuration using the adjustment ring, the lenses are fixed so that the problem of deterioration in waterproof performance is prevented from occurring. In addition, the adjustment work itself becomes easy. In addition, even when the lenses go out of focus during their use, the lenses can be focused again. This even allows the reuse of the lens assembly which has been abandoned because it costs much for the adjustment work.

When the lens assembly and the lens holder are designed to be key-fitted to each other, for example, the lens holder can be prevented from rotating relatively to the lens assembly.

A ring made of an elastic body may be inserted into the lens assembly. An end portion of the lens holder abuts against the ring made of an elastic body when the lens holder and the lens assembly are fitted to each other.

For example, there may be provided a structure in which the end portion of the lens holder begins to abut against the ring made from an elastic body a little before the lens holder and the lens assembly are fitted deeply enough to reach a focus position in design. Due to pretension generated at that time, the threaded portions in which the adjustment ring and the lens holder fitted to each other and the structural portion of the adjustment ring are gathered on one side. As a result, looseness caused by back-lash in the threaded portions or dimensional scattering in parts can be absorbed.

A fixing means for fixing the retention plate and the adjustment ring may be further provided. An example of the fixing means includes a screw. For example, an internal thread is formed in the retention plate, while a screw having a truncated cone point is incorporated in the internal threaded portion so that the adjustment ring and the retention plate are integrated with each other. Thus, the focus is fixed. In this case, since no load caused by screwing is directly applied to the lens assembly, there occurs no deformation in the lenses. Therefore, the influence on the quality of an image picked up by the camera can be reduced.

The camera according to the embodiment has the focus adjusting mechanism and an imaging device for receiving an image from the lens assembly and on the side where the lens holder is not fitted to the lens assembly.

The focus adjusting mechanism of the waterproof camera will be described below more specifically. Generally, in a camera caulked with cover glass, a space allowing a variation of the full length caused by focus adjustment can be secured in a casing even if all the lenses of the lens set are sent out at the time of focus adjustment. Therefore, desired waterproof performance can be obtained if the camera can be housed in the casing.

However, in a camera in which the cover glass is abolished, and a front lens is exposed so that waterproof sealing is performed on the lens surface and between the lens and the casing, the position of the lens has to be stabilized in order to obtain desired waterproof performance.

The allowable range of scattering in focal length is generally about ±5%. For example, assuming that an on-vehicle miniature camera has a focal length of 10 mm, it is necessary to design the camera in consideration of scattering of ±0.5 mm, that is, 1 mm. In an on-vehicle miniature camera or the like, parts are often coupled in the front portion of the camera before the camera is attached to a vehicle. Thus, in view of the layout, there is a major restriction on absorbing the scattering in the front portion of the camera.

Accordingly, in the embodiment, the positions of the lenses themselves are not changed, and the lens assembly and the exterior casing are fixed by screwing. In this configuration, the focus is adjusted by moving a board including an imaging device forward/backward in the optical axis direction. The board is located at the rear of the lens assembly.

The imaging unit having the focus adjusting mechanism according to this embodiment is the same as the imaging unit 10 described in the first embodiment. Therefore, description of the imaging unit according to this embodiment will be omitted.

Thus, according to the embodiment, a camera which is easy to adjust the focus can be obtained. Particularly, in a miniature waterproof camera, the focus can be adjusted without adjusting the lenses themselves. Accordingly, the efficiency in adjustment work can be improved. In addition, the adjustment of the optical axis becomes unnecessary for adjusting the focus by using of the adjustment ring. Further, since the focus can be fixed by fixing the adjustment ring, no load is applied directly to the lenses. Thus, it is possible to avoid the occurrence of deformation in the lenses.

Third Embodiment

The second embodiment explains the focus adjusting mechanism and the camera using the same. In the third embodiment, description will be made on a lens module having a function of heating lenses and a camera using the same. Description will begin with the background of such a lens module and such a camera using the same.

In recent years, as the advance in imaging devices such as CCD (Charged-Coupled Device) or CMOS (Complementary Metal-Oxide Semiconductor) as to improvement of their performance or miniaturization, a cameras which is capable of photographing in more various environments than ever is demanded. For example, as the car navigation system is popularized, a miniature camera has been mounted on many vehicles in order to achieve various functions using displays of the car navigation systems.

For example, in an on-vehicle camera assumed to be used outdoors, the use environment thereof may be harsh to a lens. The lens may be frozen when the outside air temperature is below the freezing point, or dew may generate on the lens in a high humidity.

When a CCD is used as an imaging device of the camera, the problem of frost or dew on the lens may be solved because of heat generated from the CCD, a circuit therefore, a power supply, and the like, after a certain time has passed since the start-up of the CCD. However, user's request cannot be met rapidly.

As a countermeasure against dew or frost on a lens of a camera, there has been proposed a technique in which a lens barrier is provided in the camera in advance, and a current is applied to a resistor placed in the lens barrier, so as to heat the lens barrier (for example, see JP-A-3-14631 (Utility Model)).

In the technique disclosed in JP-A-3-14631 (Utility Model), the lens barrier is controlled to be located in a predetermined position by a driving unit and heated before the beginning of photographing. Thus, dew generated on the lens is removed. However, for example, in a miniature camera, it is often required to dispense with the lens barrier or the driving unit thereof, from the point of view of miniaturization and cost reduction. In addition, in some on-vehicle cameras or the like, a front lens is exposed to the outside. The proposed technique is not applicable to such a case. Thus, a new solution is required.

In addition, when the camera is an on-vehicle camera or the like, it is exposed outdoors in a harsh use environment, and used in a broad atmospheric temperature (also referred to as "environmental temperature") range differently from general cameras. Thus, the camera may be not able to exert its desired performance. Generally, slight deformation (that is, expansion or reduction) and a slight change in index of refraction occur in a lens due to a change in temperature. A lens module mounted in a camera is assembled with high accuracy. When there occurs deformation or a change in index of refraction, there occurs a change in focal length of the lens so that the lens is out of focus. Thus, there is a fear that the desired performance of the camera may not be achieved. In addition, it is also necessary to take countermeasures against dew or frost on the lens module or the camera into consideration.

In the lens module according to the embodiment, a first lens of a lens set is disposed to be exposed from an exterior casing, while heating means is provided on the back surface of the first lens and in a position out of a photographing optical path. Thus, dew or frost on the first lens can be prevented. Examples of such heating means include a film-like heater, and a hot wire heater formed by printing. The kind of heating means is no object if it has no influence on the photographing optical path. For example, a heater in which metal foil of stainless steel, copper, aluminum or the like is sandwiched between resin foils of polyamide or polycarbonate is generally available as the film-like heater.

The first lens may be made of glass. Glass is suitable for the lens exposed to the outside because it is a material superior in view of surface hardness and heat resistance. In addition, the heating means may be pasted to a flat surface provided on the image side of the first lens and in a position out of the photographing optical path. When the lens is a wide-angle lens, the first lens is generally a meniscus lens having a concave/convex curved surface, and a flat surface is formed on the image side. Therefore, when the heating means is provided on the flat surface, the process for attaching the heating means can be simplified while excluding the influence on the photographing optical path.

The heating means may be formed by printing and baking conductive metal paste on the flat surface of the first lens. For example, the heating means can be formed by baking silver paste printed on glass with a silk screen.

The heating means may be a film-like thin sheet heater in which metal foil is covered with insulator. The insulator may be matte black.

Another mode of the embodiment also relates to a lens module. This lens module includes a lens set whose dimensions are designed to work in an estimated useable atmospheric temperature range having a center value higher than a normal outside air temperature, and heating means for heating the lens set. As described above, a lens is out of focus because of its slight deformation caused by a change in temperature. Therefore, when the atmospheric temperature is controlled to allow the lens to have its design dimensions, desired performance can be achieved. For example, as for a lens to be used in an ambient atmospheric temperature range of from −40 degrees centigrade to +85 degrees centigrade, predetermined performance has to be satisfied over an available atmospheric temperature change $\Delta t$ of 125 degrees with the estimated temperature in design being set at 25 degrees centigrade. However, the lens performance is generally lowered conspicuously near the highest temperature and the lowest temperature far from the estimated temperature. For example, if the atmospheric temperature of the lens module can be controlled to be in a range of from +5 degrees centigrade to +85 degrees centigrade by the heater, the available atmospheric temperature change $\Delta t$ will be 80 degrees. In this case, when focus adjustment is performed with the lens design temperature being set at +45 degrees centigrade that is the center value of the controlled atmospheric temperature range, the lowering of the performance of the lens module near the highest temperature and the lowest temperature can be suppressed.

A temperature sensor may be further provided. By use of the temperature sensor, the temperature of the lens module can be controlled to be in a desired range. Thus, the performance of the lens module can be stabilized.

A camera according to the embodiment includes the lens module and an imaging device placed in a subsequent stage to the lens module. For example, CCD or CMOS is available as the imaging device.

Description will be made below more specifically. The embodiment is aimed at a countermeasure against dew and frost on a miniature camera such as an on-vehicle camera. In this case, a heater and a temperature sensor are mounted on the lens module provided in the camera, so as to control the temperature of the lens module to thereby allow the lens module to achieve its desired performance. In addition, lenses may be deformed due to a change in temperature. In that event, the quality of photographing such as resolution may be lowered. Therefore, by controlling the temperature of the lens module properly, the lowering of the quality of photographing is suppressed to allow the camera to exert stable performance.

Figure 46:
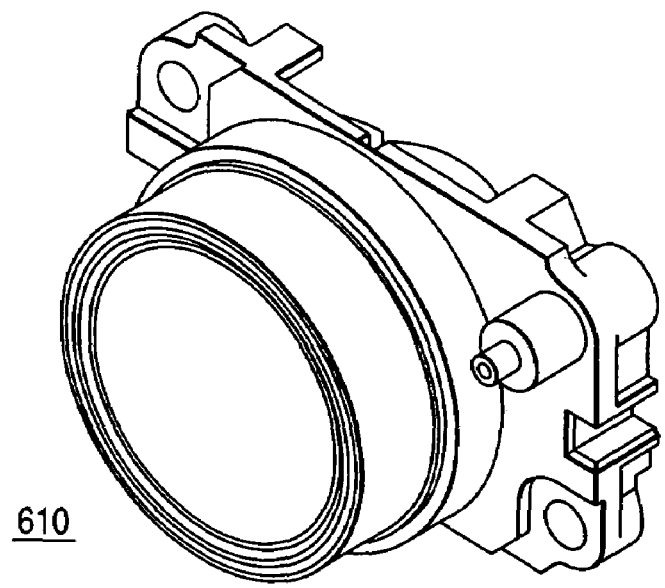
FIG. 46 is a perspective view of a lens module according to a third embodiment.
Figure 47:
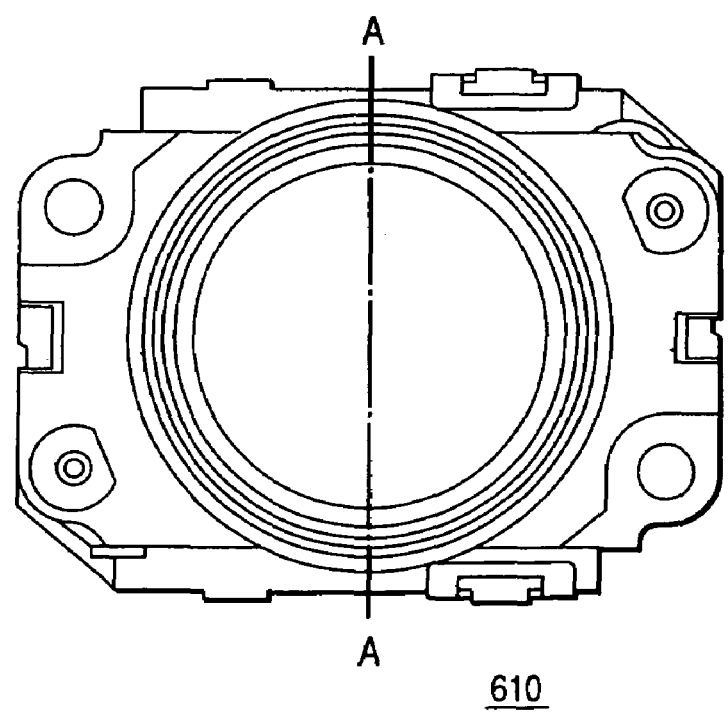
FIG. 47 is a front view of the lens module according to the third embodiment.
Figure 48:
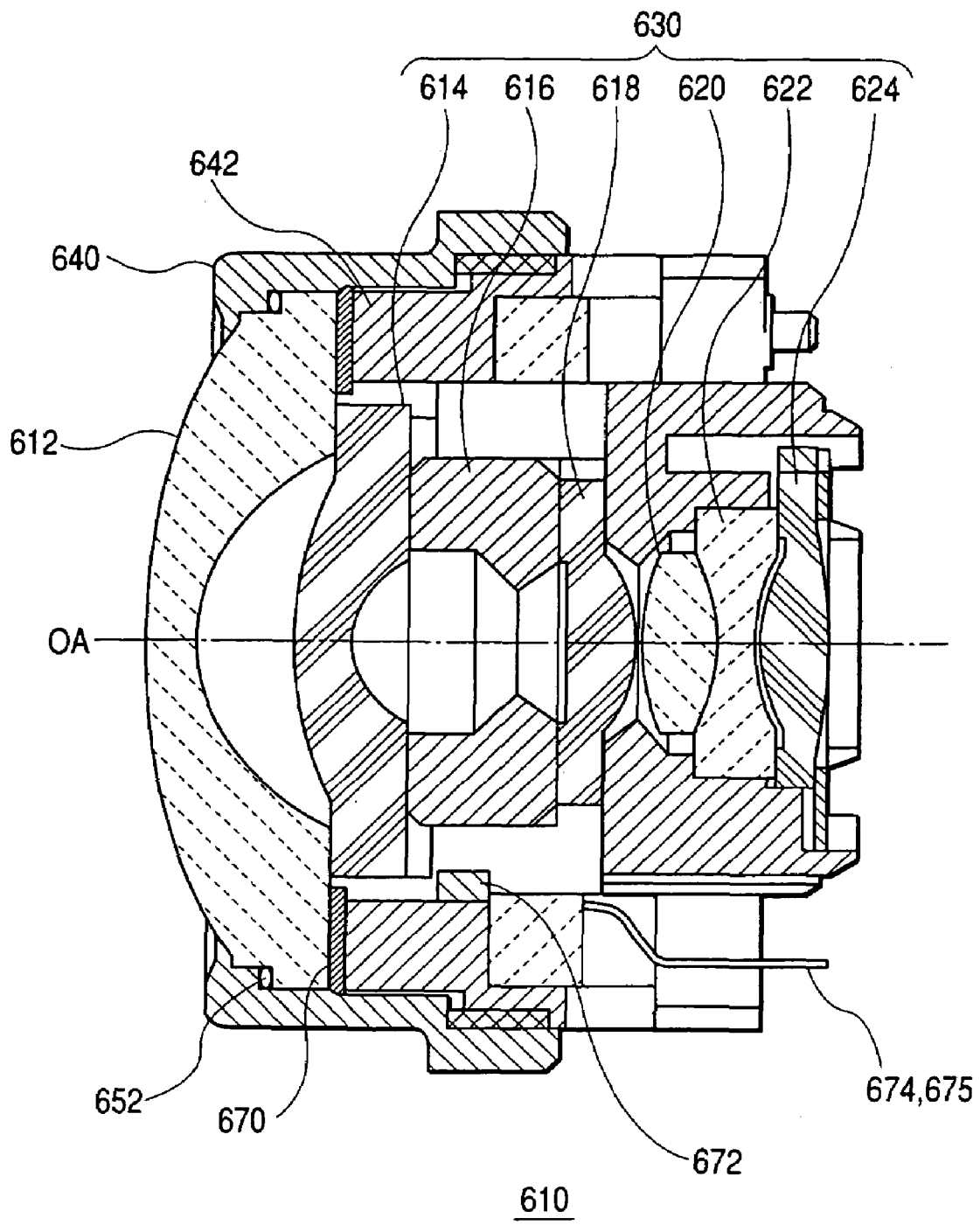
FIG. 48 is a sectional view of the lens module according to the third embodiment, taken on line A-A in FIG. 47.

FIG. 46 is a perspective view of a lens module 610 according to the embodiment. FIG. 47 is a front view of the lens module 610. FIG. 48 is a sectional view of the lens module 610 taken across line A-A in FIG. 47. The lens module 610 has a wide-angle lens set including a first lens 612 (hereinafter also referred to as "front lens 612") and an internal lens set 630 in order of increasing distance from the object-side front surface in the direction of the optical axis OA, that is, in order from left to right in FIG. 48. The front lens 612 is exposed to the outside.

The internal lens set 630 includes a second lens 614, a diaphragm 616, a third lens 618, a fourth lens 620, a fifth lens 622 and a sixth lens 624 in order of increasing distance from the front lens 612. A mask is provided between the diaphragm 616 and the third lens 618 so as to have no influence on the photographing optical path.

The edge portion of the front lens 612 is subjected to step-cut processing, and a first O-ring 652 for keeping air-tightness for the sake of waterproofing is inserted into the step-cut portion. The front lens 612 is fixed by a screw fitted pressure ring 640 fitted to the outer circumference of a lens holder 642. In this case, the first O-ring 652 is pressed by the pressure ring 640 and the step-cut portion. A curved surface is formed on the image side of the front lens 612, while a flat surface is formed in the outer circumference thereof. A flat surface is formed on the object side of the second lens 614 and in the outer circumference of the curved surface.

An annular film-like heater 670 is provided in a region having no influence on the photographing optical path, so as to be put between the flat surface of the front lens 612 and the flat surface of the second lens 614. Electric power is supplied to the heater 670 so as to heat the lens module 610. In addition, a temperature sensor 672 for acquiring the temperature inside the lens module 610 is provided on the inner wall surface of the lens holder 642. The lens module 610 is heated by the heater 670 supplied with the electric power based on the output of the temperature sensor 672. The front lens 612 excluding the curved surface is generally painted black in order to prevent reflection. Therefore, even if the heater 670 is provided in that portion, there is no fear that the performance of the lens module 610 is degraded. When an insulator on the pasted surface of the heater 670 is formed to be black, the process for painting the front lens 612 black as described above is dispensable.

Figure 51:
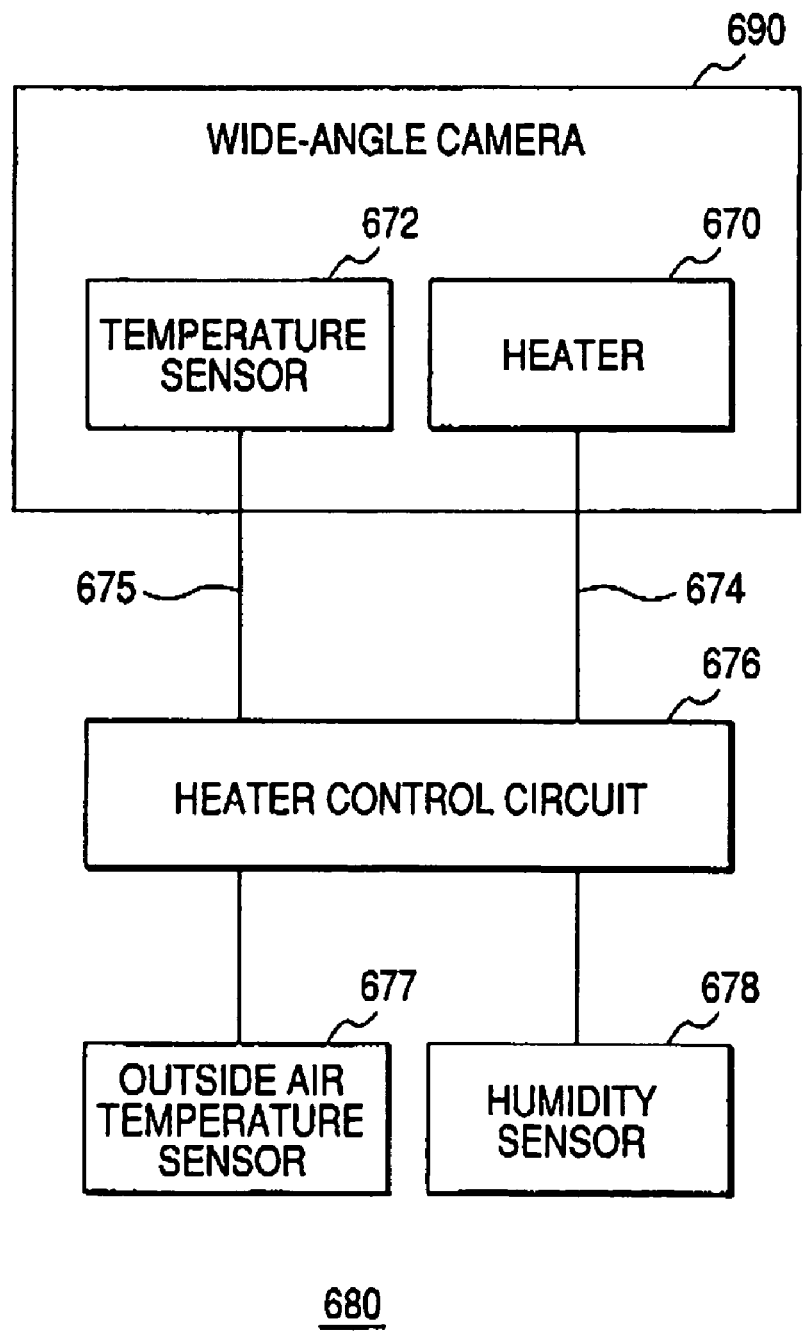
FIG. 51 is a block diagram showing the configuration of a temperature control system of the lens module.

Electric power is supplied to the heater 670 through a power supply line 674, and a detection signal of the temperature sensor 672 is transmitted through a control line 675. The power supply line 674 and the control line 675 are connected to a heater control circuit 676 as shown in FIG. 51 which will be described later. Another O-ring may be provided between the front lens 612 and the second lens 614. Further, the heater for heating the lens module 610 may be provided between the second lens 614 and the diaphragm 616 or between the diaphragm 616 and the second lens 618. In that case, it is necessary to make arrangements to have no influence on the photographing optical path.

Figure 49:
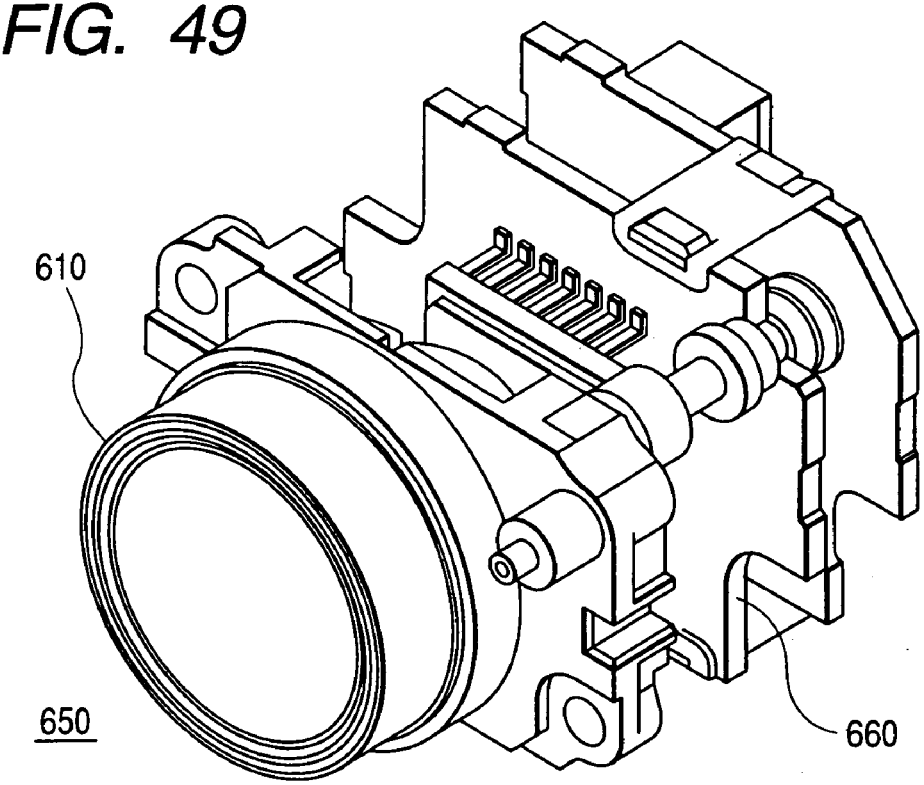
FIG. 49 is a perspective view showing the configuration of a wide-angle camera according to the third embodiment.
Figure 50:
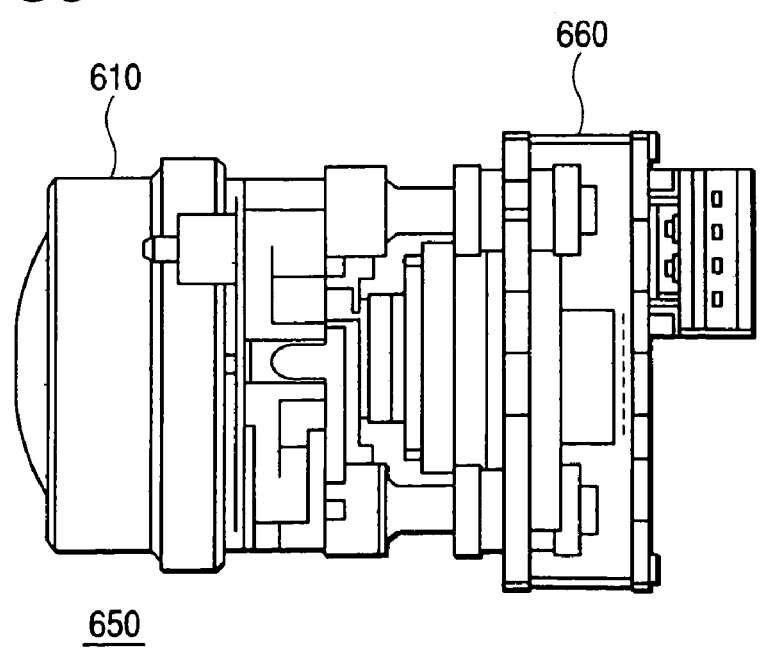
FIG. 50 is a side view showing the configuration of the wide-angle camera according to the third embodiment.

FIGS. 49 and 50 show a wide-angle camera 650 configured by the lens module 610 and a CCD board 660 having a CCD as an imaging device. FIG. 49 is a perspective view, and FIG. 50 is a side view. In the wide-angle camera 650, the CCD board 660 is provided at the rear of the sixth lens 624 (on the right side in FIGS. 49 and 50) in the lens module 610, and the CCD 660 and the lens module 610 are fixed through pins.

FIG. 51 is a block diagram showing the configuration of a temperature control system 680 of the lens module 610. The film-like heater 670, the temperature sensor 672, and an outside air temperature sensor 677 and a humidity sensor 678 provided in the exterior of the wide-angle camera 650 are connected to the heater control circuit 676. The heater control circuit 676 supplies electric power to the heater 670 while controlling the electric power to be supplied to the heater 670 based on the detection signal of the temperature sensor 672. The electric power may be supplied by feedback control or by on-off control. A desired value of the temperature of the lens module 610 may be a fixed value determined in advance or may be a value set through a not-shown predetermined input unit by a user. For example, when a fixed value is used, estimated temperature used for designing the dimensions of the lens module 610 may be used.

The processing of the temperature control system 680 may be always activated or may be activated in response to user's operation. Alternatively, the processing of the temperature control system 680 may be activated when predetermined conditions are satisfied on the basis of the output of the outside air temperature sensor 677 or the humidity sensor 678, for example, when the outside air temperature is not higher than 5 degrees centigrade or when the humidity is not lower than 70%. Further, the heater control circuit 676 may identify dew or frost based on the outside air temperature and the temperature of the lens module 610.

The heater control circuit 676 can be implemented by hardware including a CPU, a memory or another LSI of a given computer, or software including a program loaded on a memory.

According to the embodiment, as described above, desired performance of a lens module or a camera can be achieved within a broad environmental temperature range around normal temperature. In addition, the problem of dew or frost on the lens module or the camera can be prevented or solved rapidly.

The first to third embodiments described above are exemplifications. It will be understood by those skilled in the art that various modifications can be made on constituent parts of the embodiments and on combinations of the constituent parts, and those modifications are also included in the scope of the invention.

What is claimed is:

1. An imaging apparatus comprising:

a camera casing having an opening;

a lens set housed in a lens-barrel; and a pressure member in a cylindrical shape having an opening defined by an annular pressure portion, the pressure member disposed between the camera casing and the lens-barrel, wherein said opening of said pressure member is caulked with a first lens of said lens set by fixing said pressure member to an outer circumferential portion of said lens-barrel, and said opening of said camera casing is caulked by fixedly housing said fixed pressure member in said camera casing in which a front end portion of said fixed pressure member projects outside from said opening of said camera casing, wherein said lens set housed in said lens-barrel is a wide-angle lens set, said opening of said pressure member is caulked with a first lens of said wide-angle lens set, and said pressure member is fixedly screwed down to said outer circumferential portion of said lens-barrel in which a convex surface of said first lens projects from said opening of said pressure member to an outside of said pressure member, while an inner circumference of said pressure member is disposed to extend along an outer circumferential portion of said first lens of said lens set.

2. The imaging apparatus according to claim 1, wherein said lens set housed in said lens-barrel is a wide-angle lens set, a step portion is provided in an outer circumference of said pressure member, said first lens has a protrusion portion provided to form a first step portion and a second step portion in a side surface formed between an object-side convex surface and an imaging-side surface of a first lens of said wide-angle lens set, said first lens is positioned to be housed in said lens-barrel by said second step portion, said opening of said pressure member is sealed off with said first lens and a first sealing material disposed in said first step portion of said first lens, while said pressure member is fixedly screwed down to an outer circumferential portion of said lens-barrel in which said object-side convex surface of said first lens projects from said opening of said pressure member to an outside of said pressure member, and a front end of said pressure member screwed down fixedly projects from said opening of said camera casing, and said pressure member screwed down fixedly is fixedly housed in said camera casing in which said opening of said camera casing is sealed off with said pressure member screwed down fixedly and a second sealing material disposed in said step portion of said pressure member.

3. An imaging apparatus comprising:

a camera casing having an opening; and a lens assembly including a lens-barrel for housing a lens set positioned relatively to each other, a pressure member in a cylindrical shape surrounding an outer circumference of said lens-barrel, and an opening defined by said pressure member, the pressure member disposed between the camera casing and the lens-barrel, wherein said opening of said pressure member is caulked with a first lens of said lens set by fixedly screwing said pressure member down to an outer circumferential portion of said lens-barrel, and said opening of said camera casing is caulked by fixedly housing said pressure member screwed down fixedly in said camera casing in which a front end portion of said pressure member screwed down fixedly projects outside from said opening of said camera casing, wherein said camera casing has a front casing including said opening of said camera casing, and a rear casing, and said lens assembly is inserted into said front casing from a rear side thereof and then fixed by screwing from said rear side, while said front casing and said rear casing are fixed by screwing from said rear side of said rear casing.

* * * * *